United States Patent
Meschter et al.

(10) Patent No.: US 8,122,616 B2
(45) Date of Patent: Feb. 28, 2012

(54) COMPOSITE ELEMENT WITH A POLYMER CONNECTING LAYER

(75) Inventors: James C. Meschter, Portland, OR (US); Jeffrey L. Johnson, Busan (KR); Lia M. Uesato, Beaverton, OR (US); Tina M. Casillas, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 886 days.

(21) Appl. No.: 12/180,235

(22) Filed: Jul. 25, 2008

(65) Prior Publication Data

US 2010/0018075 A1 Jan. 28, 2010

(51) Int. Cl.
*A43B 23/00* (2006.01)
*A43B 7/14* (2006.01)

(52) U.S. Cl. ........................... 36/45; 36/47; 36/88

(58) Field of Classification Search ............ 36/45, 88, 36/91, 92, 47
See application file for complete search history.

(56) References Cited

U.S. PATENT DOCUMENTS

| | | | |
|---|---|---|---|
| 2,034,091 A | 3/1936 | Dunbar | |
| 2,048,294 A | 7/1936 | Roberts | |
| 2,205,356 A | 6/1940 | Gruensfelder | |
| 2,311,996 A | 2/1943 | Parker | |
| 3,439,434 A | 4/1969 | Tangorra | |
| 3,672,078 A | 6/1972 | Fukuoka | |
| 3,823,493 A | 7/1974 | Brehm et al. | |
| 4,634,616 A | 1/1987 | Musante | |
| 4,756,098 A | 7/1988 | Boggia | |
| 4,858,339 A | 8/1989 | Hayafuchi et al. | |
| 4,873,725 A | 10/1989 | Mitchell | |
| 5,149,388 A | 9/1992 | Stahl | |
| 5,156,022 A | 10/1992 | Altman | |
| 5,271,130 A | 12/1993 | Batra | |
| 5,285,658 A | 2/1994 | Altman et al. | |
| 5,345,638 A | 9/1994 | Nishida | |
| 5,359,790 A | 11/1994 | Iverson et al. | |
| 5,367,795 A | 11/1994 | Iverson et al. | |
| 5,399,410 A | 3/1995 | Urase | |
| 5,832,540 A | 11/1998 | Knight | |

(Continued)

FOREIGN PATENT DOCUMENTS

CN 101125044 A 2/2008

(Continued)

OTHER PUBLICATIONS

Notice of Allowance mailed Feb. 10, 2009 for U.S. Appl. No. 11/442,679.

(Continued)

*Primary Examiner* — Rodney B White
(74) *Attorney, Agent, or Firm* — Plumsea Law Group, LLC

(57) ABSTRACT

A composite element includes a base layer, a thermoplastic polymer material, a thread, and a cover layer. The base layer has a first surface and an opposite second surface. The polymer material is separate from the base layer, extends into the base layer, and is at least partially located at the first surface. The thread has a section lying adjacent to the first surface layer and substantially parallel to the first surface throughout a distance of at least five centimeters, and the thread is bonded to the base layer with the polymer material. The cover layer is located adjacent to the first surface and bonded to the base layer with the polymer material, and the section of the thread is located between the cover layer and the base layer.

18 Claims, 43 Drawing Sheets

U.S. PATENT DOCUMENTS

| | | | |
|---|---|---|---|
| D405,587 S | 2/1999 | Merikoski | |
| 5,930,918 A | 8/1999 | Healy | |
| 5,990,378 A | 11/1999 | Ellis | |
| 6,003,247 A | 12/1999 | Steffe | |
| 6,004,891 A | 12/1999 | Tuppin et al. | |
| 6,009,637 A | 1/2000 | Pavone | |
| 6,029,376 A | 2/2000 | Cass | |
| 6,038,702 A | 3/2000 | Knerr | |
| 6,128,835 A | 10/2000 | Ritter | |
| 6,151,804 A | 11/2000 | Hieblinger | |
| 6,164,228 A | 12/2000 | Lin | |
| 6,170,175 B1 | 1/2001 | Funk | |
| 6,213,634 B1 | 4/2001 | Harrington et al. | |
| 6,378,230 B1* | 4/2002 | Rotem et al. | 36/50.1 |
| 6,615,427 B1 | 9/2003 | Hailey | |
| 6,665,958 B2 | 12/2003 | Goodwin | |
| 6,718,895 B1 | 4/2004 | Fortuna | |
| 6,860,214 B1 | 3/2005 | Wang | |
| 6,910,288 B2 | 6/2005 | Dua | |
| 7,086,179 B2 | 8/2006 | Dojan | |
| 7,086,180 B2 | 8/2006 | Dojan | |
| 7,100,310 B2 | 9/2006 | Foxen | |
| 7,293,371 B2 | 11/2007 | Aveni | |
| 7,337,560 B2 | 3/2008 | Marvin et al. | |
| 7,546,698 B2* | 6/2009 | Meschter | 36/45 |
| 7,703,218 B2* | 4/2010 | Burgess | 36/45 X |
| 7,793,434 B2* | 9/2010 | Sokolowski et al. | 36/45 |
| 7,814,852 B2* | 10/2010 | Meschter | 112/475.01 |
| 7,870,681 B2* | 1/2011 | Meschter | 36/45 |
| 7,870,682 B2* | 1/2011 | Meschter et al. | 36/45 |
| 8,008,599 B2* | 8/2011 | Meschter | 36/45 X |
| 8,028,440 B2* | 10/2011 | Sokolowski et al. | 36/45 X |
| 2003/0178738 A1 | 9/2003 | Staub et al. | |
| 2004/0074589 A1 | 4/2004 | Gessler et al. | |
| 2004/0142631 A1 | 7/2004 | Luk | |
| 2004/0181972 A1* | 9/2004 | Csorba | 36/50.1 |
| 2004/0261295 A1 | 12/2004 | Meschter | |
| 2005/0028403 A1 | 2/2005 | Swigart | |
| 2005/0115284 A1 | 6/2005 | Dua | |
| 2005/0132609 A1 | 6/2005 | Dojan | |
| 2005/0268497 A1 | 12/2005 | Alfaro | |
| 2006/0048413 A1 | 3/2006 | Sokolowski | |
| 2006/0137221 A1 | 6/2006 | Dojan | |
| 2006/0283042 A1* | 12/2006 | Greene et al. | 36/45 X |
| 2007/0199210 A1 | 8/2007 | Vattes et al. | |
| 2007/0271821 A1* | 11/2007 | Meschter | 36/45 |
| 2007/0271822 A1* | 11/2007 | Meschter | 36/45 |
| 2007/0271823 A1* | 11/2007 | Meschter | 36/45 |
| 2008/0022554 A1* | 1/2008 | Meschter et al. | 36/45 |
| 2008/0047165 A1* | 2/2008 | Keen | 36/50.1 |
| 2008/0110049 A1 | 5/2008 | Sokolowski et al. | |
| 2009/0133287 A1* | 5/2009 | Meschter | 36/45 X |
| 2010/0018075 A1* | 1/2010 | Meschter et al. | 36/45 |
| 2010/0154256 A1* | 6/2010 | Dua | 36/45 X |
| 2010/0263236 A1* | 10/2010 | Carboy et al. | 36/117.1 |
| 2011/0192058 A1* | 8/2011 | Beers et al. | 36/50.1 X |
| 2011/0192059 A1* | 8/2011 | Spanks et al. | 36/50.1 X |

FOREIGN PATENT DOCUMENTS

| | | |
|---|---|---|
| DE | 20215559 | 1/2003 |
| EP | 0082824 | 6/1983 |
| EP | 0818289 A2 | 1/1998 |
| FR | 1462349 A | 10/1965 |
| FR | 1462349 | 2/1967 |
| FR | 2457651 A1 | 12/1980 |
| WO | 98/43506 A | 10/1998 |
| WO | 9843506 | 10/1998 |
| WO | 9843506 A1 | 10/1998 |
| WO | 03/013301 A1 | 2/2003 |
| WO | 03013301 A1 | 2/2003 |
| WO | WO2007/100055 | 12/2007 |
| WO | WO2007/139567 | 12/2007 |

OTHER PUBLICATIONS

Office Action mailed Nov. 24, 2008 for U.S. Appl. No. 11/442,669.
Office Action mailed Dec. 8, 2008 for U.S. Appl. No. 11/442,679.
Notice of Allowability mailed Feb. 10, 2009 for U.S. Appl. No. 11/442,679.
Notice of Allowability mailed Apr. 15, 2009 for U.S. Appl. No. 11/442,669.
Office Action mailed Jan. 27, 2010 for U.S. Appl. No. 11/441,924.
Office Action mailed Feb. 19, 2010 for U.S. Appl. No. 12/362,371.
Office Action mailed Feb. 24, 2010 for U.S. Appl. No. 12/180,342.
U.S. Appl. No. 11/442,669, filed May 25, 2006, and entitled "Article of Footwear Having an Upper With Thread Structural Elements," issued as U.S. Patent No. 7,574,818 on Aug. 18, 2009.
U.S. Appl. No. 11/442,679, filed May 25, 2006, and entitled "Article of Footwear Having an Upper With Thread Structural Elements," issued as U.S. Patent No. 7,546,698 on Jun. 16, 2009.
U.S. Appl. No. 11/441,924, filed May 25, 2006, and entitled "Article of Footwear Having an Upper With Thread Structural Elements."
U.S. Appl. No. 11/838,011, filed Aug. 13, 2007, and entitled "Article of Footwear Having an Upper With Thread Structural Elements."
U.S. Appl. No. 12/180,342, filed Jul. 25, 2008, and entitled "Article of Footwear Having an Upper With Thread Structural Elements."
U.S. Appl. No. 12/362,371, filed Jan. 29, 2009, and entitled "Article of Footwear Having an Upper With Thread Structural Elements."
U.S. Appl. No. 12/419,987, filed Apr. 7, 2009, and entitled "Footwear Incorporating Crossed Tensile Strand Elements."
U.S. Appl. No. 12/419,985, filed Apr. 7, 2009, and entitled "Method for Molding Tensile Strand Elements."
U.S. Appl. No. 12/505,740, filed Jul. 20, 2009, and entitled "Material Elements Incorporating Tensile Strands."
U.S. Appl. No. 12/546,017, filed Aug. 24, 2009, and entitled "Article of Footwear Incorporating a Tensile Element."
U.S. Appl. No. 12/546,019, filed Aug. 24, 2009, and entitled "Article of Footwear Having an Upper Incorporating a Tensile Strand With a Cover Layer."
U.S. Appl. No. 12/546,022, filed Aug. 24, 2009, and entitled "Article of Footwear Incorporating Tensile Strands and Securing Strands."
Office Action mailed Jan. 31, 2011 for Chinese Invention Patent Application No. 200910150171.1.
International Search Report and Written Opinion for PCT/US2007/066696, mailed Sep. 7, 2007.
Invitation to Pay Additional Fees and Partial International Search for PCT/US2007/066701, mailed Oct. 18, 2007.
International Search Report and Written Opinion for PCT/US2009/045416, mailed on Aug. 5, 2010.
Office Action mailed Dec. 8, 2008 for U.S. Appl. No. 11/442,669.

* cited by examiner

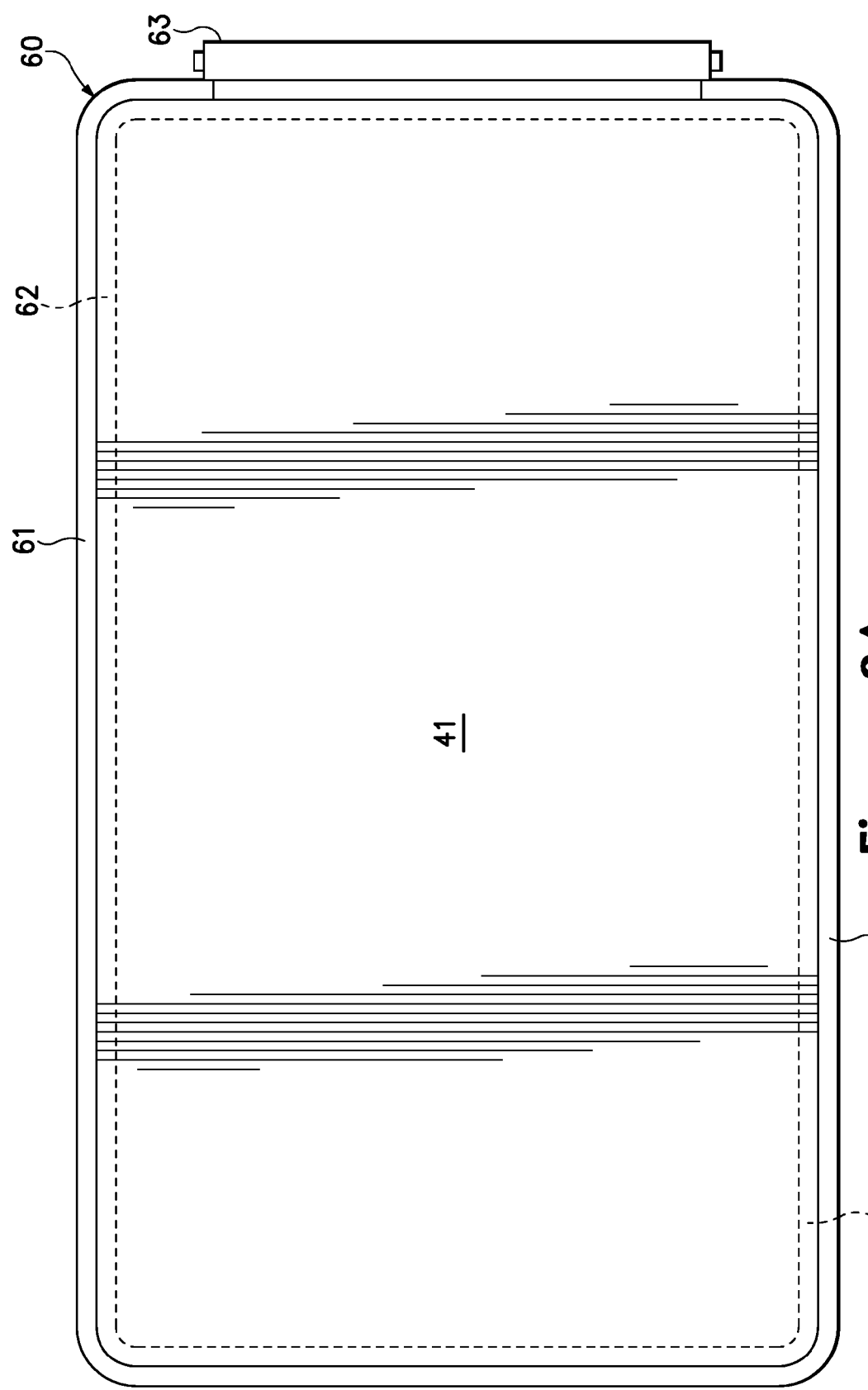

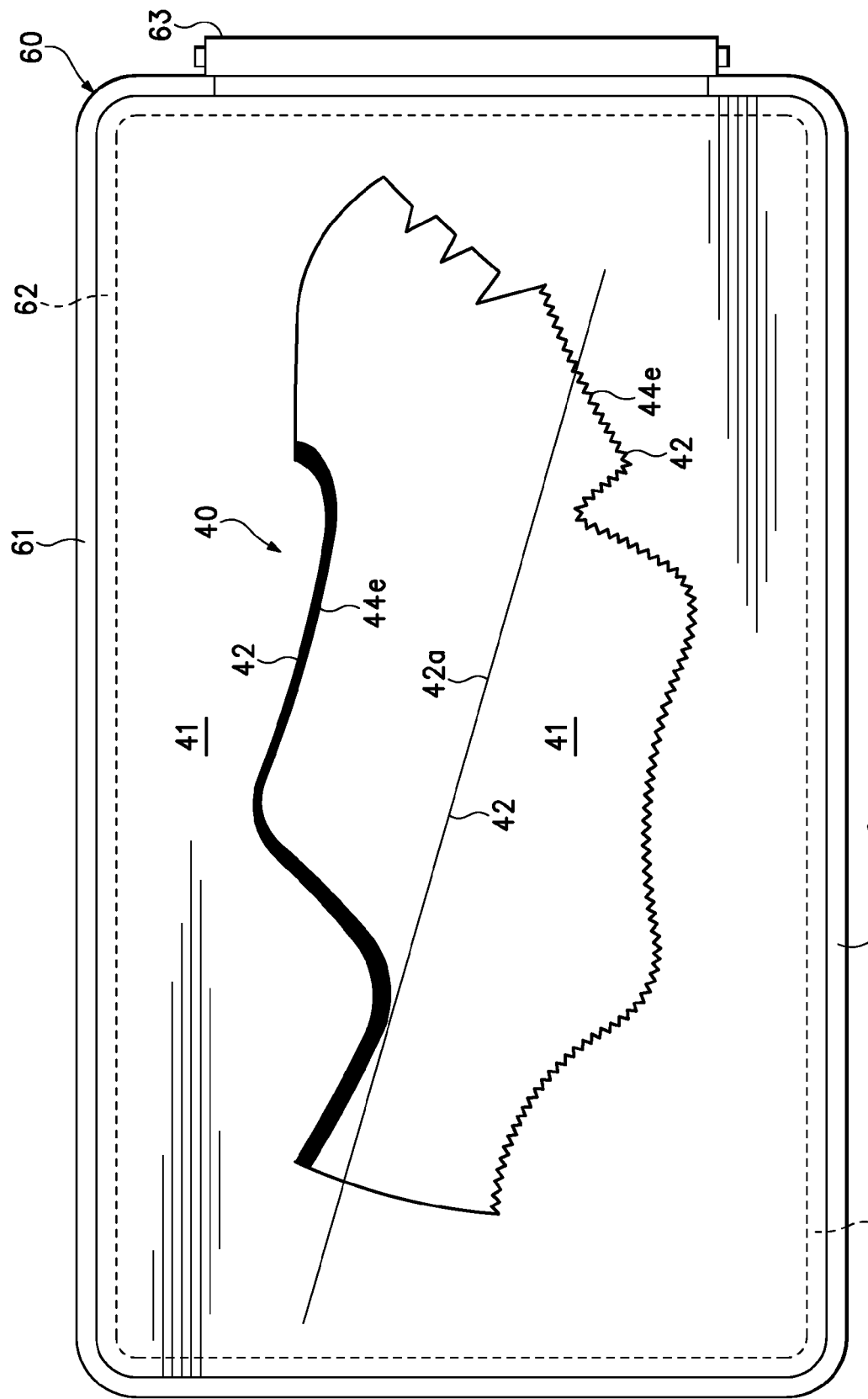

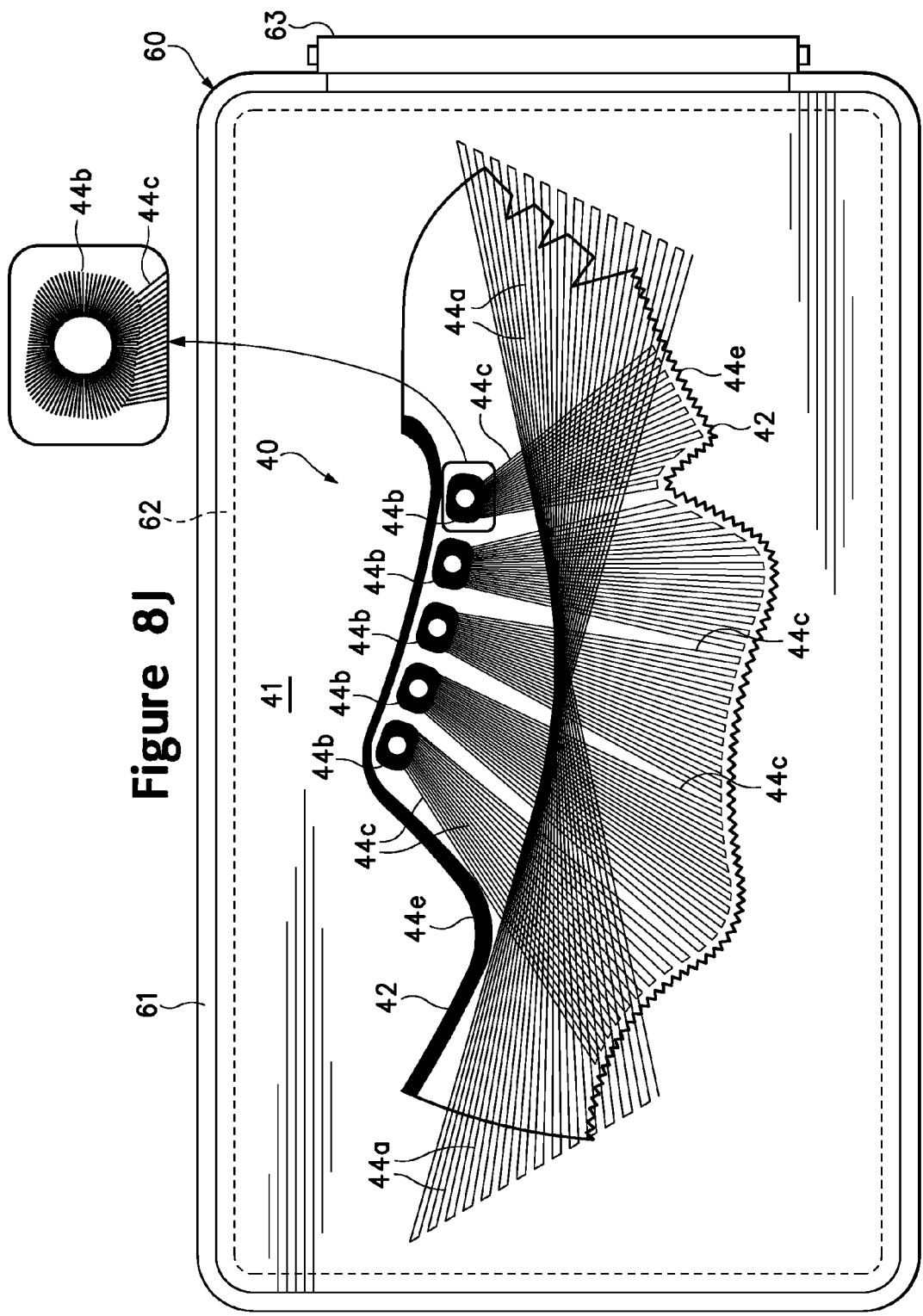

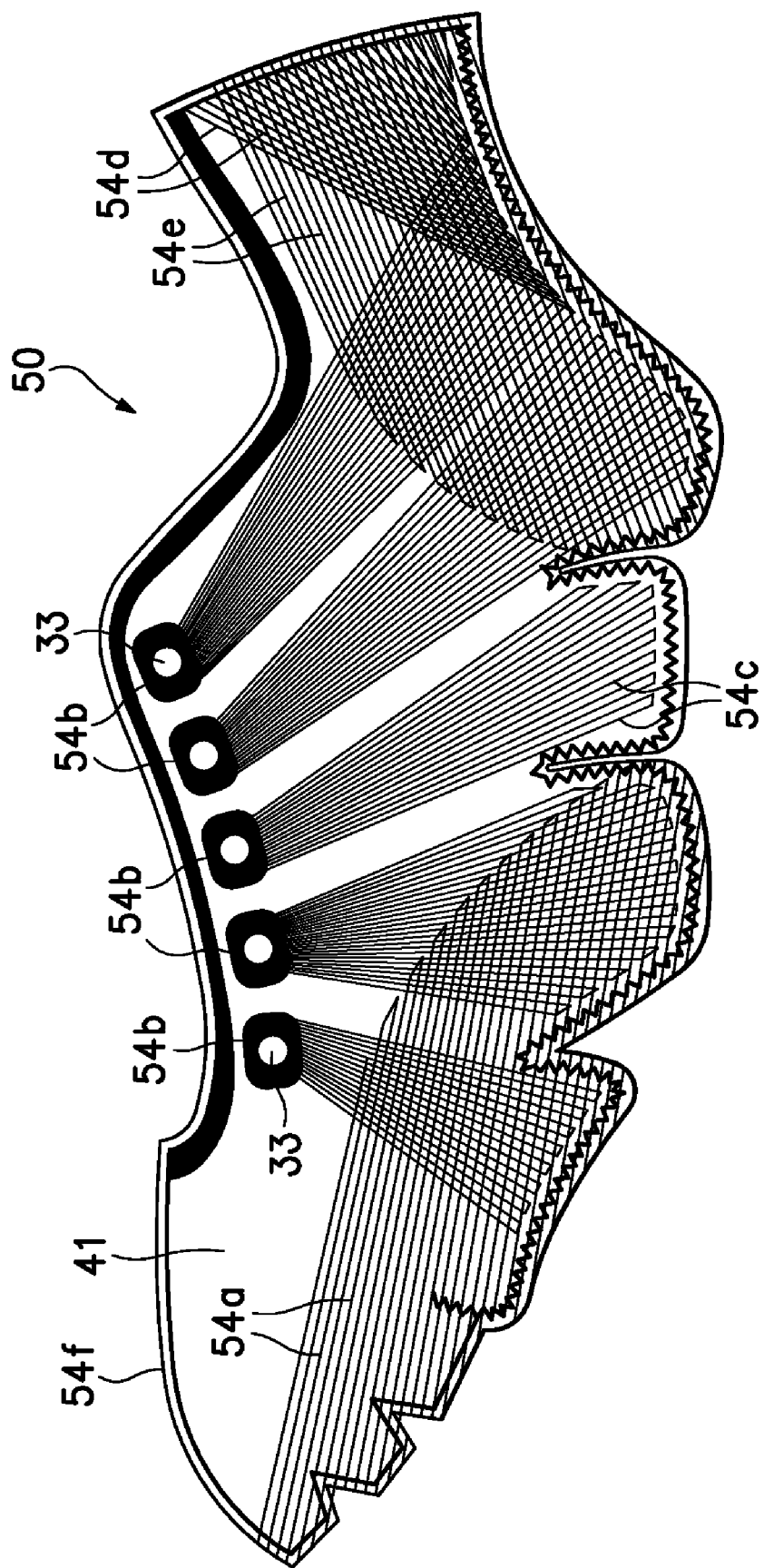

COMPOSITE ELEMENT WITH A POLYMER CONNECTING LAYER

BACKGROUND

Conventional articles of footwear generally include two primary elements, an upper and a sole structure. The upper is secured to the sole structure and forms a void on the interior of the footwear for comfortably and securely receiving a foot. The sole structure is secured to a lower surface of the upper so as to be positioned between the upper and the ground. In some articles of athletic footwear, for example, the sole structure may include a midsole and an outsole. The midsole may be formed from a polymer foam material that attenuates ground reaction forces to lessen stresses upon the foot and leg during walking, running, and other ambulatory activities. The outsole is secured to a lower surface of the midsole and forms a ground-engaging portion of the sole structure that is formed from a durable and wear-resistant material. The sole structure may also include a sockliner positioned within the void and proximal a lower surface of the foot to enhance footwear comfort.

The upper generally extends over the instep and toe areas of the foot, along the medial and lateral sides of the foot, and around the heel area of the foot. In some articles of footwear, such as basketball footwear and boots, the upper may extend upward and around the ankle to provide support for the ankle. Access to the void on the interior of the upper is generally provided by an ankle opening in a heel region of the footwear. A lacing system is often incorporated into the upper to adjust the fit of the upper, thereby permitting entry and removal of the foot from the void within the upper. The lacing system also permits the wearer to modify certain dimensions of the upper, particularly girth, to accommodate feet with varying dimensions. In addition, the upper may include a tongue that extends under the lacing system to enhance adjustability of the footwear, and the upper may incorporate a heel counter to limit movement of the heel.

Various materials are conventionally utilized in manufacturing the upper. The upper of athletic footwear, for example, may be formed from multiple material layers that include an exterior layer, an intermediate layer, and an interior layer. The materials forming the exterior layer of the upper may be selected based upon the properties of stretch-resistance, wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each impart different properties to the upper. The intermediate layer of the upper is conventionally formed from a lightweight polymer foam material that provides cushioning and enhances comfort. Similarly, the interior layer of the upper may be formed of a comfortable and moisture-wicking textile that removes perspiration from the area immediately surrounding the foot. In some articles of athletic footwear, the various layers may be joined with an adhesive, and stitching may be utilized to join elements within a single layer or to reinforce specific areas of the upper. Accordingly, the conventional upper has a layered configuration, and the individual layers each impart different properties to various areas of the footwear.

SUMMARY

A composite element is described below as including a base layer, a thermoplastic polymer material, a thread, and a cover layer. The base layer has a first surface and an opposite second surface, and the base layer stretches at least thirty percent prior to tensile failure. The polymer material is separate from the base layer and extends into the base layer, and the polymer material is at least partially located at the first surface of the base layer. The thread has a section lying adjacent to the first surface of the base layer and substantially parallel to the first surface of the base layer throughout a distance of at least five centimeters, and the thread is bonded to the base layer with the polymer material. The cover layer is located adjacent to the first surface of the base layer and bonded to the base layer with the polymer material, and the section of the thread is located between the cover layer and the base layer.

A method of manufacturing a composite element is also described below. The method includes incorporating a polymer material into a textile layer such that the polymer material is located at a first surface and an opposite second surface of the textile layer. The textile layer is embroidered with a thread such that a section of the thread lies adjacent to the textile layer and substantially parallel to the textile layer throughout a distance of at least five centimeters. A cover layer is located adjacent to the first surface of the textile layer such that the section of the thread is located between the textile layer and the cover layer. The polymer material is heated to bond the section of the thread and the cover layer to the textile layer.

The advantages and features of novelty characterizing various aspects of the invention are pointed out with particularity in the appended claims. To gain an improved understanding of the advantages and features of novelty, however, reference may be made to the following descriptive matter and accompanying drawings that describe and illustrate various embodiments and concepts related to the aspects of the invention.

FIGURE DESCRIPTIONS

The foregoing Summary, as well as the following Detailed Description, will be better understood when read in conjunction with the accompanying drawings.

DETAILED DESCRIPTION

Introduction

The following discussion and accompanying figures disclose an article of footwear having an upper with an embroidered configuration. In addition, various methods of manufacturing the upper are disclosed. The upper and the methods are disclosed with reference to footwear having a configuration that is suitable for running, and particularly sprinting. Concepts associated with the upper are not limited solely to footwear designed for running, however, and may be applied to a wide range of athletic footwear styles, including baseball shoes, basketball shoes, cross-training shoes, cycling shoes, football shoes, tennis shoes, soccer shoes, walking shoes, and hiking boots, for example. The concepts may also be applied to footwear styles that are generally considered to be non-athletic, including dress shoes, loafers, sandals, and work boots. The concepts disclosed herein apply, therefore, to a wide variety of footwear styles. Additionally, the concepts disclosed herein may be applied to products other than footwear, including apparel, bags and other containers, and athletic equipment, for example.

General Footwear Structure

Figure 1:
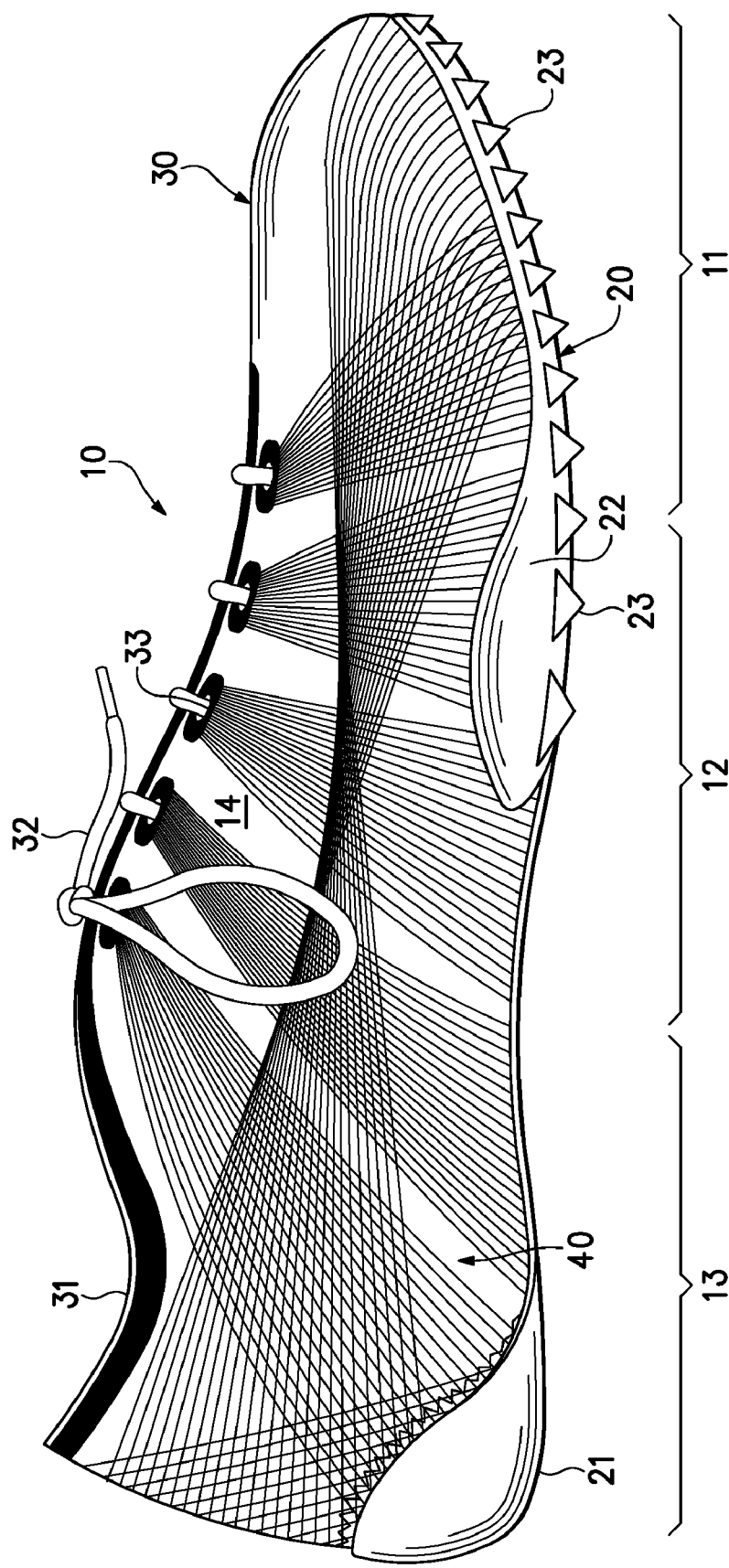
FIG. 1 is a lateral side elevational view of an article of footwear having an upper in accordance with aspects of the present invention.
Figure 2:
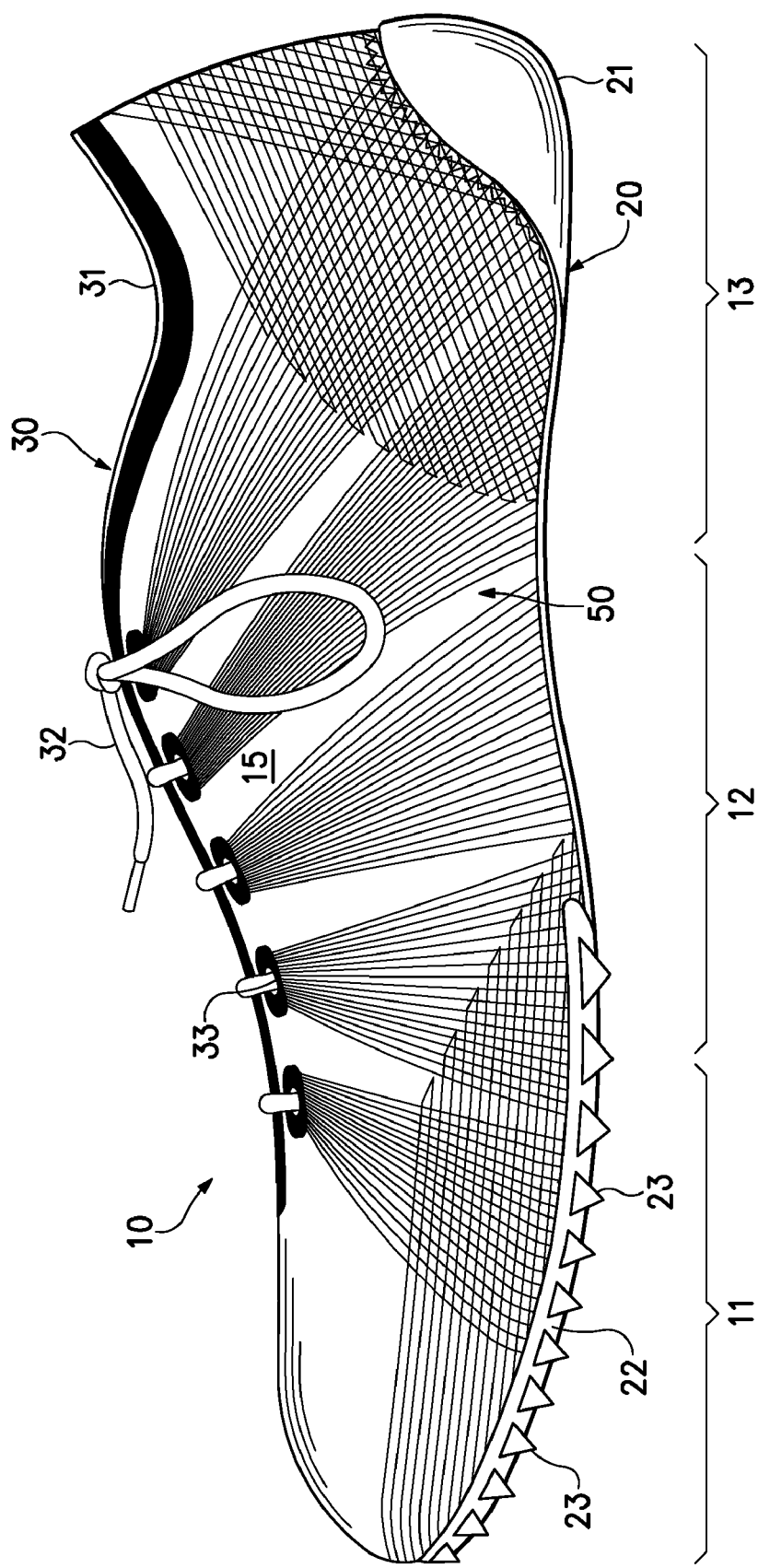
FIG. 2 is a medial side elevational view of the article of footwear.
Figure 3:
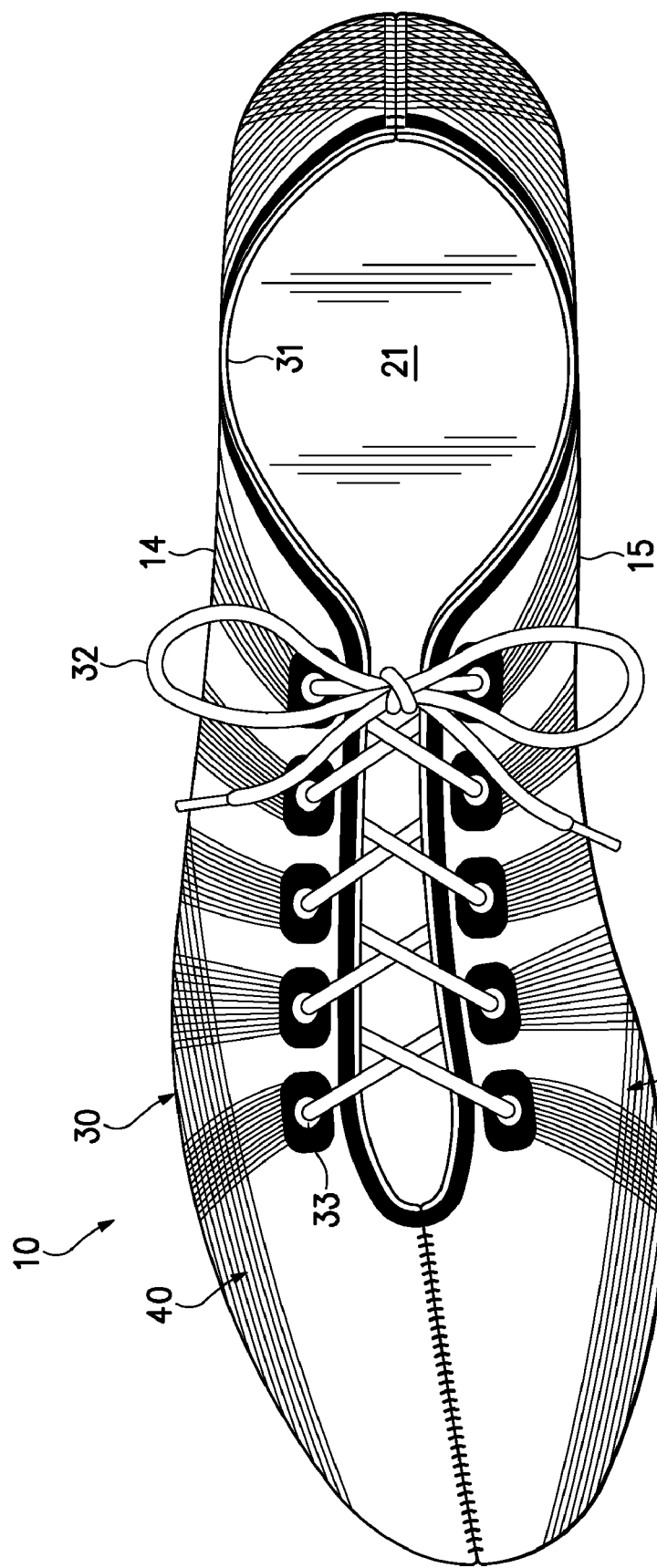
FIG. 3 is a top plan view of the article of footwear.
Figure 4:
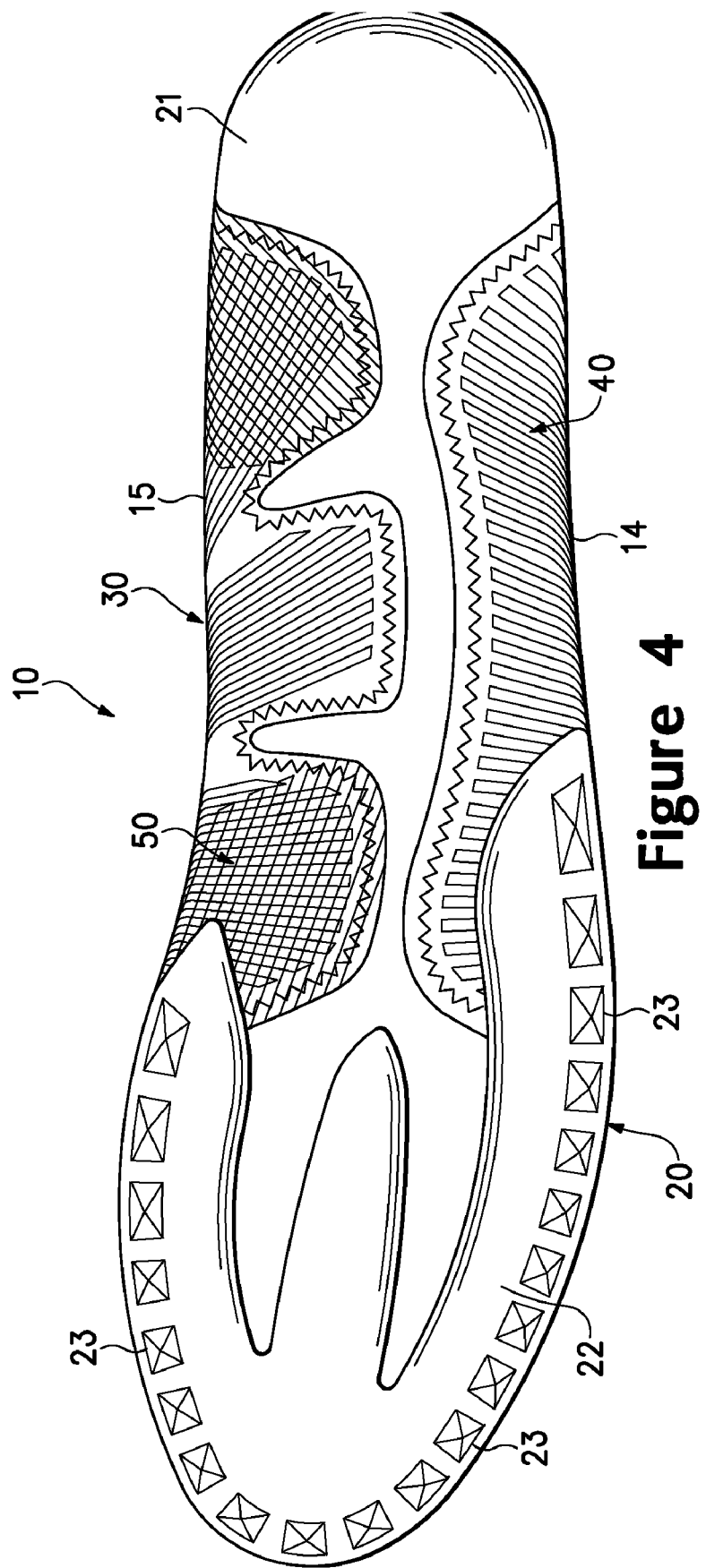
FIG. 4 is a bottom plan view of the article of footwear.
Figure 5:
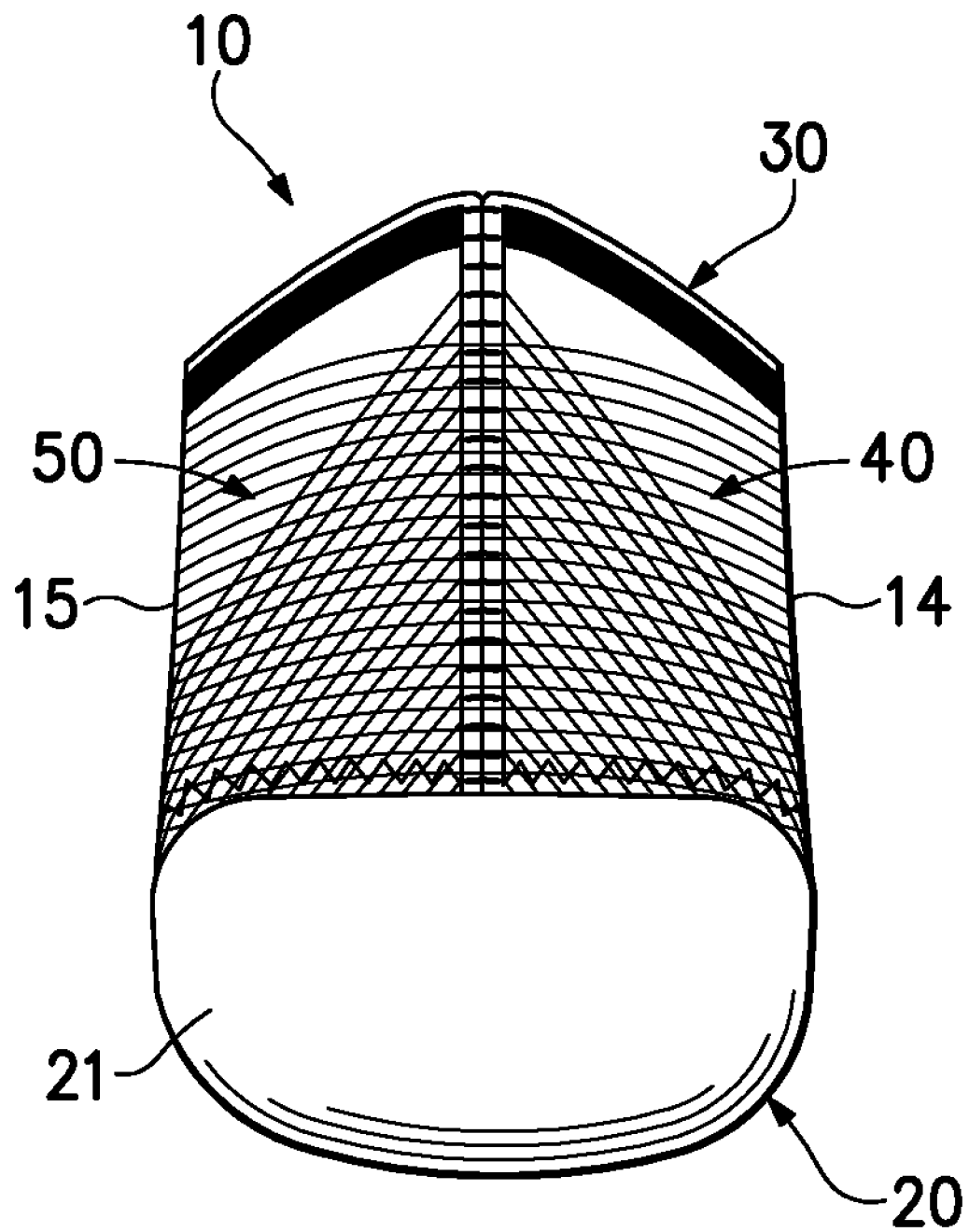
FIG. 5 is a rear elevational view of the article of footwear.

An article of footwear 10 is depicted in FIGS. 1-5 as having the general configuration of a running shoe and includes a sole structure 20 and an upper 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to sole structure 20, upper 30, and individual elements thereof.

Sole structure 20 is secured to upper 30 and extends between the foot and the ground when footwear 10 is worn. In addition to providing traction, sole structure 20 may attenuate ground reaction forces when compressed between the foot and the ground during walking, running, or other ambulatory activities. The configuration of sole structure 20 may vary significantly to include a variety of conventional or nonconventional structures. As an example, however, a suitable configuration for sole structure 20 is depicted in FIGS. 1 and 2, for example, as including a first sole element 21 and a second sole element 22.

First sole element 21 extends through a longitudinal length of footwear 10 (i.e., through each of regions 11-13) and may be formed from a polymer foam material, such as polyurethane or ethylvinylacetate. Portions of upper 30 wrap around sides of first sole element 21 and are secured to a lower area of first sole element 21. In each of regions 11-13, the lower area of first sole element 21 is exposed to form a portion of a ground-contacting surface of footwear 10. The portions of upper 30 that are secured to the lower area of first sole element 21 are also exposed in regions 12 and 13 and may contact the ground during use. An upper area of first sole element 21 is positioned to contact a lower (i.e., plantar) surface of the foot and forms, therefore, a foot-supporting surface within upper 30. In some configurations, however, a sockliner may be located within upper 30 and adjacent the upper area of first sole element 21 to form the foot-supporting surface of footwear 10.

Second sole element 22 is located in each of regions 11 and 12 and is secured to either or both of first sole element 21 and upper 30. Whereas portions of first sole element 21 extend into upper 30, second sole element 22 is positioned on an exterior of footwear 10 to form a portion of the ground-contacting surface in regions 11 and 12. In order to impart traction, second sole element 22 includes a plurality of projections 23, which may have the configuration of removable spikes. Suitable materials for second sole element 22 include a variety of rubber or other polymer materials that are both durable and wear-resistant.

Upper 30 defines a void within footwear 10 for receiving and securing the foot relative to sole structure 20. More particularly, the void is shaped to accommodate a foot and extends along the lateral side of the foot, along the medial side of the foot, over the foot, and under the foot. Access to the void is provided by an ankle opening 31 located in at least heel region 13. A lace 32 extends through various lace apertures 33 in upper 30 and permits the wearer to modify dimensions of upper 30 to accommodate feet with varying proportions. Lace 32 also permits the wearer to loosen upper 30 and facilitate removal of the foot from the void. Although not depicted, upper 30 may include a tongue that extends under lace 32 to enhance the comfort or adjustability of footwear 10.

The primary elements of upper 30, in addition to lace 32, are a first embroidered element 40 and a second embroidered element 50. First embroidered element 40 forms portions of upper 30 corresponding with lateral side 14, and second embroidered element 50 forms portions of upper 30 corresponding with medial side 15. Accordingly, each of embroidered elements 40 and 50 extend through each of regions 11-13. In general, and as described in greater detail below, upper 30 is substantially assembled by joining edges of embroidered elements 40 and 50 in forefoot region 11 and heel region 13 to impart a general shape of the void. In addition, assembling upper 30 involves incorporating lace 32 and wrapping portions of embroidered elements 40 and 50 around the sides of first sole element 21 and securing the portions to the lower area of first sole element 21.

First Embroidered Element

Figure 6:
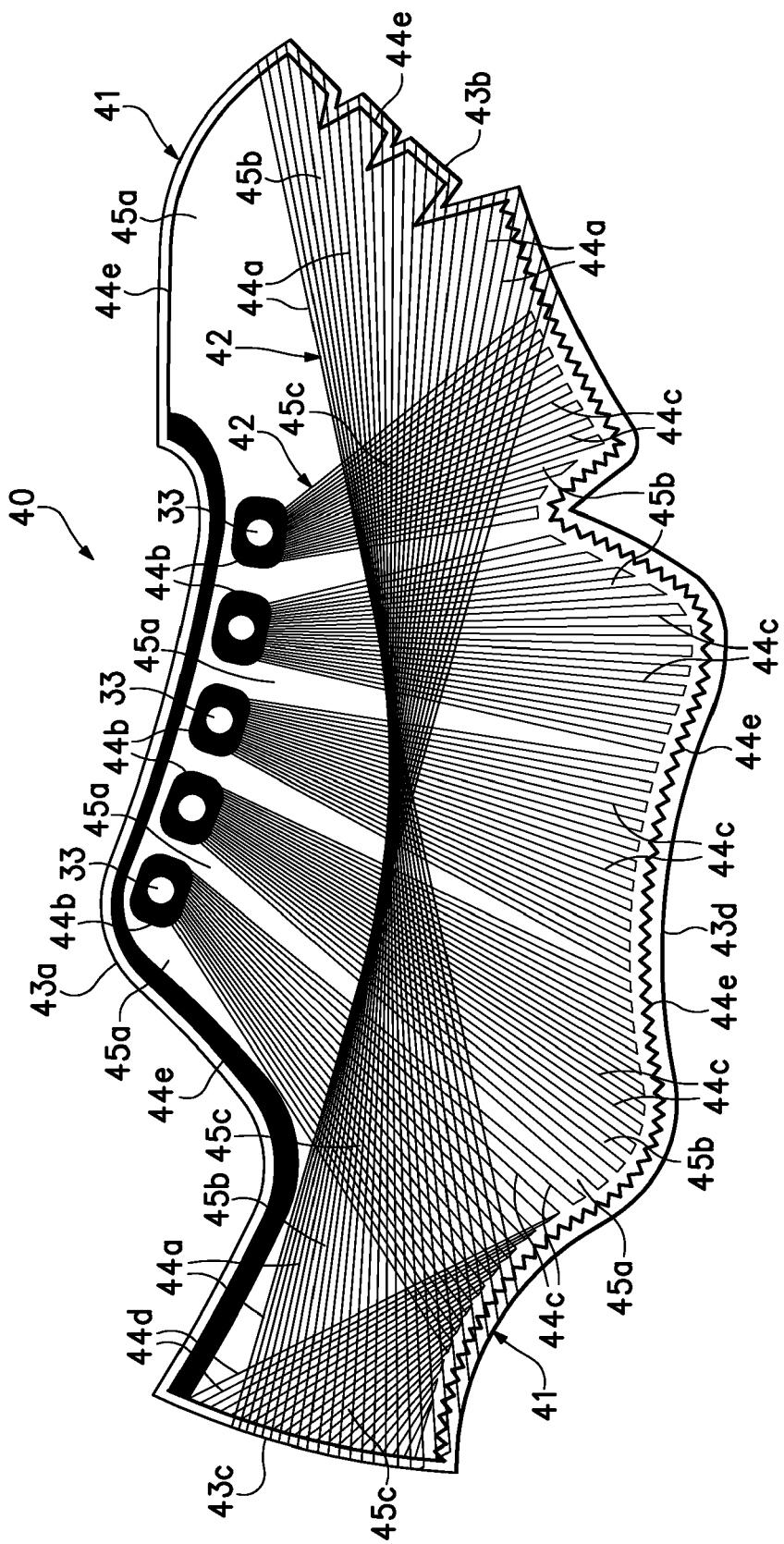
FIG. 6 is a top plan view of a first embroidered element that forms at least a portion of a lateral side of the upper.

First embroidered element 40 is depicted individually in FIG. 6 as including a base layer 41 and a plurality of threads 42. An embroidery process, which will be described in greater detail below, is utilized to secure or locate threads 42 relative to base layer 41. In general, base layer 41 is a substrate to which threads 42 are secured during the embroidery process, and threads 42 are located to form structural elements in upper 30. As structural elements, threads 42 may limit the stretch of upper 30 in particular directions or threads 42 may reinforce areas of upper 30, for example.

Although base layer 41 is depicted as a single element of material, base layer 41 may be formed from a plurality of joined elements. Similarly, base layer 41 may be a single layer of material, or base layer may be formed from multiple coextensive layers. As an example, base layer 41 may include a connecting layer or other securing element that bonds, secures, or otherwise joins portions of threads 42 to base layer 41.

Base layer 41 defines various edges 43a-43d that are utilized for reference in the following material. Edge 43a extends through each of regions 11-13 and defines a portion of ankle opening 31. Edge 43b is primarily located in forefoot region 11 and forms end points for various threads 42. Edge 43c, which is located opposite edge 43b, is primarily located in heel region 13 and forms an opposite end point for the various threads 42. Edges 43a and 43c respectively join with second embroidered element 50 in forefoot region 11 and heel region 13 during the manufacture of footwear 10. Edge 43d, which is located opposite edge 43a, extends through each of regions 11-13 and wraps around first sole element 21 and is secured to the lower area of first sole element 21. The specific configuration of base layer 41, and the corresponding positions and shapes of edges 43a-43d, may vary significantly depending upon the configuration of footwear 10.

Base layer 41 may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for base layer 41 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven fabric. The textiles may incorporate fibers that are arranged to impart one-directional stretch or multi-directional stretch, and the textiles may include coatings that form a breathable and water-resistant barrier, for example. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for base layer 41. Although two-dimensional materials may have smooth or generally untextured surfaces, some two-dimensional materials will exhibit textures or other surface characteristics, such as dimpling, protrusions, ribs, or various patterns, for example. Despite the presence of surface characteristics, two-dimensional materials remain generally flat and exhibit a length and a width that are substantially greater than a thickness.

Portions of threads 42 extend through base layer 41 or lie adjacent to base layer 41. In areas where threads 42 extend through base layer 41, threads 42 are directly joined or otherwise secured to base layer 41. In areas where threads 42 lie adjacent to base layer 41, threads 42 may be unsecured to base layer 41 or may be joined with a connecting layer or other securing element that bonds, secures, or otherwise joins portions of threads 42 to base layer 41. In order to form structural elements in upper 30, multiple threads 42 or sections of an individual thread 42 may be collected into one of various thread groups 44a-44e. Thread group 44a includes threads 42 that extend between edge 43b and edge 43c, thereby extending through each of regions 11-13 of footwear 10. Thread group 44b includes threads 42 that are positioned immediately adjacent to lace apertures 33 and extend radially-outward from lace apertures 33. Thread group 44c includes threads 42 that extend from thread group 44b (i.e., an area that is adjacent to lace apertures 33) to an area adjacent to edge 43d. Thread group 44d includes threads 42 that extend from edge 43c to edge 43d and are primarily located in heel region 13.

Article of footwear 10 is depicted as having the general configuration of a running shoe. During walking, running, or other ambulatory activities, forces induced in footwear 10 may tend to stretch upper 30 in various directions, and the forces may be concentrated at various locations. Each of threads 42 are located to form structural elements in upper 30. More particularly, thread groups 44a-44d are collections of multiple threads 42 or sections of an individual thread 42 that form structural elements to resist stretching in various directions or reinforce locations where forces are concentrated. Thread group 44a extends through the portions of first embroidered element 40 that correspond with regions 11-13 to resist stretch in a longitudinal direction (i.e., in a direction extending through each of regions 11-13 and between edges 43b and 43c). Thread group 44b is positioned adjacent to lace apertures 33 to resist force concentrations due to tension in lace 32. Thread group 44c extends in a generally orthogonal direction to thread group 44a to resist stretch in the medial-lateral direction (i.e., in a direction extending around upper 30). In addition, thread group 44d is located in heel region 13 to form a heel counter that limits movement of the heel. Thread group 44e extends around a periphery of base layer 41 and corresponds in location with edges 43a-43d. Accordingly, threads 42 are located to form structural elements in upper 30.

Threads 42 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for threads 42 include various filaments, fibers, and yarns, that are formed from rayon, nylon, polyester, polyacrylic, silk, cotton, carbon, glass, aramids (e.g., para-aramid fibers and meta-aramid fibers), ultra high molecular weight polyethylene, and liquid crystal polymer. Yarns may be formed from at least one filament or a plurality of fibers. Whereas filaments have an indefinite length, fibers have a relatively short length and generally go through spinning or twisting processes to produce a yarn of suitable length. Although filaments and fibers may have different lengths, for example, the terms "filament" and "fiber" may be used interchangeably herein. With regarding to yarns formed from filaments, these yarns may be formed from a single filament or a plurality of individual filaments grouped together. Yarns may also include separate filaments formed from different materials, or yarns may include filaments that are each formed from two or more different materials. Similar concepts also apply to yarns formed from fibers. Accordingly, filaments and yarns may have a variety of configurations exhibiting a length that is substantially greater than a width and a thickness. In addition to filaments and yarns, other one-dimensional materials may be utilized for threads 42. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

Second Embroidered Element

Figure 7:
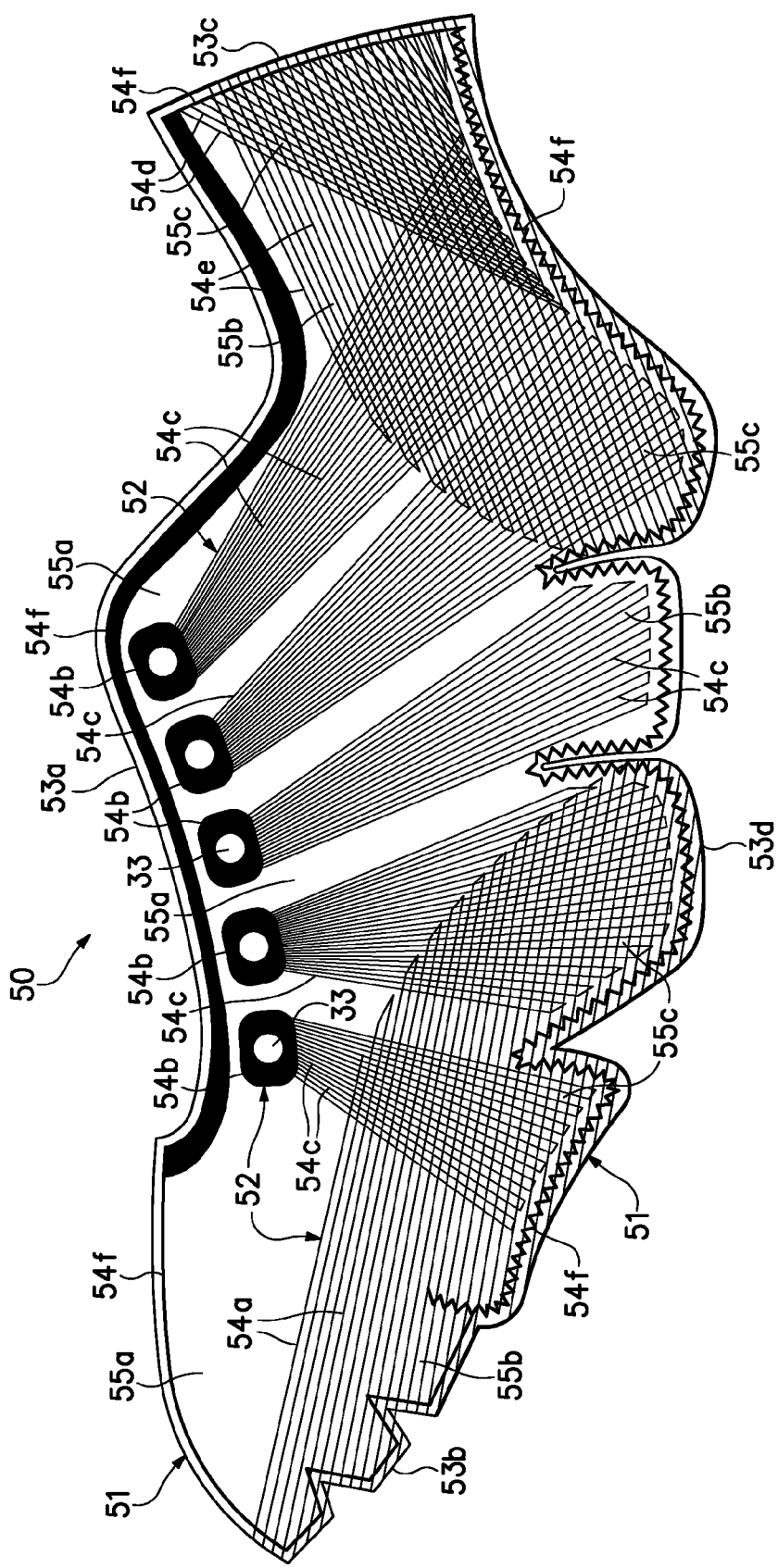
FIG. 7 is a top plan view of a second embroidered element that forms at least a portion of a medial side of the upper.

Second embroidered element 50 is depicted individually in FIG. 7 as including a base layer 51 and a plurality of threads 52. An embroidery process, which is similar to the embroidery process utilized to form first embroidered element 50, is utilized to secure or locate threads 52 relative to base layer 51. In general, base layer 51 is a substrate to which threads 52 are secured during the embroidery process, and threads 52 are located to form structural elements in upper 30. As structural elements, threads 52 may limit the stretch of upper 30 in particular directions or threads 52 may reinforce areas of upper 30, for example.

Base layer 51 may be formed from any generally two-dimensional material, including any of the two-dimensional materials discussed above for base layer 41. Although base layer 51 is depicted as a single element of material, base layer 51 may be formed from a plurality of joined elements. Similarly, base layer 51 may be a single layer of material, or base layer may be formed from multiple coextensive layers. As an example, base layer 51 may include a connecting layer or other securing element that bonds, secures, or otherwise joins portions of threads 52 to base layer 51. Furthermore, threads 52 may be formed from any generally one-dimensional material, including any of the one-dimensional materials discussed above for threads 42.

Base layer 51 defines various edges 53a-53d that are utilized for reference in the following material. Edge 53a extends through each of regions 11-13 and defines a portion of ankle opening 31. Edge 53b is primarily located in forefoot region 11 and forms end points for various threads 52. Edge 53c, which is located opposite edge 53b, is primarily located in heel region 13 and forms an opposite end point for the various threads 52. Edges 53a and 53c respectively join with second embroidered element 40 in forefoot region 11 and heel region 13 during the manufacture of footwear 10. Edge 53d, which is located opposite edge 53a, extends through each of regions 11-13 and wraps around first sole element 21 and is secured to the lower area of first sole element 21. The specific configuration of base layer 51, and the corresponding positions and shapes of edges 53a-53d, may vary significantly depending upon the configuration of footwear 10.

Portions of threads 52 may extend through base layer 51 or lie adjacent to base layer 51. In areas where threads 52 extend through base layer 51, threads 52 are directly joined or otherwise secured to base layer 51. In areas where threads 52 lie adjacent to base layer 51, threads 52 may be unsecured to base layer 51 or may be joined with a connecting layer or other securing element that bonds, secures, or otherwise joins portions of threads 52 to base layer 51. In order to form structural elements in upper 30, multiple threads 52 or sections of an individual thread 52 may be collected into one of various thread groups 54a-54e. Thread group 54a includes threads 52 located in forefoot region 11 and forward portions of midfoot region 12, and the various threads 52 in thread group 54a extend rearward and in the longitudinal direction from edge 53b. Thread group 54b includes threads 52 that are positioned immediately adjacent to lace apertures 33 and extend radially-outward from lace apertures 33. Thread group 54c includes threads 52 that extend from thread group 54b (i.e., an area that is adjacent to lace apertures 33) to an area adjacent to edge 53d. Thread group 54d includes threads 52 that extend from edge 53c to edge 53d and are primarily located in heel region 13. Thread group 54e includes threads 52 located in heel region 13 and rearward portions of midfoot region 12, and the various threads 52 in thread group 54e extend forward and in the longitudinal direction from edge 53c. Thread group 54f extends around a periphery of base layer 51 and corresponds in location with edges 53a-53d.

As discussed with respect to first embroidered element 40, forces induced in footwear 10 may tend to stretch upper 30 in various directions, and the forces may be concentrated at various locations. Each of threads 52 are located to form structural elements in upper 30. More particularly, thread groups 54a-54e are collections of multiple threads 52 or sections of an individual thread 52 that form structural elements to resist stretching in various directions or reinforce locations where forces are concentrated. Thread group 54a extends through the portions of second embroidered element 50 that correspond with at least forefoot region 11 to resist stretch in a longitudinal direction. Thread group 54b is positioned adjacent to lace apertures 33 to resist force concentrations due to tension in lace 32. Thread group 54c extends in a generally orthogonal direction to thread groups 54a and 54e to resist stretch in the medial-lateral direction (i.e., in a direction extending around upper 30). Thread group 54d is located in heel region 13 to form an opposite side of the heel counter that limits movement of the heel. In addition, thread group 54e is located in at least heel region 13 to resist stretch in a longitudinal direction. Accordingly, threads 52 are located to form structural elements in upper 30.

Structural Elements

As discussed in the Background section above, a conventional upper may be formed from multiple material layers that each impart different properties to various areas of the upper. During use, an upper may experience significant tensile forces, and one or more layers of material are positioned in areas of the upper to resist the tensile forces. That is, individual layers may be incorporated into specific portions of the upper to resist tensile forces that arise during use of the footwear. As an example, a woven textile may be incorporated into an upper to impart stretch resistance in the longitudinal direction. A woven textile is formed from yarns that interweave at right angles to each other. If the woven textile is incorporated into the upper for purposes of longitudinal stretch-resistance, then only the yarns oriented in the longitudinal direction will contribute to longitudinal stretch-resistance, and the yarns oriented orthogonal to the longitudinal direction will not generally contribute to longitudinal stretch-resistance. Approximately one-half of the yarns in the woven textile are, therefore, superfluous to longitudinal stretch-resistance. As a further example, the degree of stretch-resistance required in different areas of the upper may vary. Whereas some areas of the upper may require a relatively high degree of stretch-resistance, other areas of the upper may require a relatively low degree of stretch-resistance. Because the woven textile may be utilized in areas requiring both high and low degrees of stretch-resistance, some of the yarns in the woven textile are superfluous in areas requiring the low degree of stretch-resistance. In each of these examples, the superfluous yarns add to the overall mass of the footwear, without adding beneficial properties to the footwear. Similar concepts apply to other materials, such as leather and polymer sheets, that are utilized for one or more of wear-resistance, flexibility, air-permeability, cushioning, and moisture-wicking, for example.

Based upon the above discussion, materials utilized in the conventional upper formed from multiple layers of material may have superfluous portions that do not significantly contribute to the desired properties of the upper. With regard to stretch-resistance, for example, a layer may have material that imparts (a) a greater number of directions of stretch-resistance or (b) a greater degree of stretch-resistance than is necessary or desired. The superfluous portions of these materials may, therefore, add to the overall mass of the footwear without contributing beneficial properties.

In contrast with the conventional layered construction, upper 30 is constructed to minimize the presence of superfluous material. Base layers 41 and 51 provide a covering for the foot, but exhibit a relatively low mass. Some of threads 42 and 52 (i.e., thread groups 44a, 54a, 44c, 54c, 44d, 54d, and 54e) are located to provide stretch-resistance in particular, desired directions, and the number of threads 42 and 52 are selected to impart only the desired degree of stretch-resistance. Other threads 42 and 52 (i.e., thread groups 44b, 44e, 54b, and 54f) are located to reinforce specific areas of upper 20. Accordingly, the orientations, locations, and quantity of threads 42 and 52 are selected to provide structural elements that are tailored to a specific purpose.

Each of thread groups 44a-44d and 54a-54e are groups of threads 42 and 52 that provide structural elements, as described above. More particularly, however, thread group 44a is located to provide longitudinal stretch-resistance on lateral side 14, and the number of threads 42 in thread group 44a is selected to provide a specific degree of stretch-resistance. Similarly, thread groups 54a and 54e are located to provide longitudinal stretch-resistance in regions 11 and 13 of medial side 15, and the number of threads 52 in thread groups 54a and 54e are selected to provide a specific degree of stretch-resistance in regions 11 and 13. Each of thread groups 44b and 54b reinforce lace apertures 33, and the numbers of threads around each lace aperture 33 is selected to provide specific degrees of reinforcement. Each of thread groups 44c and 54c extend from lace apertures 33 and are selected to provide a specific degree of stretch-resistance in a direction extending around upper 30, and the number of threads 42 in thread groups 44c and 54c is selected to provide a specific degree of stretch-resistance. Furthermore, thread groups 44d and 54d are located to form a heel counter, and the number of threads in thread groups 44d and 54d impart a specific degree of stability to the heel counter. Thread groups 44e and 54f reinforce edges of embroidered elements 40 and 50, including portions of embroidered elements 40 and 50 that form ankle opening 31 and portions of embroidered elements 40 and 50 that are joined to each other or to other portions of footwear 10. Accordingly, the properties imparted by threads 42 and 52 at least partially depend on the orientations, locations, and quantity of threads 42 and 52.

Depending upon the specific configuration of footwear 10 and the intended use of footwear 10, base layers 41 and 51 may be non-stretch materials, materials with one-directional stretch, or materials with two-directional stretch, for example. In general, materials with two-directional stretch provide upper 30 with a greater ability to conform with the contours of the foot, thereby enhancing the comfort of footwear 10. In configurations where base layers 41 and 51 have two-directional stretch, the combination of base layers 41 and 51 and threads 42 and 52 effectively vary the stretch characteristics of upper 30 in specific locations. With regard to first embroidered element 40, the combination of base layer 41 with two-directional stretch and threads 42 forms zones in upper 30 that have different stretch characteristics, and the zones include (a) first zones where no threads 42 are present and upper 30 exhibits two-directional stretch, (b) second zones where threads 42 are present and do not cross each other, and upper 30 exhibits one-directional stretch in a direction that is orthogonal to threads 42, and (c) third zones where threads 42 are present and do cross each other, and upper 30 exhibits substantially no stretch. Similar concepts apply to second embroidered element 50.

The first zones includes areas where no threads are present. Referring to FIG. 6, examples of the first zones are identified by reference numerals 45a and are locations where no threads 42 are present. Because threads 42 are not present in the first zones, base layer 41 is not restrained by threads 42 and upper 30 is free to stretch in two-directions. The second zones include areas where threads 42 are present, but do not cross each other at substantially right angles. Referring to FIG. 6, examples of the second zones are identified by reference numerals 45b. Because threads 42 are substantially aligned in the second zones, threads 42 resist stretch in the direction aligned with threads 42 lie. Threads 42 do not, however, resist stretch in directions orthogonal to threads 42. Accordingly, base layer 41 is free to stretch in the direction that is orthogonal to threads 42, thereby providing upper 30 with one-directional stretch. In some configurations, base layer 41 may stretch by at least ten percent in the direction that is orthogonal to threads 42, whereas base layer 41 is substantially non-stretch in the direction aligned with threads 42. The third zones include areas where threads 42 are present and cross each other at substantially right angles (i.e., at angles greater than sixty degrees). Referring to FIG. 6, examples of the third zones are identified by reference numerals 45c. Because threads 42 cross each other at substantially right angles, threads 42 resist stretch in substantially all directions. Accordingly, base layer 41 is not free to stretch in any direction, thereby providing a relatively non-stretch configuration to upper 30 in the third zones. Similar concepts apply to second embroidered element 50, and examples of areas corresponding with the first zones are identified by reference numerals 55a in FIG. 7, areas corresponding with the second zones are identified by reference numerals 55b in FIG. 7, and areas corresponding with the third zones are identified by reference numerals 55c in FIG. 7.

Transitions between the zones occur at interfaces between areas where the relative numbers and orientations of threads 42 and 52 change. At the interface between zones, upper 30 may change from having two-directional stretch to one-directional stretch, from having two-directional stretch to no stretch, or from having one-directional stretch to no stretch, for example. Given that the difference between zones is the relative numbers and orientations of threads 42 and 52, the transitions between zones may occur abruptly. That is, in the space of a thickness of one of threads 42 and 52, upper 30 may transition from one zone to another zone. Various structures may be employed to decrease the abruptness of a transition between zones. For example, threads 42 and 52 that are adjacent to a zone transition may have stretch characteristics. When transitioning from the first zone to the second zone, for example, the stretch characteristics of threads 42 and 52 at the interface will decrease the abruptness of the transition. Structurally, threads 42 and 52 adjacent to a transition (i.e., near the boundary of a thread group) may have greater stretch than threads 42 and 52 further from the transition (i.e., near the center of a thread group). In addition to stretch, threads 42 and 52 formed from a non-stretch material may have a crimped (i.e., zigzag) shape to permit degrees of stretch at the transition.

Threads 42 and 52 may be utilized to modify properties of footwear 10 other than stretch-resistance. For example, threads 42 and 52 may be utilized to provide additional wear-resistance in specific areas of upper 30. For example, threads 42 and 52 may be concentrated in areas of upper 30 that experience wear, such as in forefoot region 11 and adjacent to sole structure 20. If utilized for wear-resistance, threads 42 and 52 may be selected from materials that also exhibit relatively high wear-resistance properties. Threads 42 and 52 may also be utilized to modify the flex characteristics of upper 30. That is, areas with relatively high concentrations of threads 42 and 52 may flex to a lesser degree than areas with relatively low concentrations of threads 42 and 52. Similarly, areas with relatively high concentrations of threads 42 and 52 may be less air-permeable than areas with relatively low concentrations of threads 42 and 52.

The orientations, locations, and quantity of threads 42 and 52 in FIGS. 1-7 are intended to provide an example of a suitable configuration for footwear 10 within various aspects of the invention. In other configurations for footwear 10, various thread groups 44a-44d and 54a-54e may be absent, or additional thread groups may be present to provide further structural elements in footwear 10. If further longitudinal stretch-resistance is desired, then a thread group similar to thread group 44a may be included on medial side 14, or thread groups 54a and 54e may be modified to extend through midfoot region 12. If further stretch-resistance around upper 30 is desired, then additional threads 42 and 52 may be added to thread groups 44c and 54c. Similarly, further stretch-resistance around upper 30 may be provided by adding a thread group that extends around forefoot region 11 or a thread group that extends around heel region 13.

The running style or preferences of an individual may also determine the orientations, locations, and quantity of threads 42 and 52. For example, some individuals may have a relatively high degree of pronation (i.e., an inward roll of the foot), and having a greater number of threads 42 in thread group 44c may reduce the degree of pronation. Some individuals may also prefer greater longitudinal stretch resistance, and footwear 10 may be modified to include further threads 42 in thread group 44a. Some individuals may also prefer that upper 30 fit more snugly, which may require adding more threads 42 and 52 to thread groups 44b, 44c, 54b, and 44c. Accordingly, footwear 10 may be customized to the running style or preferences of an individual through changes in the orientations, locations, and quantity of threads 42 and 52.

Base layers 41 and 51 are depicted as having a configuration that cooperatively covers substantially all of the medial and lateral sides of the foot. As discussed above, base layers 41 and 51 are substrates to which threads 42 and 52 are secured during the embroidery process. In some configurations, however, portions of base layers 41 and 51 may be absent such that threads 42 and 52 are positioned immediately adjacent the foot or a sock worn over the foot. That is, base layers 41 and 51 may be formed with apertures or cut-outs that expose the foot. In other configurations, base layers 42 and 52 or portions thereof may be formed from a water-soluble material that is removed following the embroidery process. That is, upper 30 may be dissolved following securing threads 42 and 52 to base layers 41 and 51. Accordingly, base layers 41 and 51 may be partially or entirely absent in some configurations of footwear 10.

A majority of the overall lengths of threads 42 and 52 lie adjacent to base layers 41 and 51, but are not directly secured to base layers 41 and 51. In order to ensure that threads 42, for example, remain properly-positioned, a connecting layer or other securing element that bonds, secures, or otherwise joins portions of threads 42 to base layer 41 may be utilized. The connecting element or other securing element may be, for example, a sheet of thermoplastic polymer that is located between threads 42 and base layer 41 and heated to bond threads 42 and base layer 41 together. The connecting element or other securing element may also be a sheet of thermoplastic polymer or a textile, for example, that extends over threads 42 and base layer 41 to bond threads 42 and base layer 41 together. In addition, the connecting element or other securing element may be an adhesive that bonds threads 42 and base layer 41 together. In some configurations, additional threads may stitched over threads 42 to secure threads 42 to base layer 41. Accordingly, a variety of structures or methods may be utilized to secure threads 42 to base layer 41. Similar concepts may be applied to join base layer 51 and threads 52.

The portions of threads 42 within the various thread groups 44a, 44c, and 44d may be substantially parallel to each other. As depicted in FIG. 6, for example, the distances between the portions of threads 42 actually change. That is, threads 42 radiate outward. With regard to thread group 44a, the various threads 42 are relatively close to each other in midfoot region 12. As threads 42 extend toward forefoot region 11 and heel region 13, however, the distances between individual threads 42 increases. Accordingly, threads 42 radiate outward in forefoot region 11 and heel region 13. Similarly, the various threads 42 in thread groups 44c also radiate outward and away from lace apertures 33. In portions of upper 30 that are close to lace apertures 33, threads 42 are relatively close to each other, but tend to separate or radiate outward in portions of upper 30 that are further from lace apertures 33. The radiating characteristic discussed above may operate, for example, to distribute forces from a relatively small area (e.g., each of lace apertures 33) to a larger area. That is, the radiating characteristic may be utilized to distribute forces over areas of upper 30.

Based upon the above discussion, upper 30 is at least partially formed through an embroidery process that forms structural elements from threads 42 and 52. Depending upon the orientations, locations, and quantity of threads 42 and 52, different structural elements may be formed in upper 30. As examples, the structural elements may impart stretch-resistance to specific areas, reinforce areas, enhance wear-resistance, modify the flexibility, or provide areas of air-permeability. Accordingly, by controlling the orientations, locations, and quantity of threads 42 and 52, the properties of upper 30 and footwear 10 may be controlled.

Embroidery Process

An example of a method for manufacturing each of embroidered elements 40 and 50 is depicted in FIGS. 8A-8O. In general, the various steps utilized to form first embroidered element 40 are similar to the steps utilized to form second embroidered element 50. Accordingly, the following discussion focuses upon the manufacturing method for first embroidered element 40, with an understanding that second embroidered element 50 may be manufactured in a similar manner.

First embroidered element 40 is at least partially formed through an embroidery process, which may be performed by either machine or hand. With regard to machine embroidery, a variety of conventional embroidery machines may be utilized to form first embroidered element 40, and the embroidery machines may be programmed to embroider specific patterns or designs from one or a plurality of threads. In general, an embroidery machine forms patterns or designs by repeatedly securing a thread to various locations such that portions of the thread extend between the locations and are visible. More particularly, the embroidery machine forms a series of lock-stitches by (a) piercing a first location of base layer 41 with a needle to pass a first loop of thread 42 through base layer 41, (b) securing the first loop of thread 42 with another thread that passes through the first loop, (c) moving the needle to a second location such that thread 42 extends from the first location to the second location and is visible on a surface of base layer 41, (d) piercing the second location of base layer 41 with the needle to pass a second loop of thread 42 through base layer 41, and (e) securing the second loop of thread 42 with the other thread that passes through the second loop. Accordingly, the embroidery machine operates to secure thread 42 to two defined locations and also extend thread 42 between the two locations. By repeatedly performing these steps, embroidery is formed by thread 42 on base layer 41.

Conventional embroidery machines may form patterns or designs on base layer 41 by forming satin-stitches, running-stitches, or fill-stitches, each of which may utilize a lock-stitch to secure thread 42 to base layer 41. Satin-stitches are a series of zigzag-shaped stitches formed closely together. Running-stitches extend between two points and are often used for fine details, outlining, and underlay. Fill-stitches are series of running stitches formed closely together to form different patterns and stitch directions, and fill-stitches are often utilized to cover relatively large areas. With regard to satin-stitches, conventional embroidery machines generally limit satin stitches to twelve millimeters. That is, the distance between a first location and a second location where a thread is secured to a base layer is conventionally limited to twelve millimeters when an embroidery machine is forming satin-stitches. Conventional satin-stitch embroidery, therefore, involves threads that extend between locations separated by twelve millimeters or less. Forming embroidered element 40, however, may require that the embroidery machine be modified to form satin-stitches extending between locations spaced by more than twelve millimeters. In some aspects of the invention, stitches may be spaced by more than five centimeters, for example. That is, a thread may be continuously exposed on a surface of base layer 41 by more than twelve millimeters or by more than five centimeters, for example.

With respect to FIG. 8A, base layer 41 is depicted in combination with a hoop 60, which has the configuration of a conventional rectangular hoop utilized in embroidery operations. The primary elements of hoop 60 are an outer ring 61, an inner ring 62, and a tensioner 63. As is known in the art, outer ring 61 extends around inner ring 62, and peripheral portions of base layer 41 extend between outer ring 61 and inner ring 62. Tensioner 63 adjusts the tension in outer ring 61 such that inner ring 62 is positioned within outer ring 61 and base layer 41 is firmly held in place. In this configuration, a central area of base layer 41 is positioned on a single plane and may be in slight tension in order to ensure that base layer 41 is securely-positioned during further steps of the manufacturing process. In general, therefore, hoop 60 is utilized as a frame that securely-positions base layer 41 during the embroidery operation that forms first embroidered element 40.

Figure 8B:
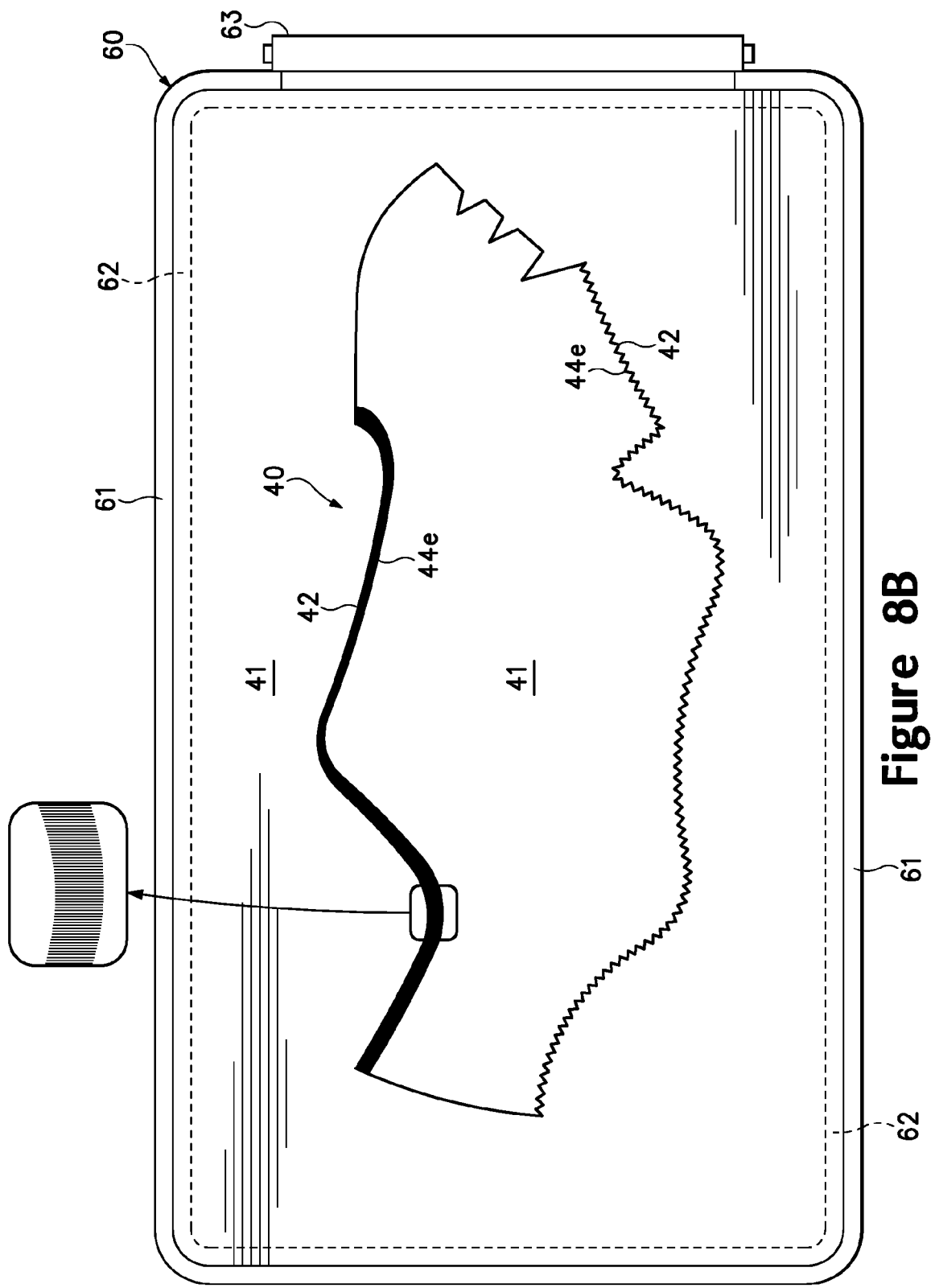
FIGS. 8A-8O are top plan views illustrating a procedure for forming the first embroidered element and the second embroidered element.

Once base layer 41 is secured within hoop 60, an embroidery machine begins locating and securing threads 42 to base layer 41. Initially, the embroidery machine forms an outline of first embroidered element 40, as depicted in FIG. 8B. The outline includes thread group 44e, which extends around the perimeter of first embroidered element 40 and corresponds with edges 43a-43d. The portion of edge 43a that forms ankle opening 31 is depicted as having a thicker configuration than other areas of thread group 44e, which imparts reinforcement to ankle opening 31. In further configurations of first embroidered element 40, all of thread group 44e may exhibit the thicker configuration, or the portion of edge 43a that forms ankle opening 31 may have a relatively thin configuration. Furthermore, thread group 44e may be partially or entirely absent in some configurations of first embroidered element 40. Various types of stitches may be utilized to form thread group 44e, including satin-stitches, running-stitches, fill-stitches, or combinations thereof.

Figure 8D:
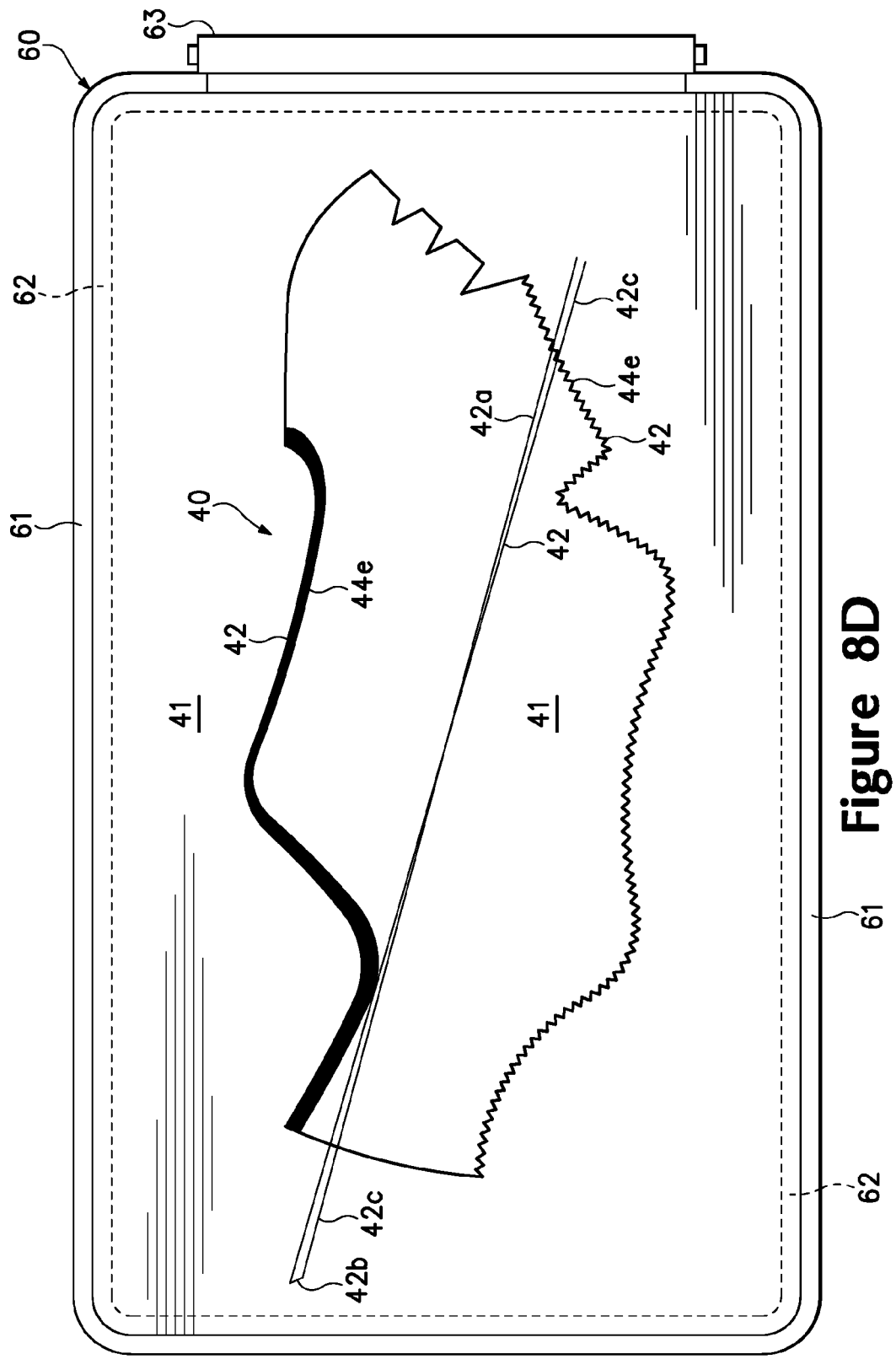
Figure 8E:
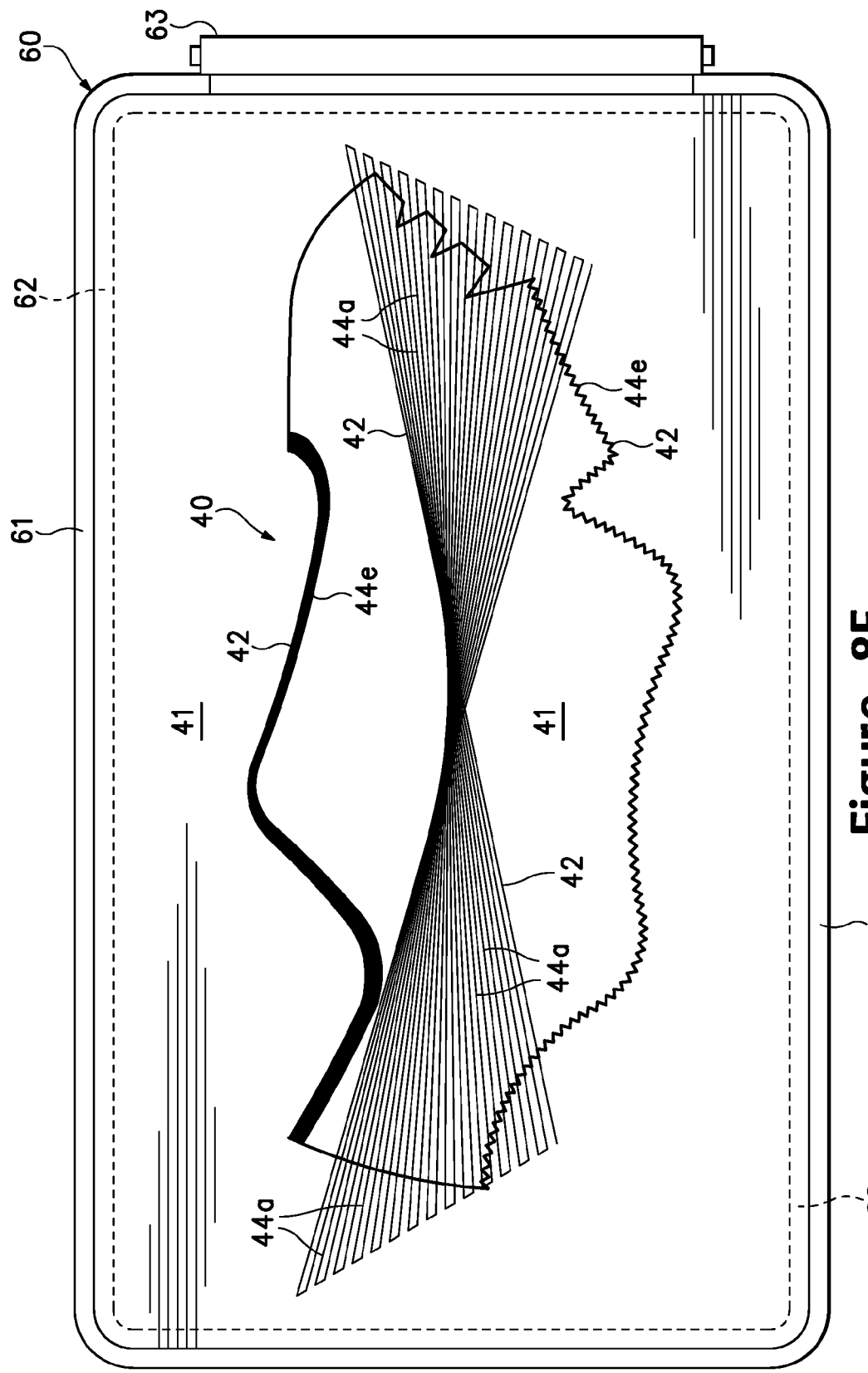

Following the formation of thread group 44e, thread group 44a may be formed. Referring to FIG. 8C, a portion 42a of thread 42 extends between two points that are positioned outside of first embroidered element 40. End points of portion 42a are secured with a lock-stitch, and the central area of portion 42a (i.e., the area of portion 42a other than the end points) lies adjacent to base layer 41 and is unsecured to base layer 41. That is, the central area of portion 42a is continuously exposed on the surface of base layer 41. The embroidery machine then form a relatively short portion 42b of thread 42, and also forms another portion 42c that crosses portion 42a, as depicted in FIG. 8D. This general procedure then repeats until thread group 44a is completed, as depicted in FIG. 8E.

Figure 8F:
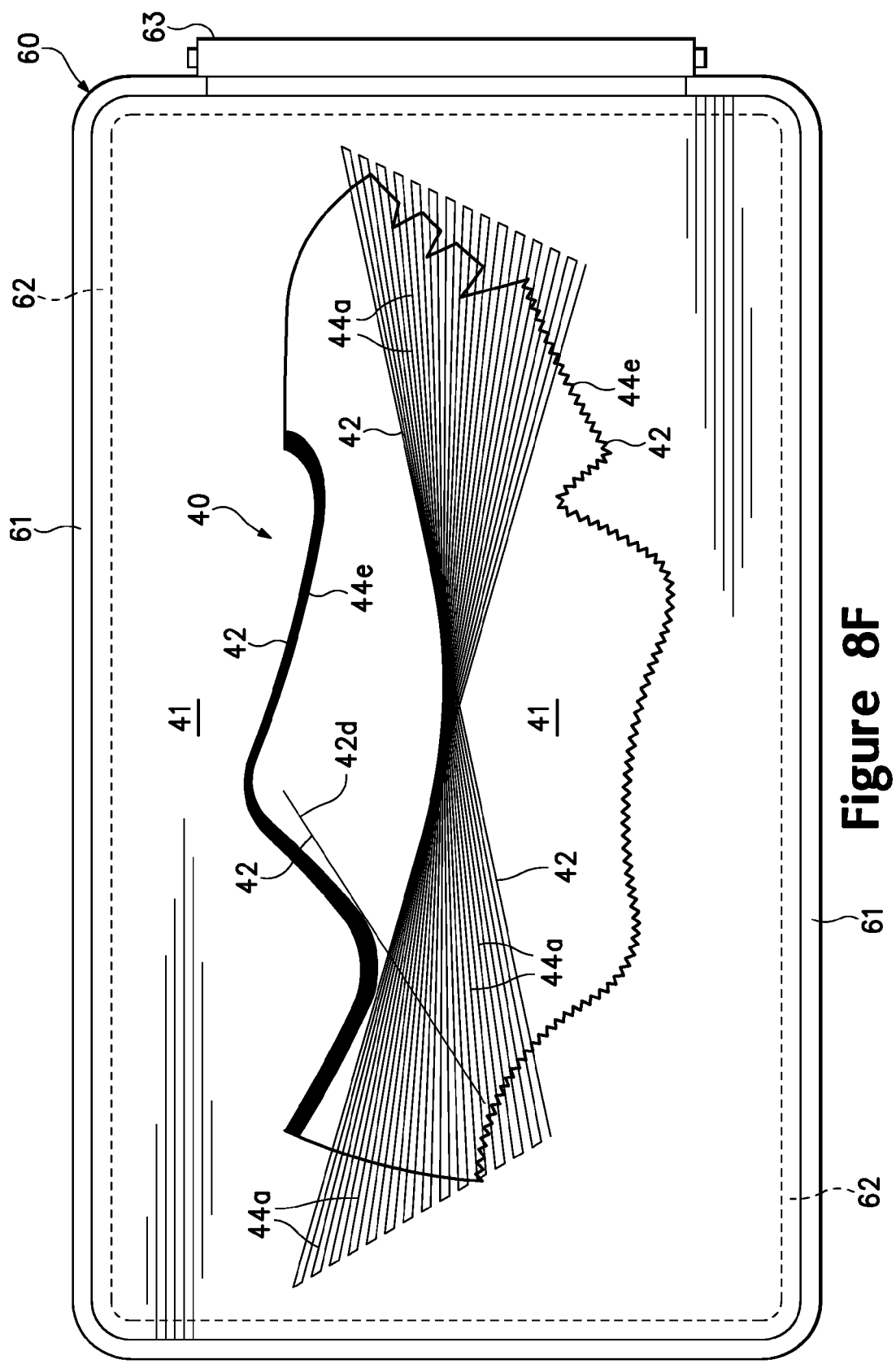
Figure 8G:
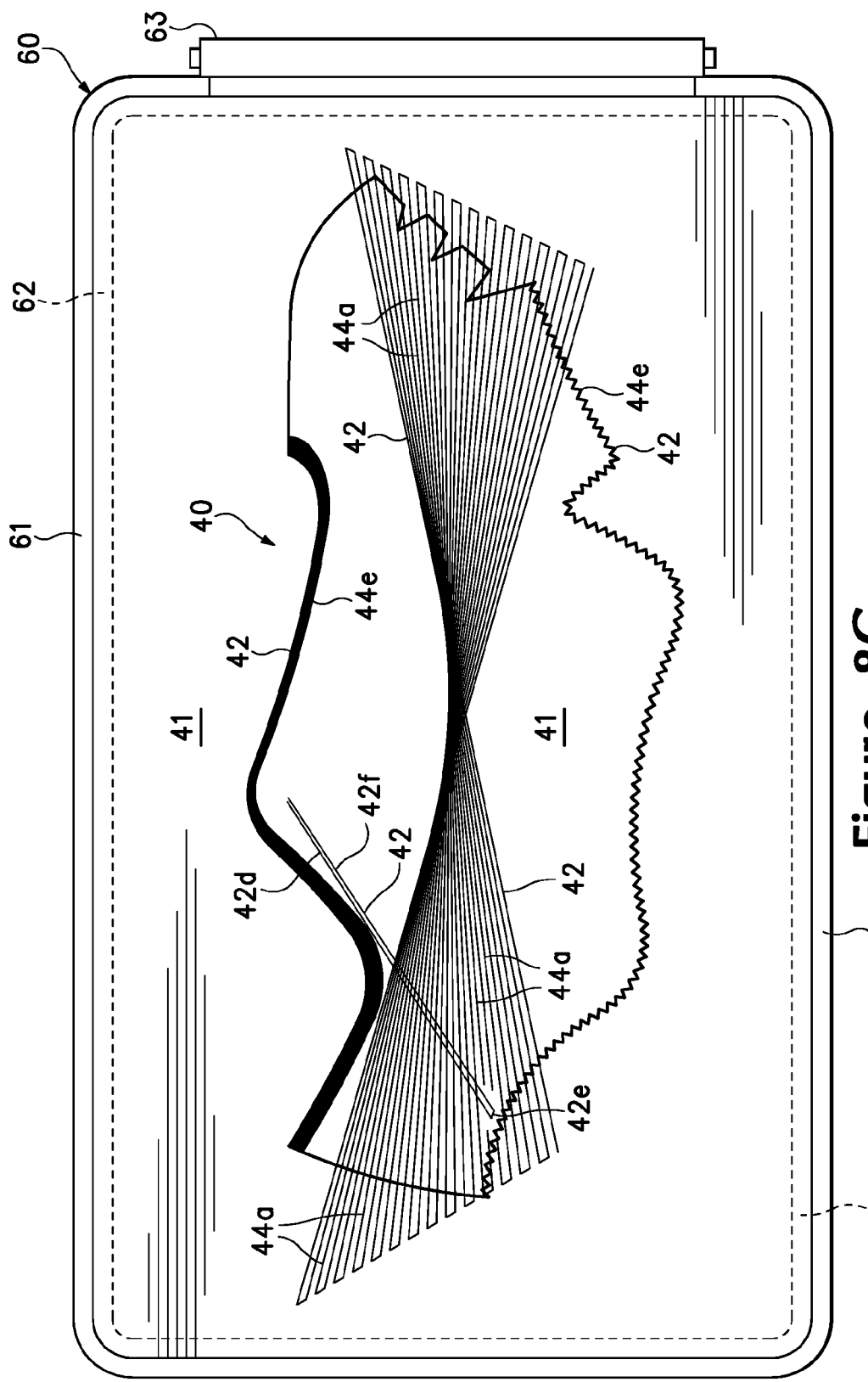
Figure 8H:
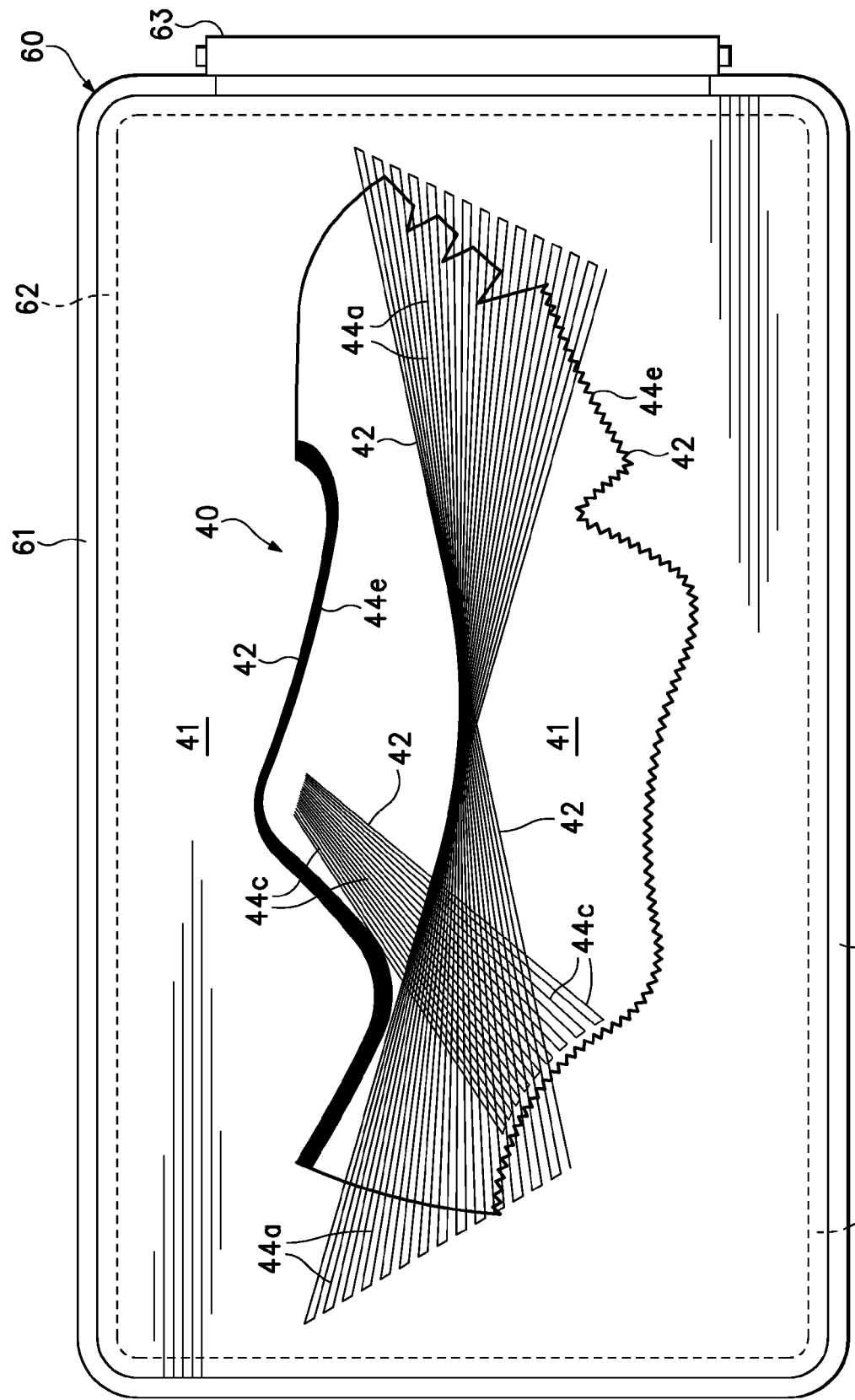
Figure 8I:
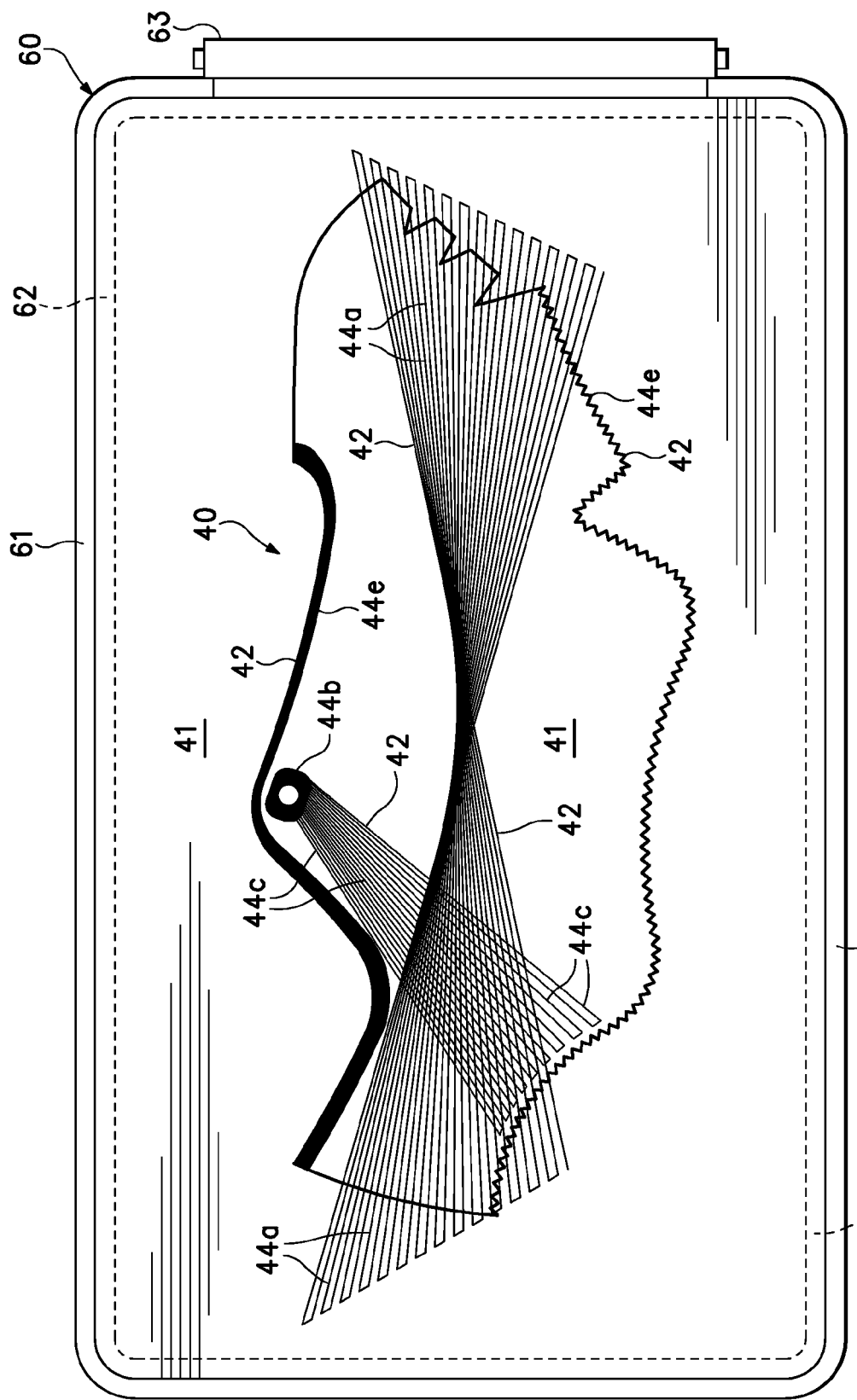

Thread group 44c is formed in a manner that is similar to thread group 44a. Referring to FIG. 8F, a portion 42d of thread 42 extends between two points that are positioned within the outline formed by thread group 44e. End points of portion 42d are secured with a lock-stitch, and the central area of portion 42d (i.e., the area of portion 42d other than the end points) lies adjacent to base layer 41 and is unsecured to base layer 41. In addition, the central area crosses thread group 44a. The embroidery machine then form a relatively short portion 42e of thread 42, and also forms another portion 42f that also crosses thread group 44a, as depicted in FIG. 8G. This general procedure then repeats until one of the various portions of thread group 44c is completed, as depicted in FIG. 8H. The embroidery machine then forms one of the various portions of thread groups 44b using a plurality of satin-stitches, for example, as depicted in FIG. 8I. The procedures discussed above for forming one of the various portions of thread group 44c and one of the various portions of thread groups 44b is repeated four additional times to form each of thread groups 44c and 44b, as depicted in FIG. 8J.

In some configurations, the ends of thread group 44c may abut a perimeter of thread group 44b. As depicted in the figures, however, thread group 44c extends beyond a perimeter of thread group 44b. That is, thread group 44c may extend over the thread 42 that forms thread group 44b, or thread group 44b may extend over the thread 42 that forms thread group 44c. More particularly, the thread 42 from each of thread groups 44b and 44c may be intertwined. When lace 32 extends through lace apertures 33 and is tensioned, thread group 44b reinforces lace apertures 33 and thread group 44c distributes the tensile force along the sides of upper 30. By intertwining thread groups 44b and 44c, forces upon lace apertures 33 are more effectively transmitted to thread group 44c.

Figure 8K:
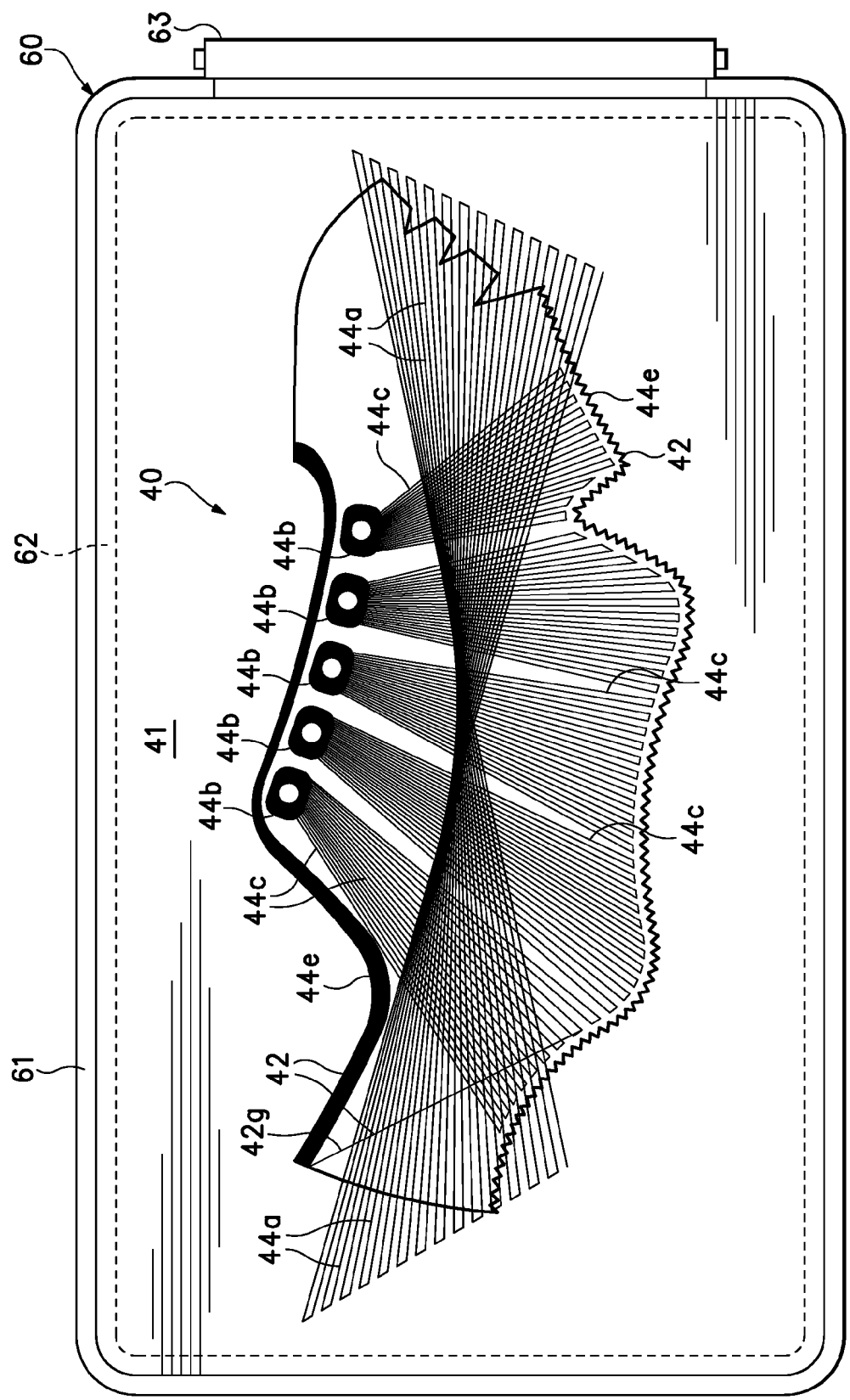
Figure 8L:
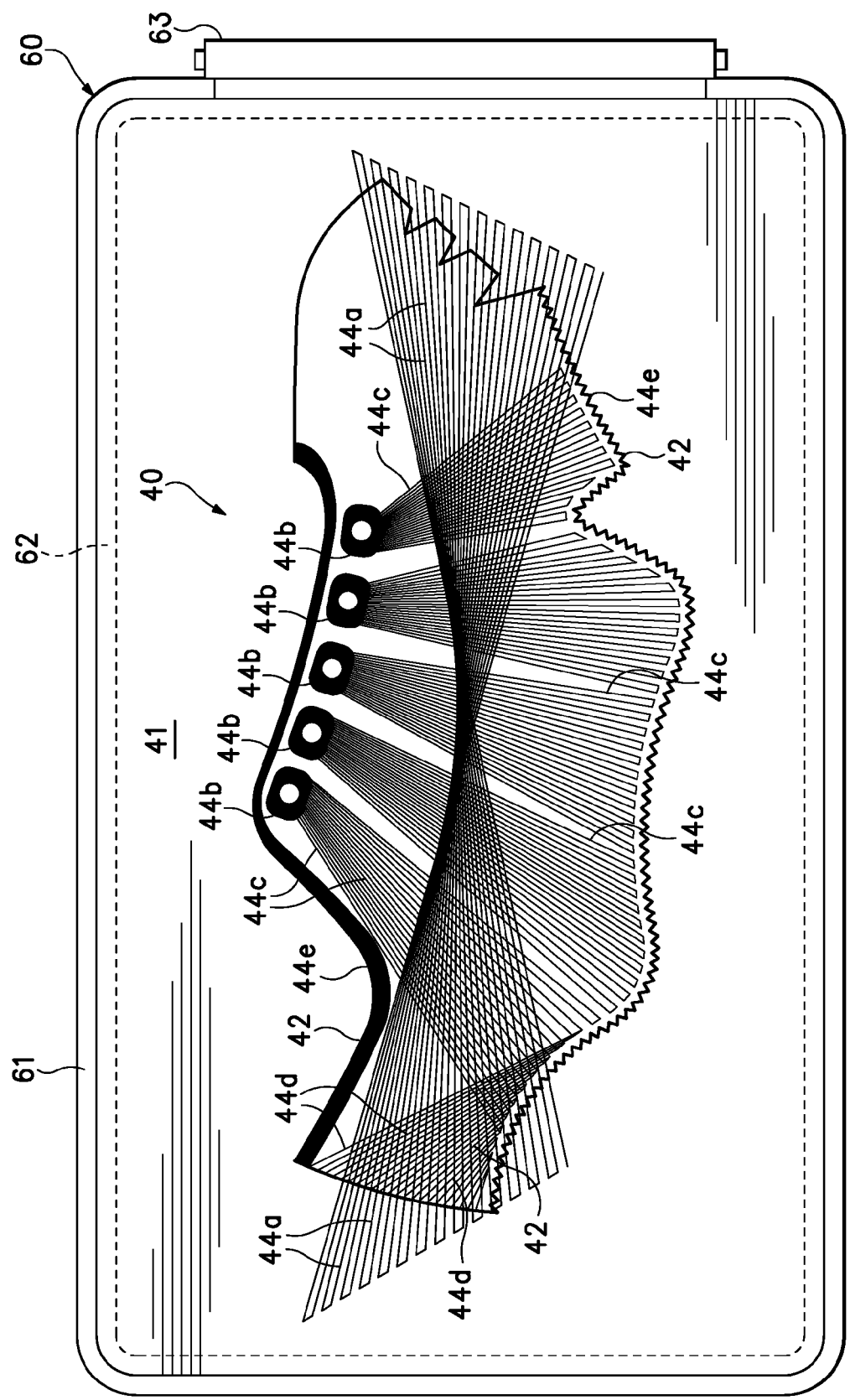

Thread group 44d is formed in a manner that is similar to thread groups 44a and 44c. Referring to FIG. 8K, a portion 42g of thread 42 extends between two points that are positioned adjacent to the outline formed by thread group 44e in heel region 13. End points of portion 42d are secured with a lock-stitch, and the central area of portion 42d (i.e., the area of portion 42d other than the end points) lies adjacent to base layer 41 and is unsecured to base layer 41. That is, the central area of portion 42d is continuously exposed on the surface of base layer 41. In addition, the central area crosses thread group 44a. This general procedure then repeats until thread group 44d is completed, as depicted in FIG. 8L.

Figure 8M:
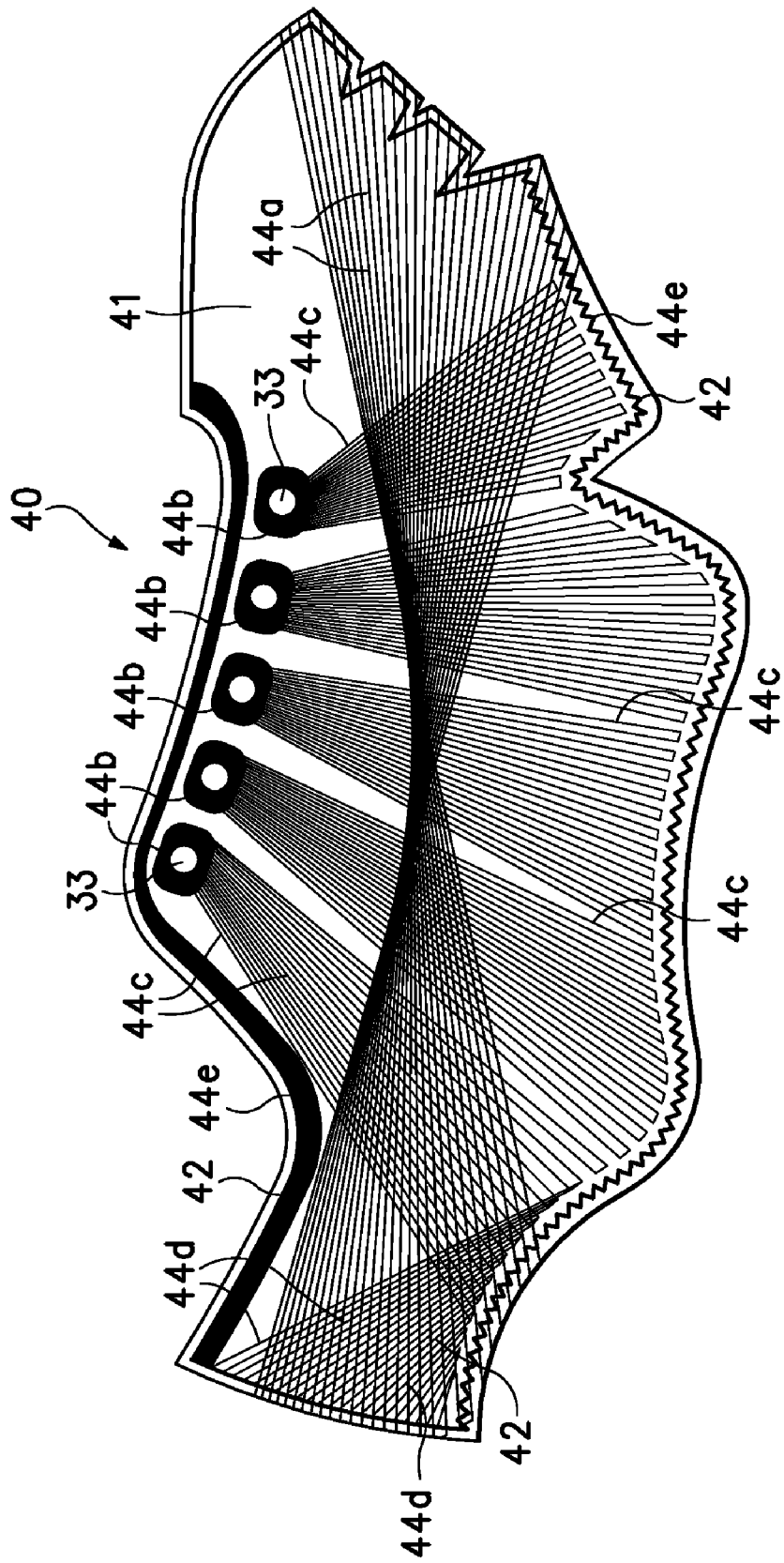

Once thread group 44d is completed, lace apertures 33 may be formed through base layer 41 in areas that correspond with the centers of thread groups 44b. In addition, first embroidered element 40 may be cut from portions of base layer 41 that are outside of thread group 44e, thereby forming edges 43a-43d, as depicted in FIG. 8M. In cutting first embroidered element 40 from extraneous portions of base layer 41, portions of thread 42 that forms thread group 44a are severed. As noted above, base layer 41 may include a connecting layer or other securing element that bonds, secures, or otherwise joins portions of threads 42 to base layer 41. The connecting layer or other securing element, which is described in greater detail below, may be added or utilized prior to cutting first embroidered element 40 from extraneous portions of base layer 41.

The general procedure described above and depicted in FIGS. 8A-8M for forming first embroidered element 40 discusses a particular order for forming each of thread groups 44a-44e. In the order discussed, thread groups 44c and 44d cross over thread group 44a, which places thread group 44a between base layer 41 and thread groups 44c and 44d. The discussed order also forms thread groups 44b and 44c in a generally concurrent manner. That is, a portion of thread group 44c was formed, then a portion of thread group 44b was formed, and this procedure repeated until each of thread groups 44b and 44c were completed. The order discussed above is, however, an example of the various orders that may be used to form first embroidered element 40, and a variety of other orders for forming each of thread groups 44a-44e may also be utilized. Accordingly, the general procedure described above and depicted in FIGS. 8A-8M provides an example of the manner in which first embroidered element 40 may be made, and a variety of other procedures may alternately be utilized.

Figure 8N:
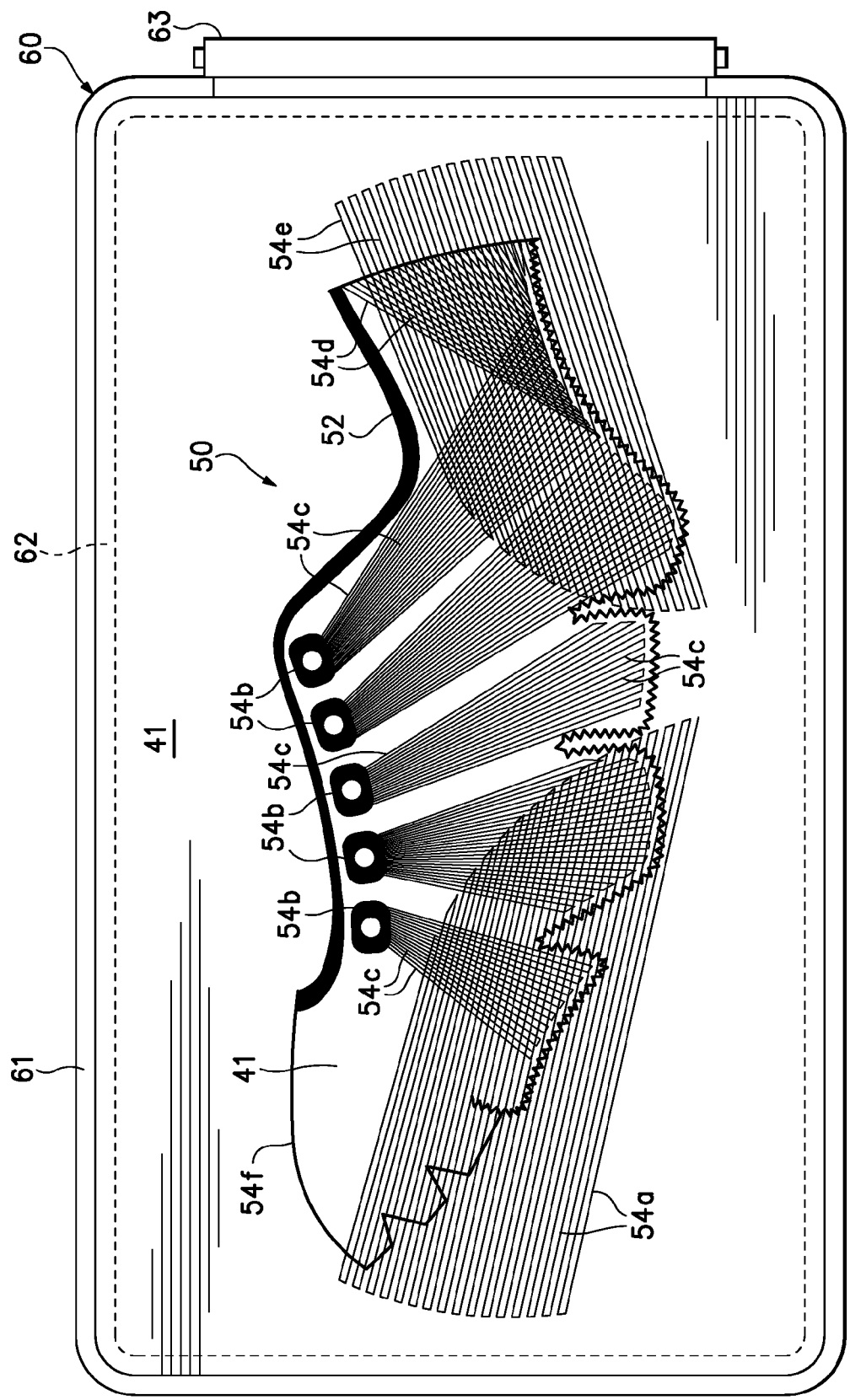

Second embroidered element 50 is formed through an embroidery process that may be similar to the process for forming first embroidered element 40. With reference to FIG. 8N, second embroidered element 50 is depicted following the embroidery process that forms thread groups 54a-54f. Lace apertures 33 may then be formed through base layer 51 in areas that correspond with the centers of thread groups 54b. In addition, second embroidered element 50 may be cut from portions of base layer 51 that are outside of thread group 54f, thereby forming edges 53a-53d, as depicted in FIG. 8O. Prior to cutting second embroidered element 50 from extraneous portions of base layer 51, a connecting layer or other securing element that bonds, secures, or otherwise joins portions of threads 52 to base layer 51 may be added, as described in greater detail below. As with first embroidered element 40, a variety of orders for forming each of thread groups 54a-54f may be utilized.

Footwear Assembly

Figure 9A:
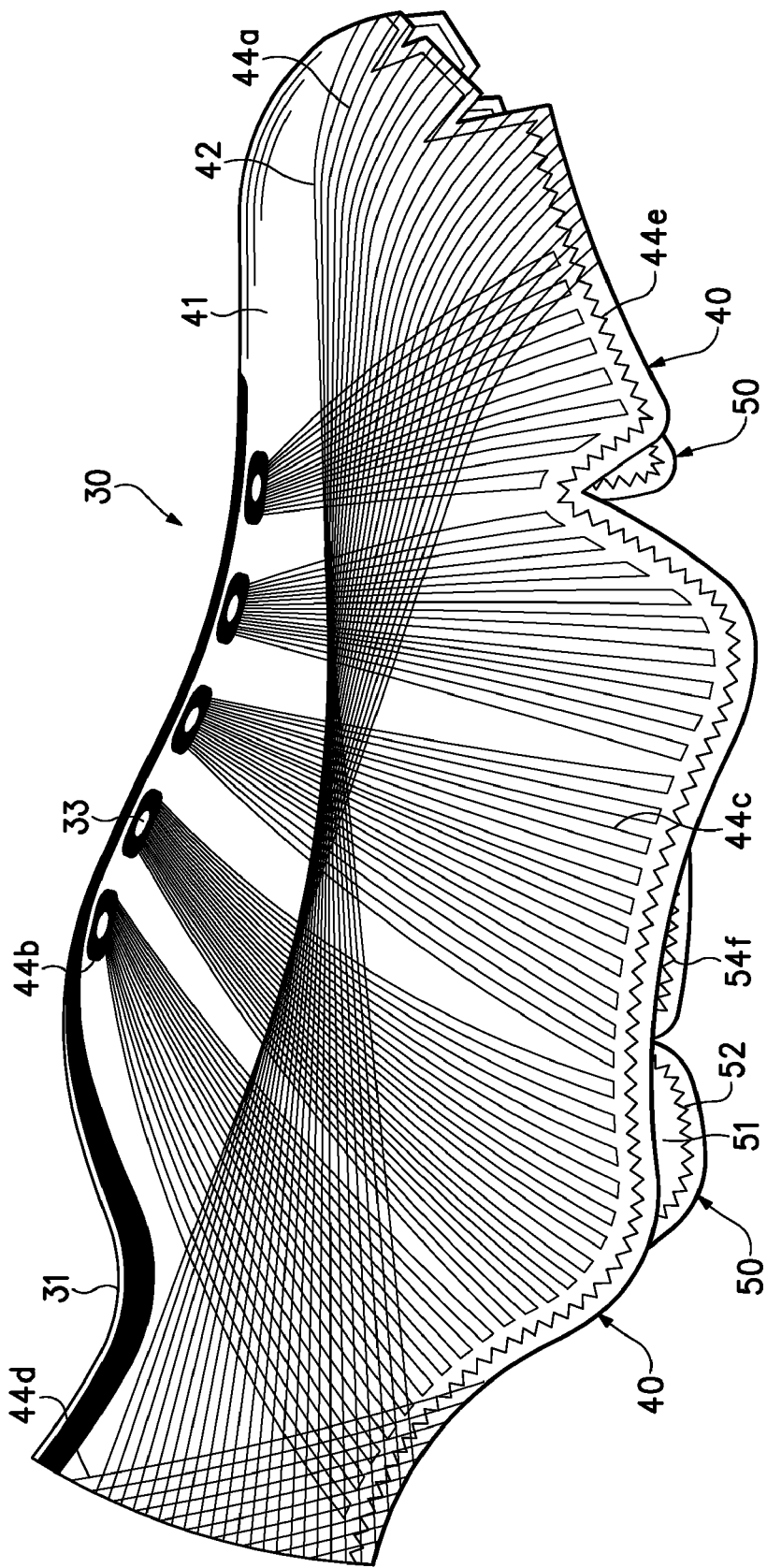
FIGS. 9A-9D are elevational views of a procedure for assembling the footwear.

Footwear 10 is assembled once embroidered element 40 and 50 are formed in the manner discussed above. An example of one manner in which footwear 10 may be assembled is depicted in FIGS. 9A-9D. Initially, the manufacture of upper 30 is substantially completed by securing embroidered elements 40 and 50 together in forefoot region 11 and heel region 13, as depicted in FIG. 9A. More particularly, forward portions of edges 43a and 53a are joined, and each of edges 43c and 53c are also joined. Various types of stitching or adhesives, for example, may be utilized to join embroidered elements 40 and 50.

Figure 9B:
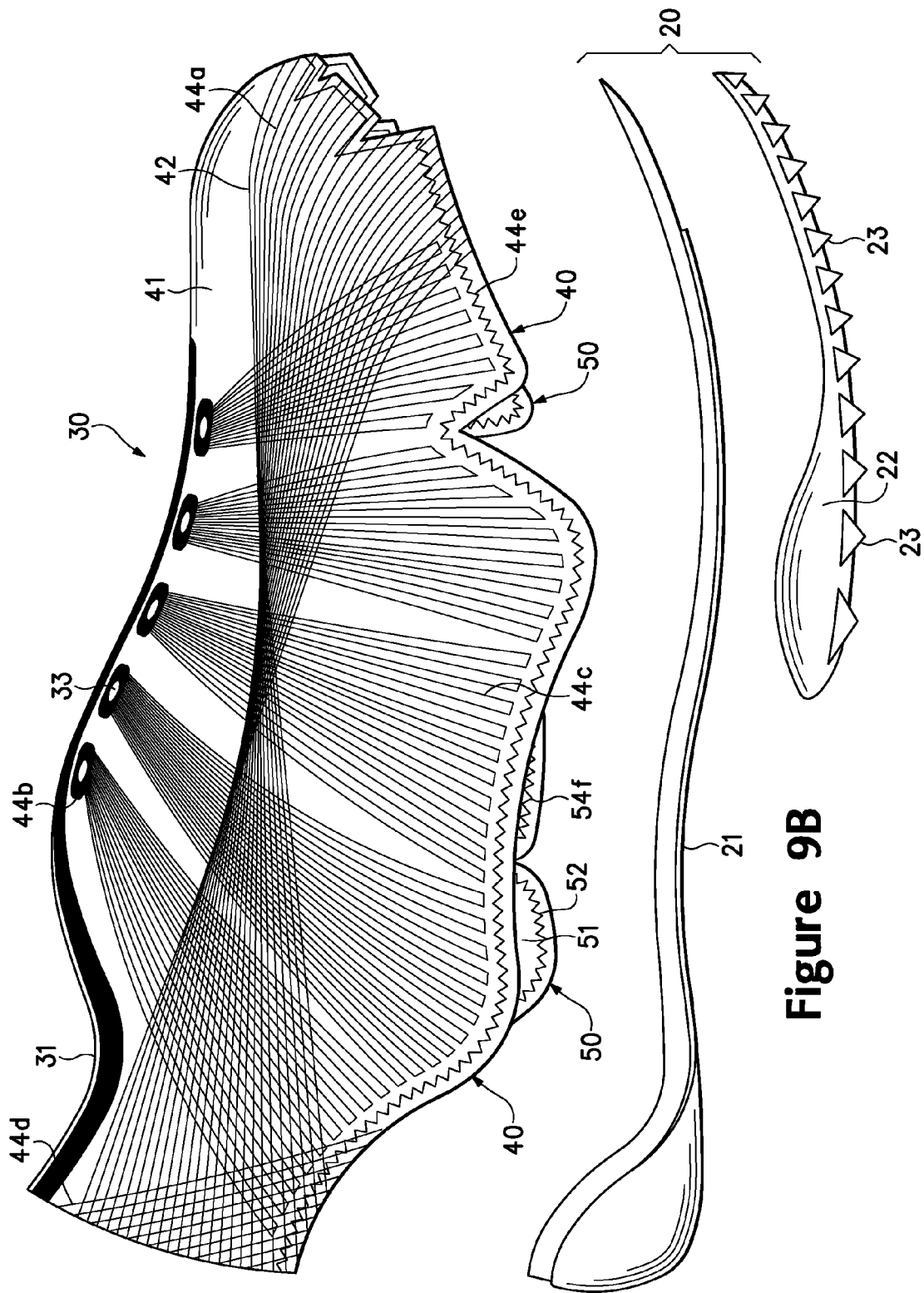
Figure 9C:
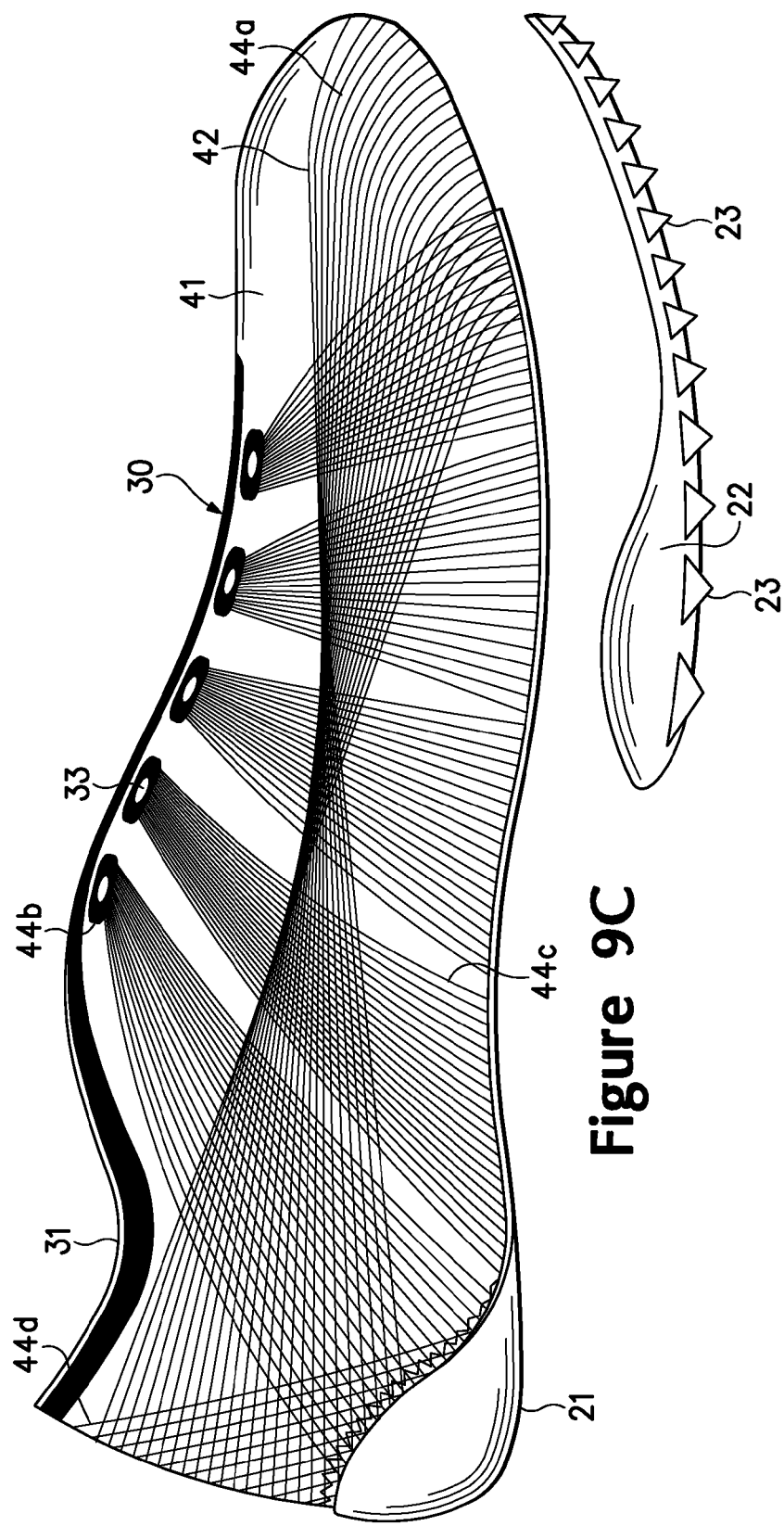

Following the completion of upper 30, sole elements 21 and 22 are positioned, as depicted in FIG. 9B. First sole element 21 is then located between embroidered elements 40 and 50 such that lower portions of embroidered elements 40 and 50 wrap around sides of first sole element 21. An adhesive, for example, is then utilized to secure the lower portions of embroidered elements 40 and 50 to the lower area of first sole element 21, as depicted in FIG. 9C. When assembled in this manner, then upper area of first sole element 21 is positioned to provide a foot-supporting surface within upper 30.

In some configurations, however, a sockliner may be located within upper 30 and adjacent the upper area of first sole element 21 to form the foot-supporting surface of footwear 10.

Figure 9D:
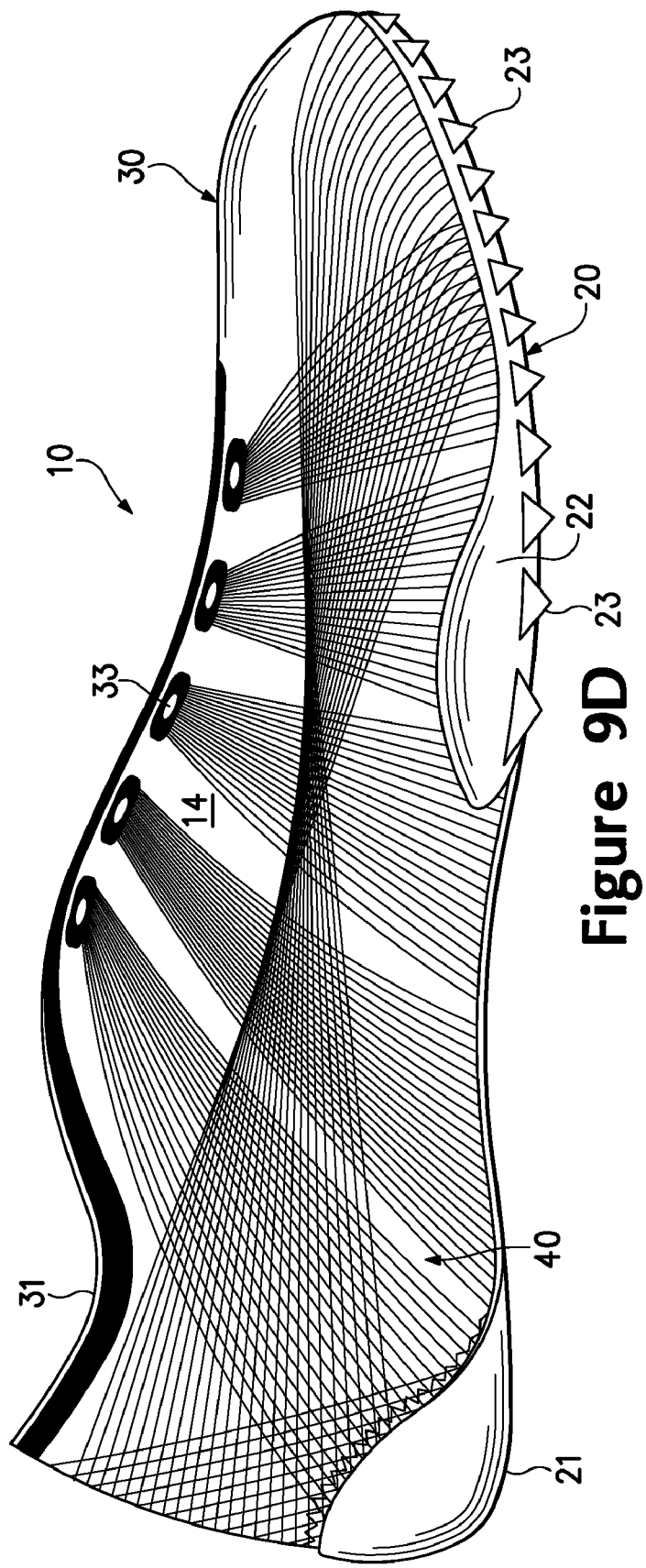

Second sole element 22 is then secured (e.g., with an adhesive) to first sole element 21 and embroidered elements 40 and 50, as depicted in FIG. 9D. In this position, each of embroidered elements 40 and 50, first sole element 21, and second sole element 22 form portions of the ground-contacting surface of footwear 10. In order to impart additional traction, projections 23 having the form of removable spikes may be incorporated into second sole element 22. Finally, lace 32 is threaded through lace apertures 33 in a conventional manner to substantially complete the assembly of footwear 10.

Securing Element

Each segment of thread 42 (e.g., portions 42a-42g) have two end points and a central portion extending between the end points. The end points are secured with a lock-stitch, and the central area (i.e., the area of a segments other than the end points) lies adjacent to base layer 41 and is unsecured to base layer 41. In order to secure the central area to base layer 41, a connecting layer that bonds, secures, or otherwise joins portions of threads 42 to base layer 41 may be utilized. The following discussion presents various methods by which a connecting layer or other securing agent may be added to first embroidered element 40. Similar concepts also apply to second embroidered element 50.

Figure 10A:
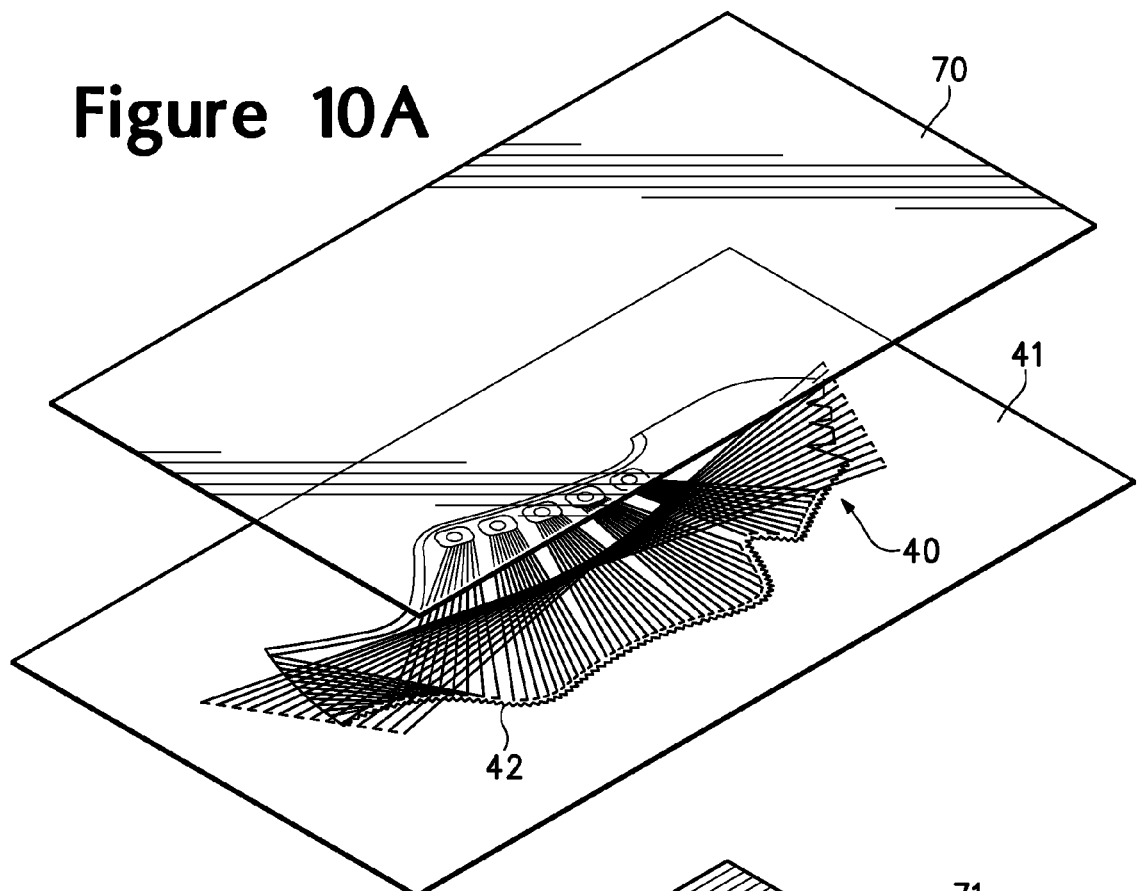
FIGS. 10A-10D are perspective views of a first procedure for securing threads to the base portion.

One procedure for securing portions of threads 42 to base layer 41 is depicted in FIGS. 10A-10D. With reference to FIG. 10A, first embroidered element 40 is depicted as being formed through the embroidery process, but uncut from the extraneous portions of base layer 41 (i.e., as in FIG. 8L). In addition, a connecting layer 70 is depicted as being superimposed over the surface of first embroidered element 40 that includes threads 42.

Figure 10B:
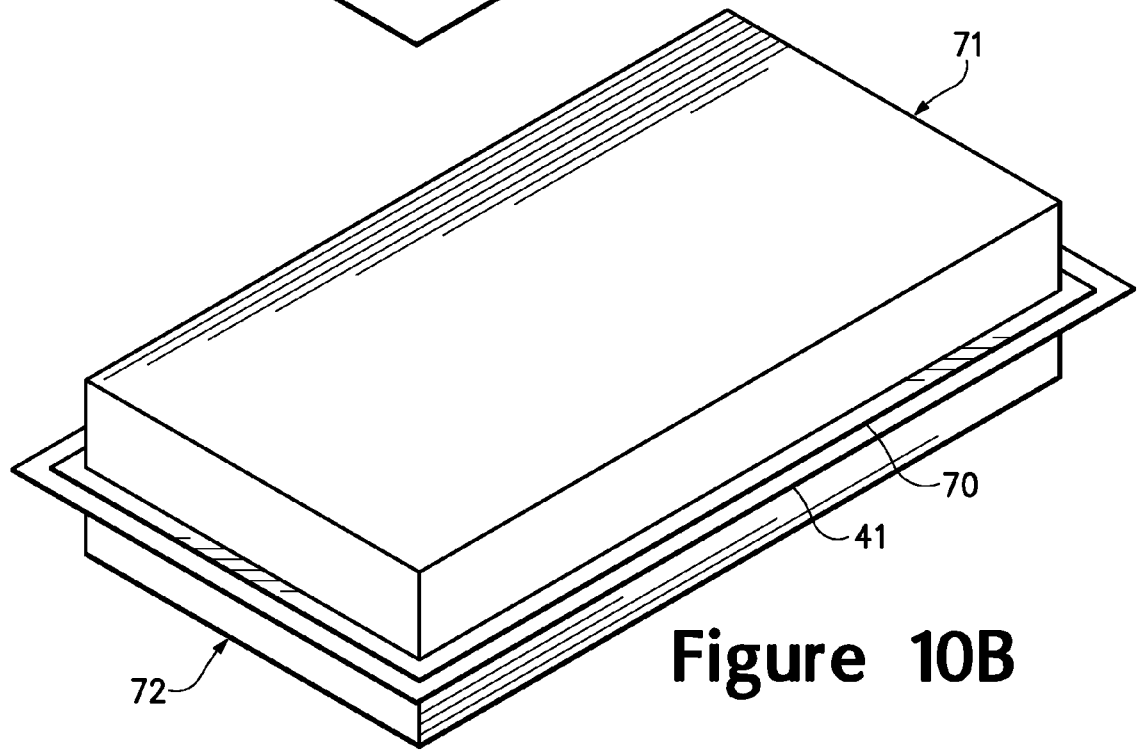
Figure 10C:
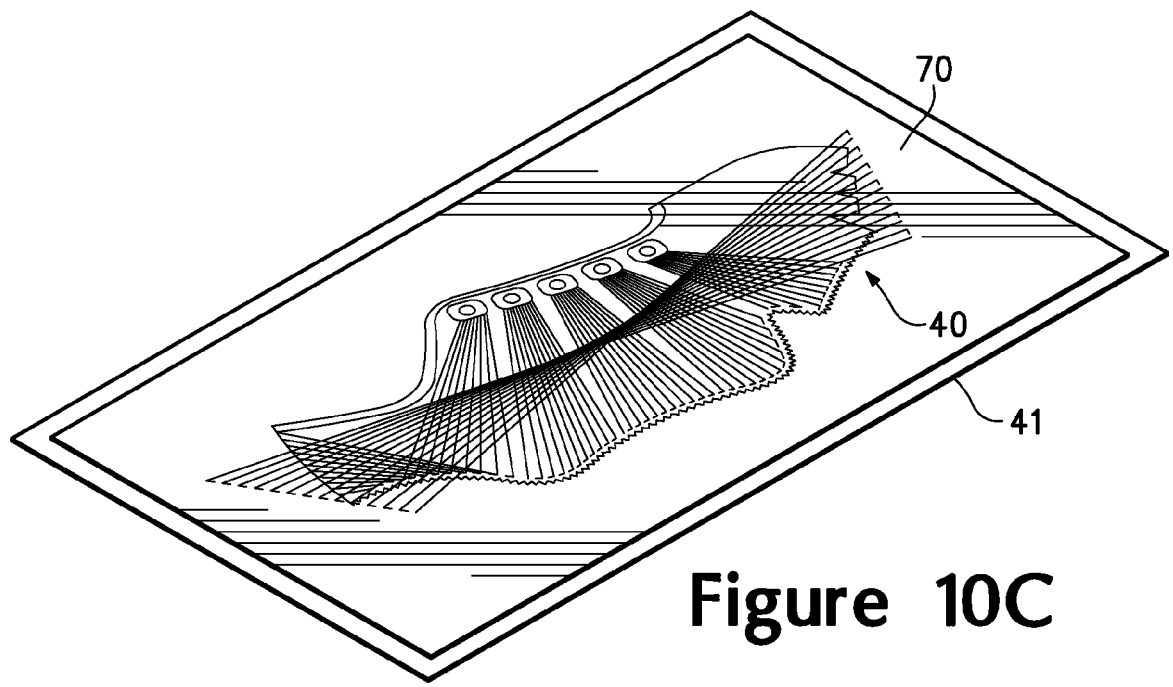
Figure 10D:
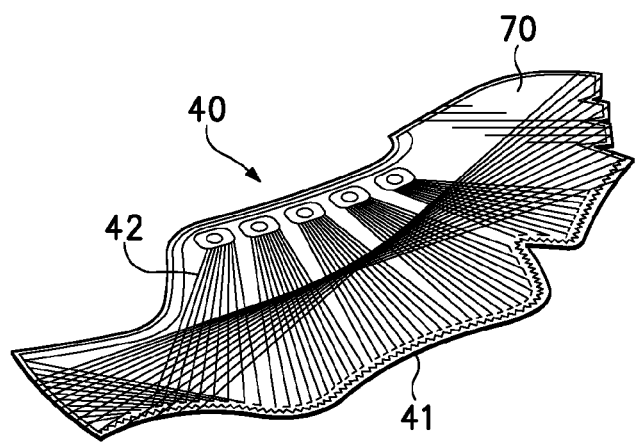

Connecting layer 70 is a sheet of a thermoplastic polymer material with a thickness between one-thousandth of a millimeter and three millimeters, for example. Suitable polymer materials for connecting layer 70 include polyurethane and ethylvinylacetate, for example. In order to heat connecting layer 70 and bond connecting layer 70 to first embroidered element 40, connecting layer 70 and first embroidered element 40 are placed between a pair of platens 71 and 72 of a heated press, as depicted in FIG. 10B. As the temperature of connecting layer 70 rises, the polymer material forming connecting layer 70 rises such that the polymer material infiltrates the structures of base layer 41 and threads 42. Upon removal from the heated press, connecting layer 70 cools and effectively bonds threads 42 to base layer 41, as depicted in FIG. 10C. First embroidered element 40 may then be cut from extraneous portions of base layer 41.

Connecting layer 70 ensures that thread group 44a remains intact following the removal of first embroidered element 40 from the extraneous portions of base layer 41. In addition, connecting layer 70 ensures that portions of thread groups 44c and 44d, for example, remain properly positioned relative to base layer 41. Although end portions of the various segments of thread 42 that form thread groups 44c and 44d are secured to base layer 41 with lock-stitches, the central portions are unsecured to base layer 41 without the presence of connecting layer 70. Accordingly, connecting layer 70 effectively bonds each of threads 42 to base layer 41.

Base layer 41 may exhibit an air-permeable structure that allows perspiration and heated air to exit upper 20. The addition of connecting layer 70 may, however, decrease the degree to which upper 20 is air-permeable. Whereas connecting layer 70 is depicted in FIG. 10A as having a continuous structure, connecting layer 70 may also be formed to have various apertures that correspond with areas of first embroidered element 40 where connecting layer 70 is not desired. Accordingly, apertures in connecting layer 40 may be utilized to enhance the air-permeable properties of upper 30. In addition, decreasing the quantity of material utilized for connecting layer 70 has an advantage of minimizing the mass of footwear 10.

Figure 11A:
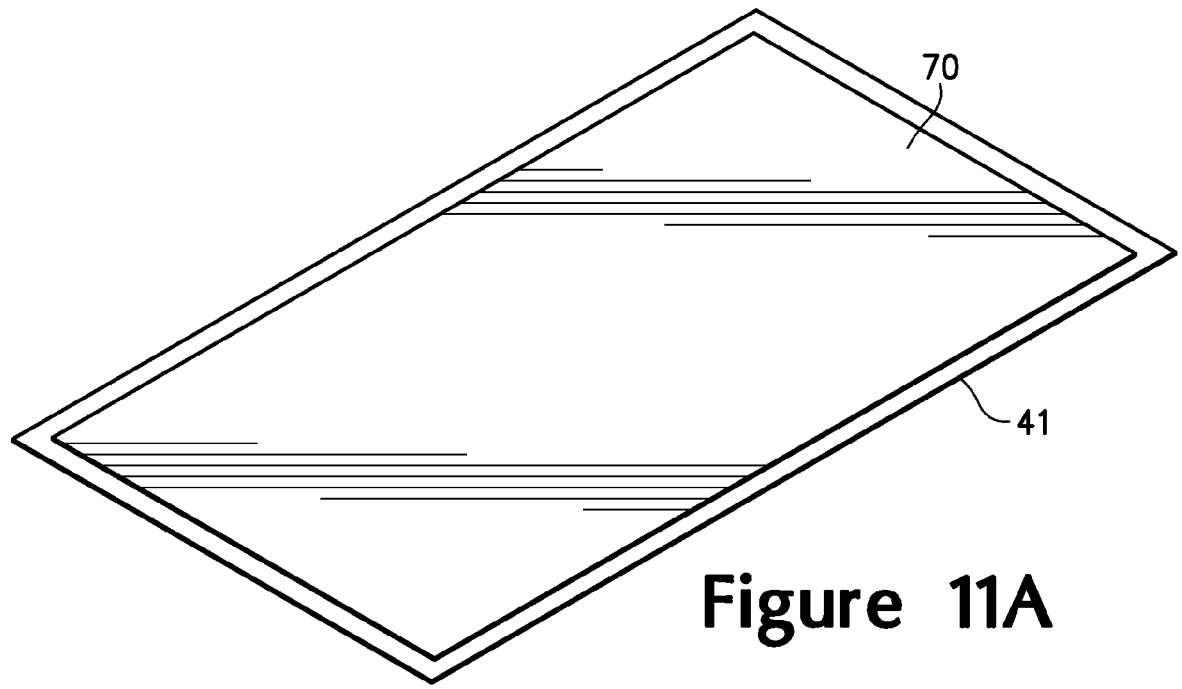
FIGS. 11A-11D are perspective views of a second procedure for securing threads to the base portion.
Figure 11B:
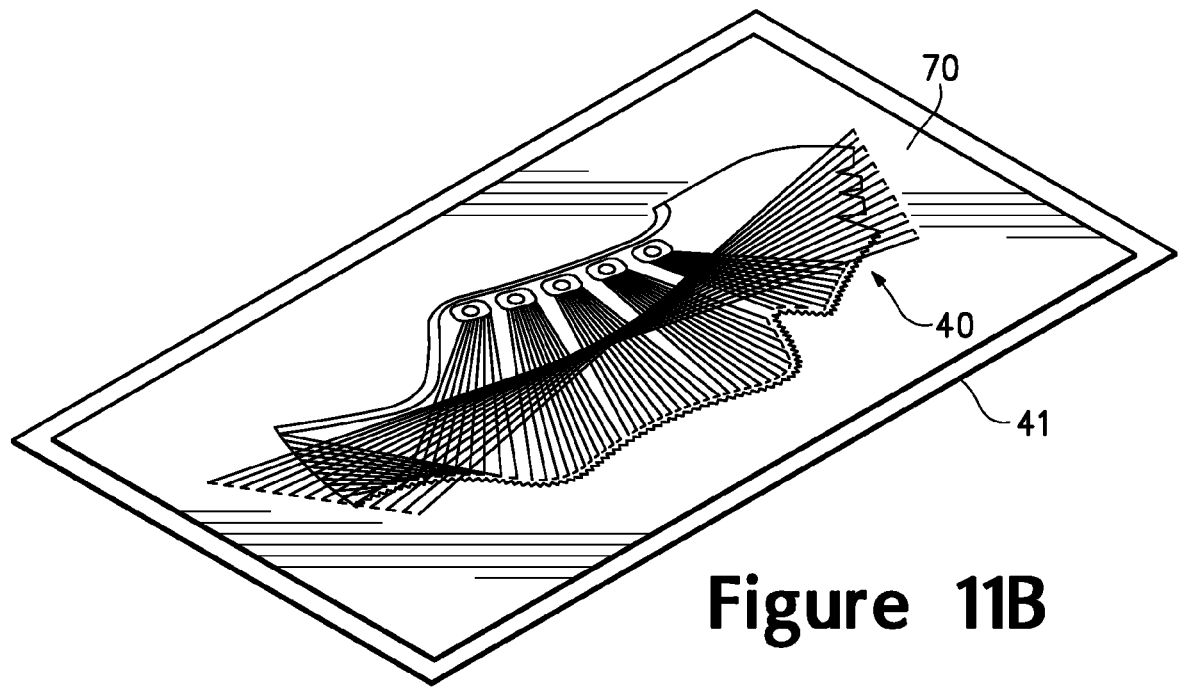
Figure 11C:
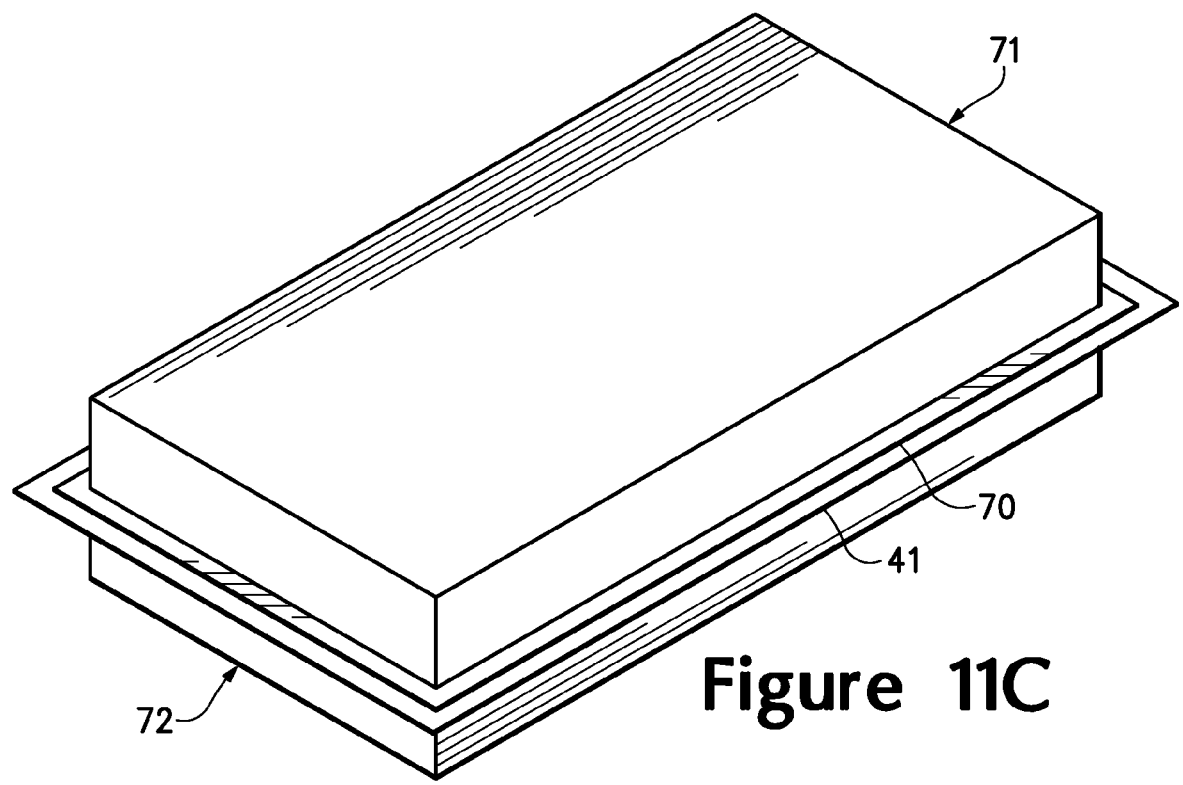
Figure 11D:
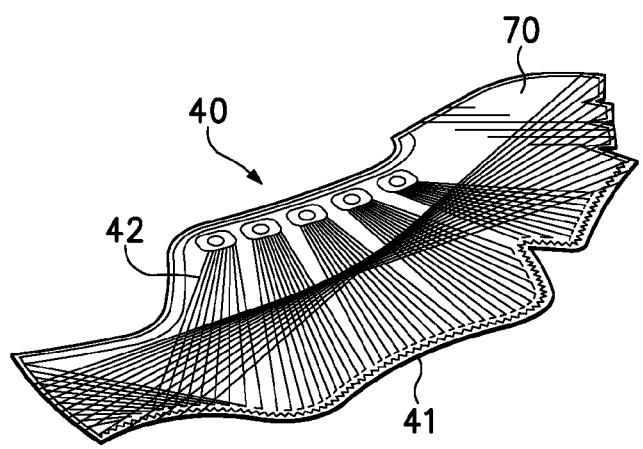

Another procedure for securing portions of threads 42 to base layer 41 is depicted in FIGS. 11A-11D. With reference to FIG. 11A, base layer 41 is depicted as being joined to connecting layer 70 prior to the addition of threads 42. The embroidery process is then utilized to form thread groups 44a-44e such that connecting layer 70 is between base layer 41 and threads 42, as depicted in FIG. 11B. In order to heat connecting layer 70 and bond threads 42 to base layer 41, connecting layer 70 and first embroidered element 40 are placed between the platens 71 and 72 of a heated press, as depicted in FIG. 11C. Upon removal from the heated press, connecting layer 70 cools and effectively bonds threads 42 to base layer 41. First embroidered element 40 may then be cut from extraneous portions of base layer 41, as depicted in FIG. 11D. During the embroidery process, threads 42 may be placed in tension, which tends to pull inward on base layer 41. An advantage to applying connecting layer 70 to base layer 41 prior to the embroidery process is that connecting layer 70 assists in resisting the inward pull of threads 42.

Figure 12A:
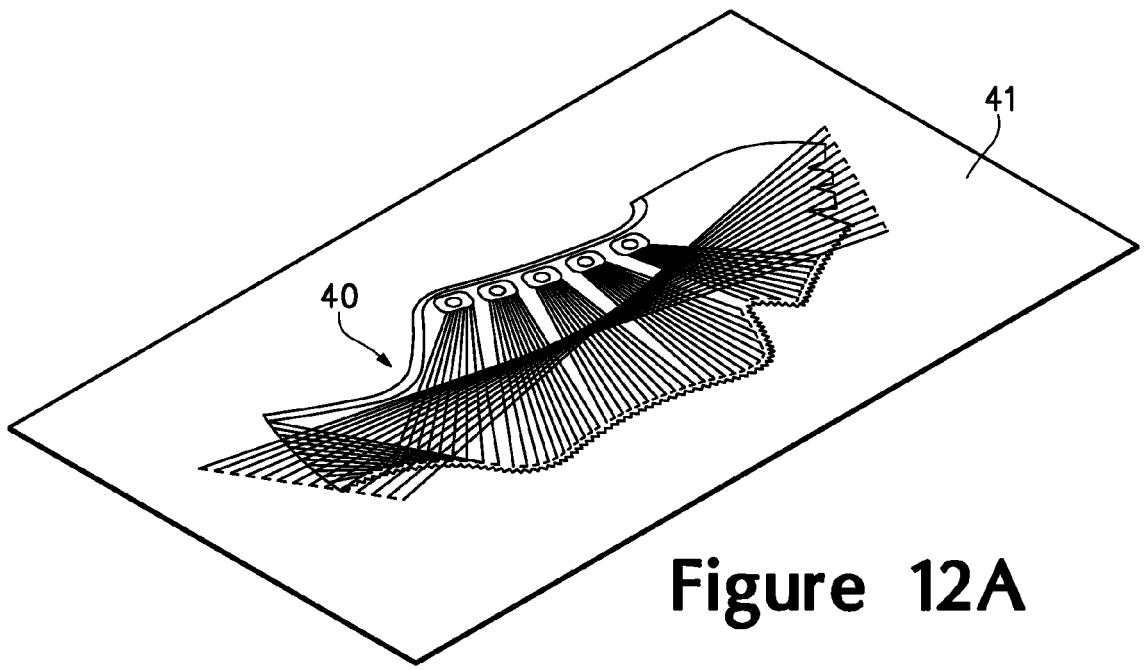
FIGS. 12A-12C are perspective views of a third procedure for securing threads to the base portion.
Figure 12B:
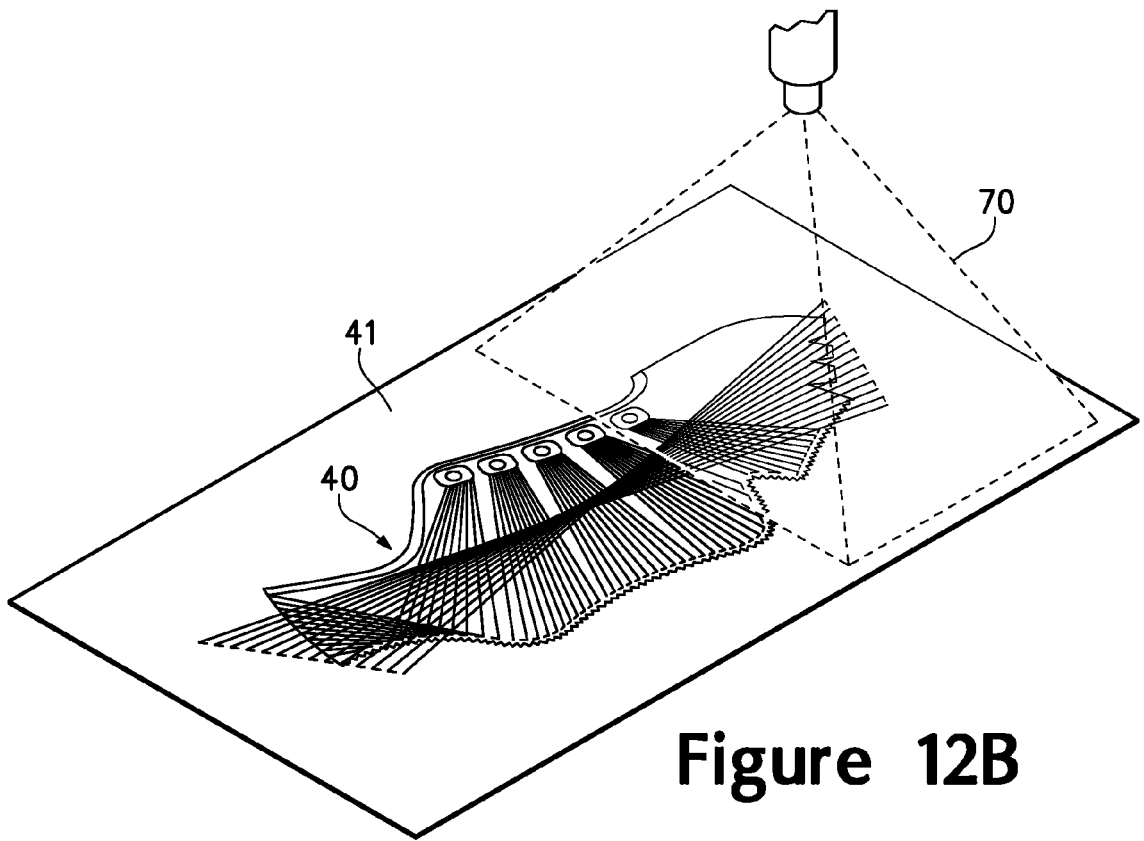
Figure 12C:
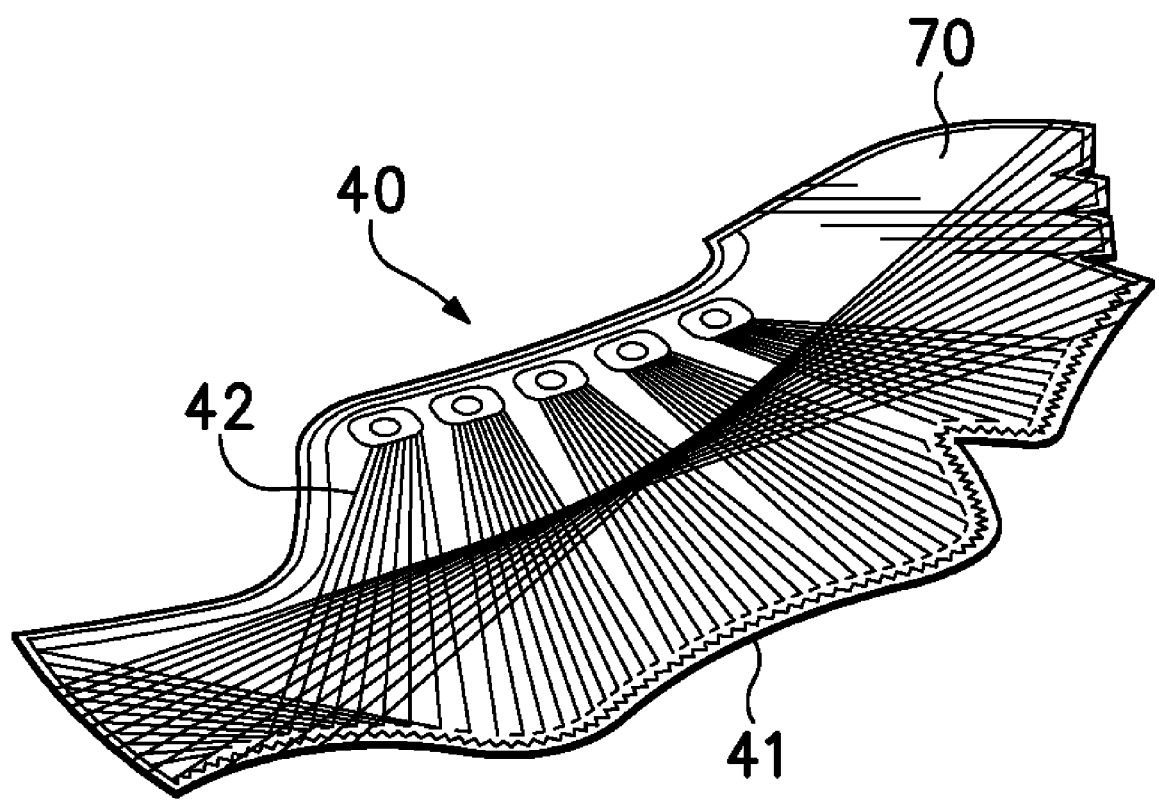

Yet another procedure for securing portions of threads 42 to base layer 41 is depicted in FIGS. 12A-12C. With reference to FIG. 12A, first embroidered element 40 is depicted as being formed through the embroidery process, but uncut from the extraneous portions of base layer 41 (i.e., as in FIG. 8L). An adhesive securing element is then sprayed or otherwise applied to first embroidered element 40, as depicted in FIG. 12B, thereby securing threads 42 to base layer 41. First embroidered element 40 may then be cut from extraneous portions of base layer 41, as depicted in FIG. 12C.

Layered Configuration

Figure 13:
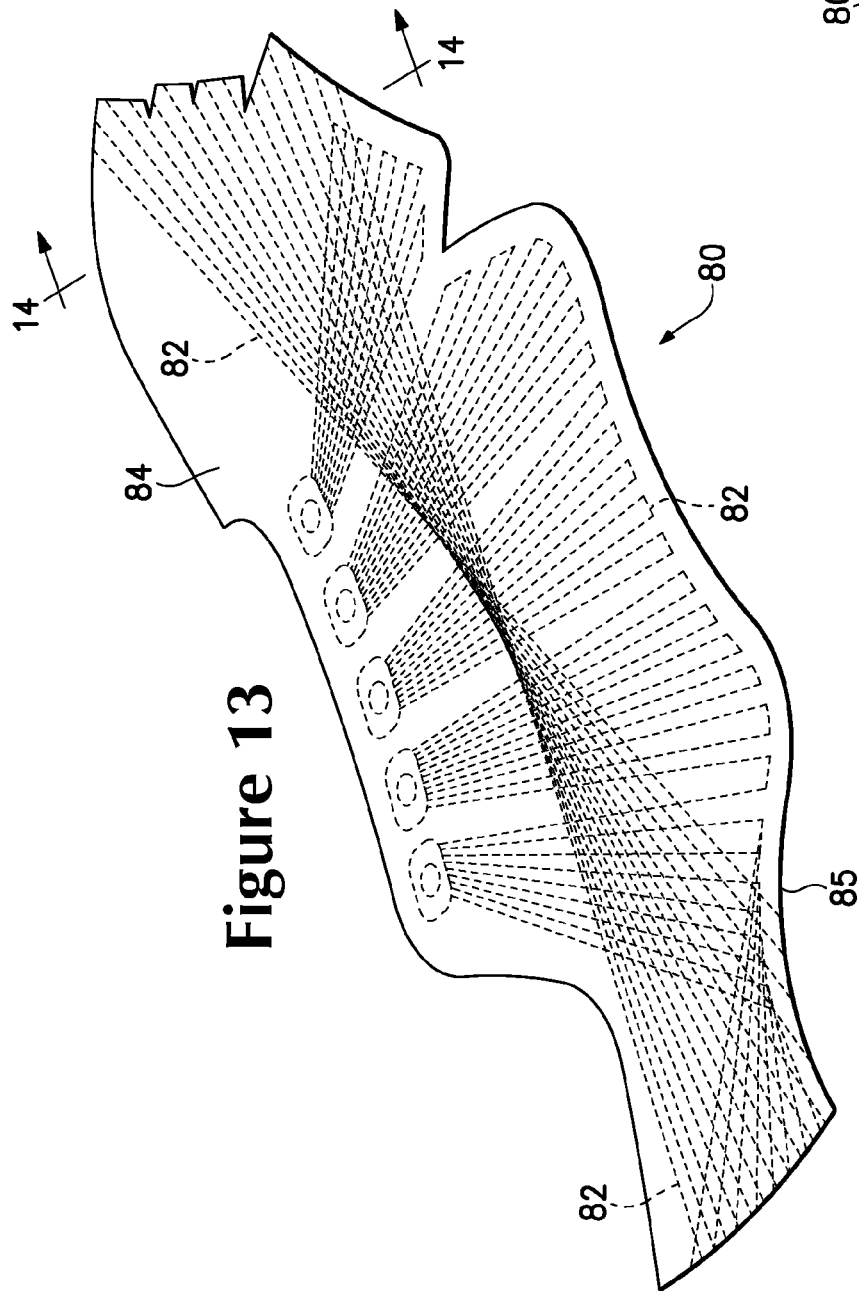
FIG. 13 is a perspective view of a third embroidered element.
Figure 14:
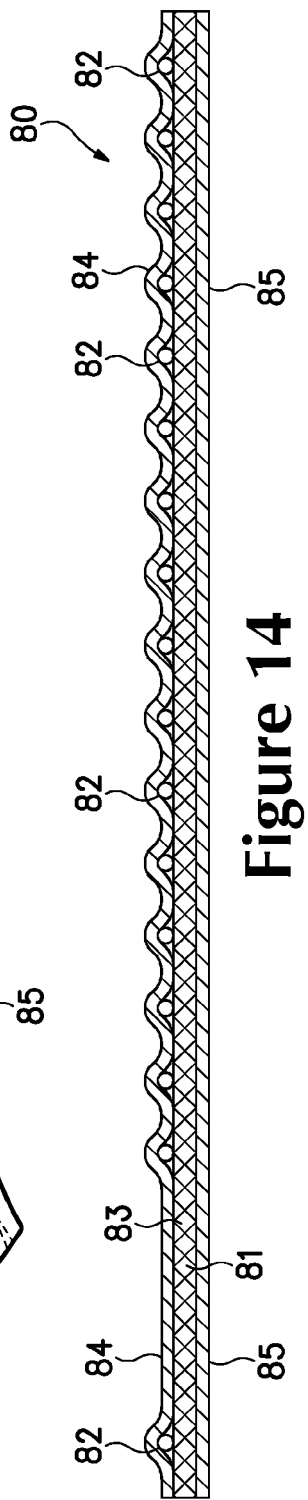
FIG. 14 is a cross-sectional view of the third embroidered element.
Figure 15:
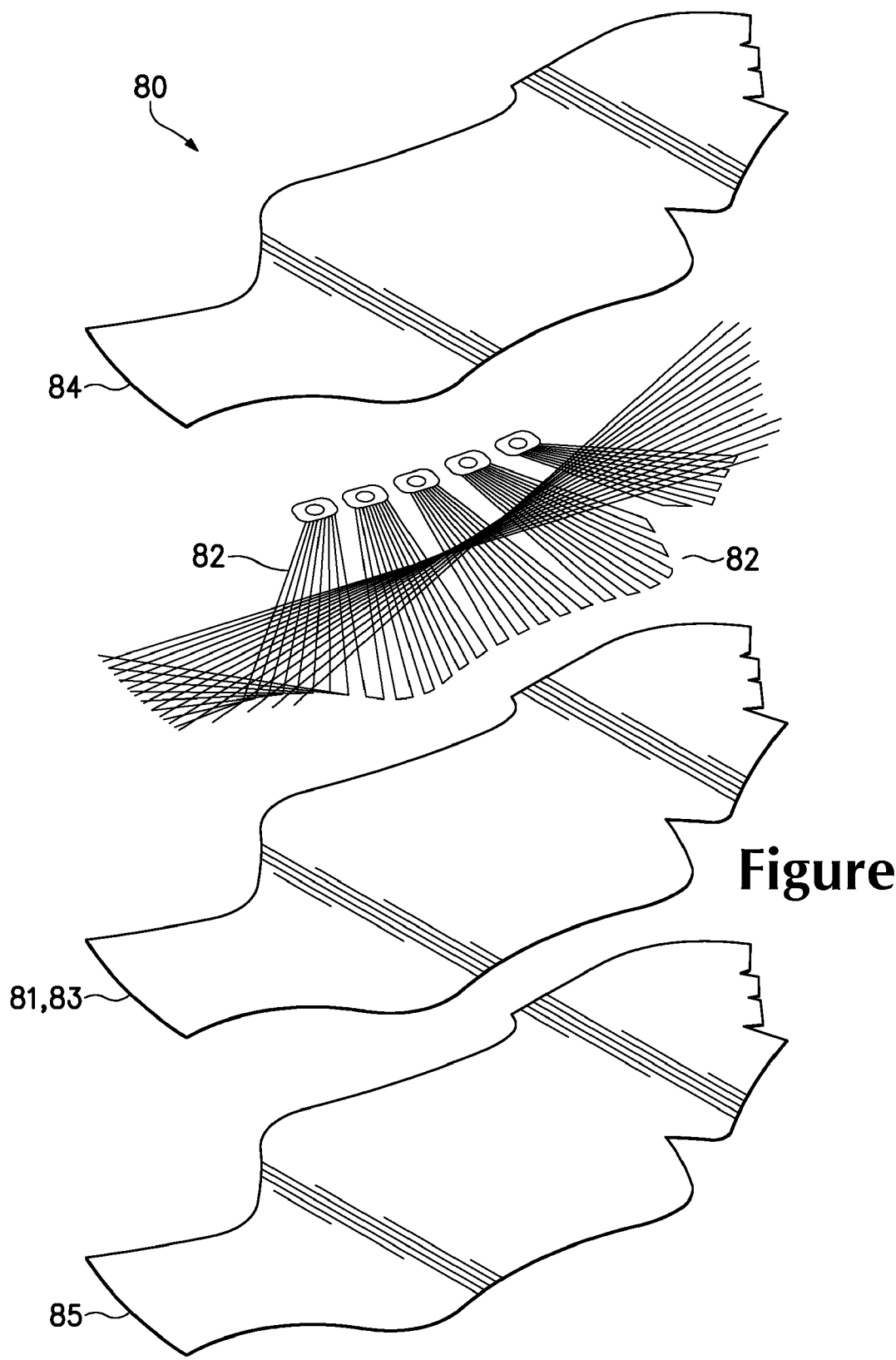
FIG. 15 is an exploded perspective view of the third embroidered element.

The primary elements of first embroidered element 40 are base layer 41, threads 42, and connecting layer 70. In some configurations of footwear 10, however, additional elements or layers may be utilized to enhance the durability, comfort, or aesthetic properties of footwear 10. Referring to FIGS. 13-15, an embroidered element 80 having the configuration of a composite element with a layered configuration is disclosed as including a base layer 81, a plurality of thread sections 82, a connecting layer 83, a cover layer 84, and a backing layer 85. In general, base layer 81 and connecting layer 83 form a central portion of embroidered element 80. Thread sections 82 are located between cover layer 84 and the combination of base layer 81 and connecting layer 83. Cover layer 84 and backing layer 85 are positioned on opposite sides of embroidered element 80 and form opposing surfaces of embroidered element 80. Base layer 81, thread sections 82, and connecting layer 83 are, therefore, positioned between cover layer 84 and backing layer 85.

Base layer 81 may be any of the generally two-dimensional materials discussed above for base layer 41. As an example, base layer 81 may be a textile that stretches at least thirty percent prior to tensile failure, and may include a relatively high spandex (also referred to as elastane) content to impart the stretch. Thread sections 82 are arranged in the general configuration of threads 42 and may be any of the generally one-dimensional materials discussed above for threads 42. Connecting layer 83 is a thermoplastic polymer material that is bonded with, is joined to, infiltrates, or is otherwise incorporated into base layer 81. Examples of suitable materials for connecting layer 83 include thermoplastic polymer sheets, hot melt materials, and thermoplastic polyurethane layers. Cover layer 84 and backing layer 85 may also be any of the generally two-dimensional materials discussed above for base layer 41, including textiles and polymer sheets.

Referring to FIG. 14, for example, base layer 81 and connecting layer 83 are depicted as being a single strata within embroidered element 80. Although effectively forming a single strata, base layer 81 and connecting layer 83 are separate materials that are subsequently joined. As described in greater detail below, the thermoplastic polymer material of connecting layer 83 may infiltrate or otherwise extend into base layer 81. When base layer 81 is formed from a textile material, for example, the polymer material of connecting layer 83 may extend around and between the various yarns, fibers, or filaments forming base layer 81. That is, the polymer material of connecting layer 83 may extend into the structure of base layer 81 to effectively form a single strata within embroidered element 80.

Embroidery processes are often performed on relatively stiff or non-stretchable materials to limit the degree to which the material warps, bends, wrinkles, or otherwise deforms as a result of the embroidery process. As noted above, base layer 81 may be a textile that stretches at least thirty percent prior to tensile failure. As a result, embroidering directly onto base layer 81 with thread sections 82 may induce base layer 81 to warp or otherwise deform. Prior to embroidering, however, connecting layer 83 may be joined, bonded, or otherwise secured to base layer 81 in order to impart stability or otherwise limit the degree to which base layer 81 deforms. Accordingly, connecting layer 83 may be utilized to effectively stabilize base layer 81 during the embroidery process.

In addition to stabilizing base layer 81 during the embroidery process, connecting layer 83 secures the positions of thread sections 82 and joins both cover layer 84 and backing layer 85 to base layer 81. That is, connecting layer 83 bonds the various elements of embroidered element 80 together. As noted above, connecting layer 83 is a thermoplastic polymer sheet or other thermoplastic polymer material that infiltrates or otherwise extends into the structure of base layer 81. When heated, connecting layer 83 will bond with, join to, infiltrate, or otherwise incorporate into base layer 81. When heated, connecting layer 83 will also bond with, join to, infiltrate, or otherwise incorporate into each of thread sections 82, cover layer 84, and backing layer 85, thereby securing thread sections 82, cover layer 84, and backing layer 85 to base layer 81. Accordingly, connecting layer 83 has the advantages of (a) stabilizing base layer 81 during the embroidery process and (b) securing the positions of thread sections 82 and joining both cover layer 84 and backing layer 85 to base layer 81.

The general process for manufacturing or otherwise making embroidered element 80 involves joining or otherwise combining connecting layer 83 with base layer 81, embroidering or otherwise lying thread sections 82 upon the combination of base layer 81 and connecting layer 83, joining thread sections 82 to base layer 81 with connecting layer 83, and joining either or both of cover layer 84 and backing layer 85 to base layer 81 with connecting layer 83. Although a variety of general methods may be utilized to manufacture or otherwise make embroidered element 80, an example process is shown in FIGS. 16A-16G and 17A-17G.

Figure 16A:
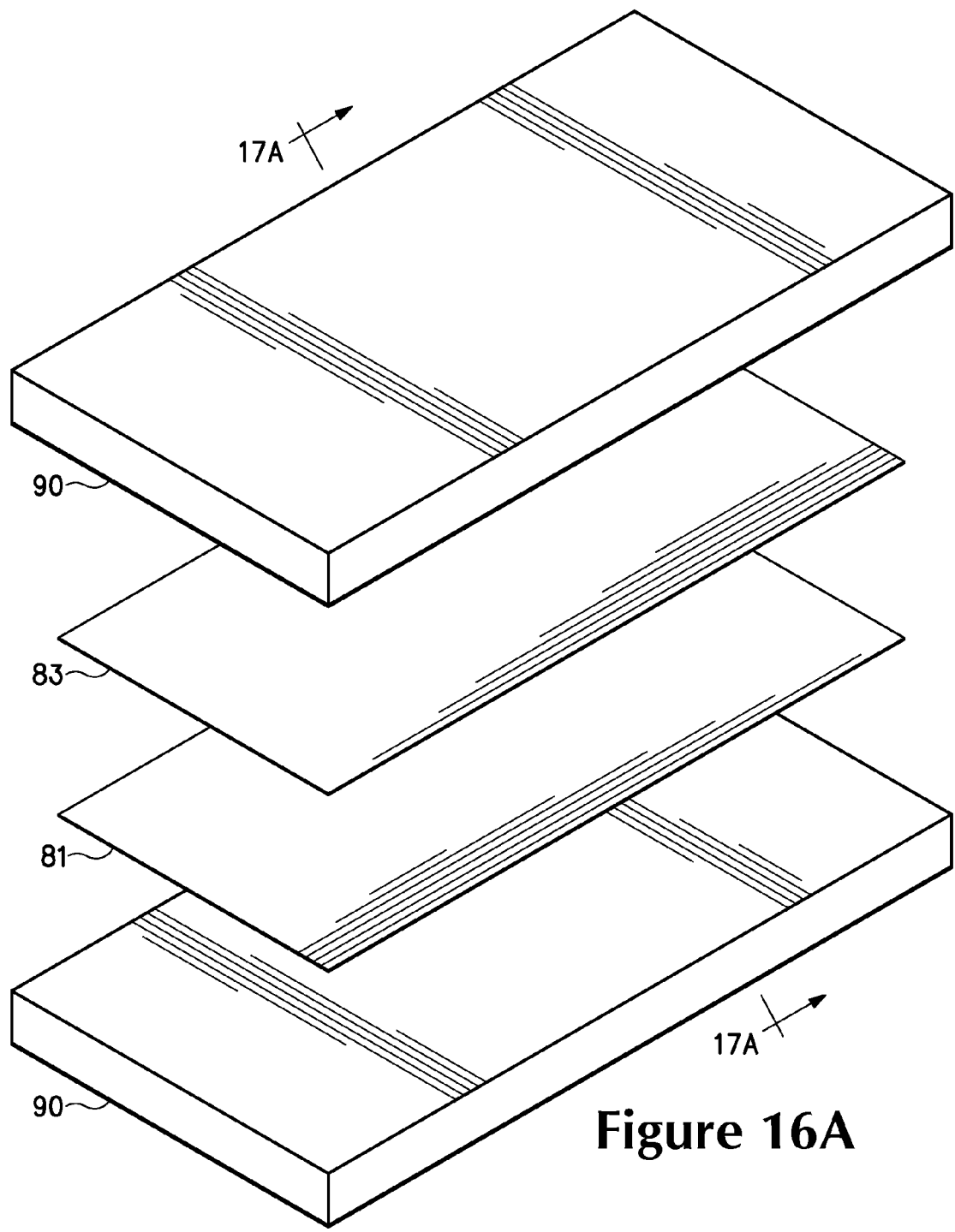
FIGS. 16A-16G are perspective views depicting a procedure for manufacturing the third embroidered element.
Figure 16B:
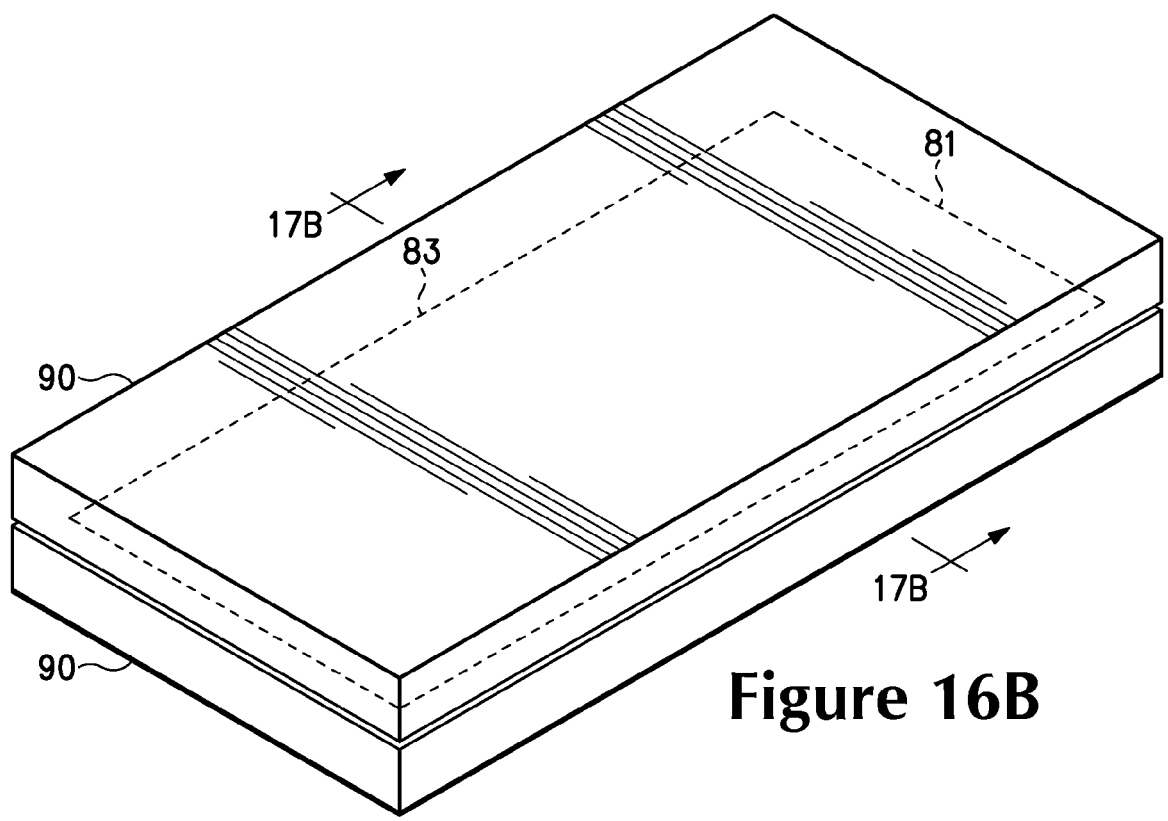
Figure 16C:
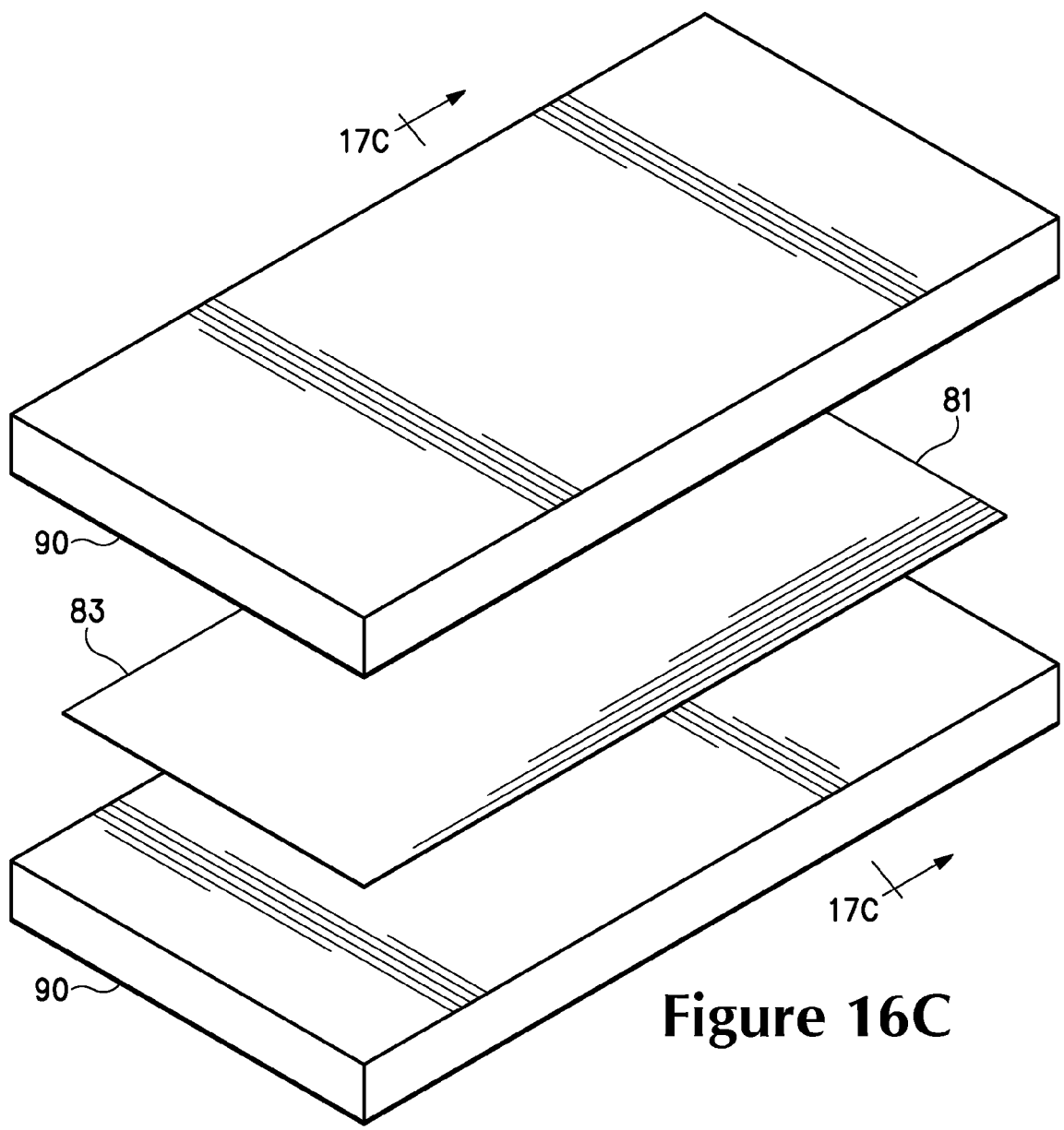
Figure 17A:
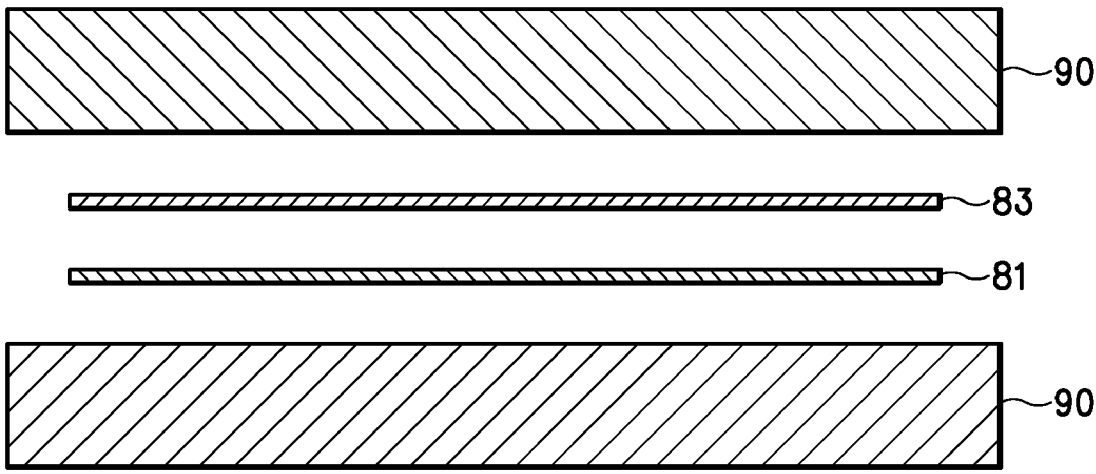
FIGS. 17A-17G are cross-sectional views depicting the procedure for manufacturing the third embroidered element.
Figure 17B:
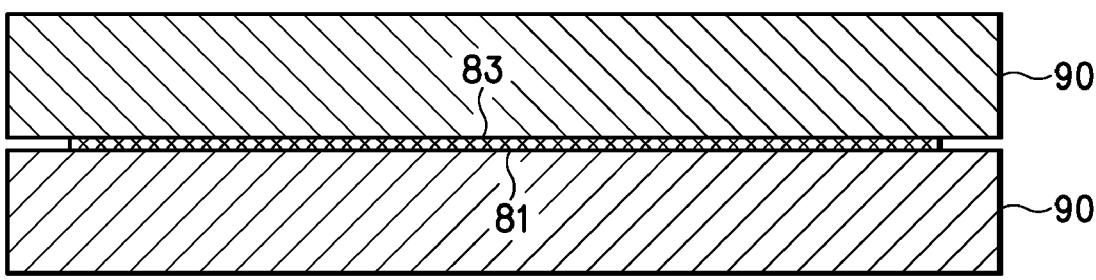
Figure 17C:
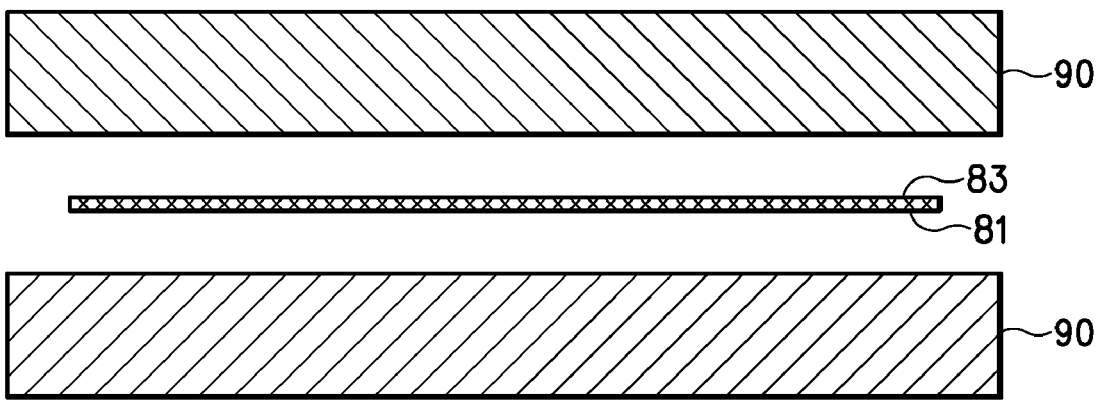

Referring to FIGS. 16A and 17A, connecting layer 83 is shown adjacent to base layer 81 and between platens of a press 90. In order to join base layer 81 and connecting layer 83, base layer 81 and connecting layer 83 may be compressed and heated between the platens of press 90, as depicted in FIGS. 16B and 17B. Whereas base layer 81 and connecting layer 83 were initially two separate materials, compressing and heating base layer 81 and connecting layer 83 effectively forms a single strata that is a combination of the materials forming base layer 81 and connecting layer 83. As discussed above, the polymer material of connecting layer 83 may extend around and between the various yarns, fibers, or filaments forming base layer 81 when base layer 81 is formed from a textile material, thereby effectively forming a single strata. Once base layer 81 and connecting layer 83 are heated and compressed, press 90 may separate such that the combination of base layer 81 and connecting layer 83 may be removed, as depicted in FIGS. 16C and 17C.

Utilizing press 90 provides an example of a method by which base layer 81 and connecting layer 83 are heated and compressed in order to combine the materials into a single strata. A variety of other methods may also be utilized. for example, either or both of base layer 81 and connecting layer 83 may be heated within an oven or other heating device prior to being compressed by press 90. In some configurations, the polymer material of connecting layer 83 may be sprayed or otherwise deposited upon base layer 81, or base layer 81 may be immersed within a molten or uncured bath of the polymer material forming connecting layer 83. In further configurations, connecting layer 83 may be formed from two sheets of polymer material that are located adjacent to opposite surfaces of base layer 81, and then compressed between the platens of press 90. Accordingly, a variety of methods may be utilized to combine base layer 81 and connecting layer 83.

Figure 16D:
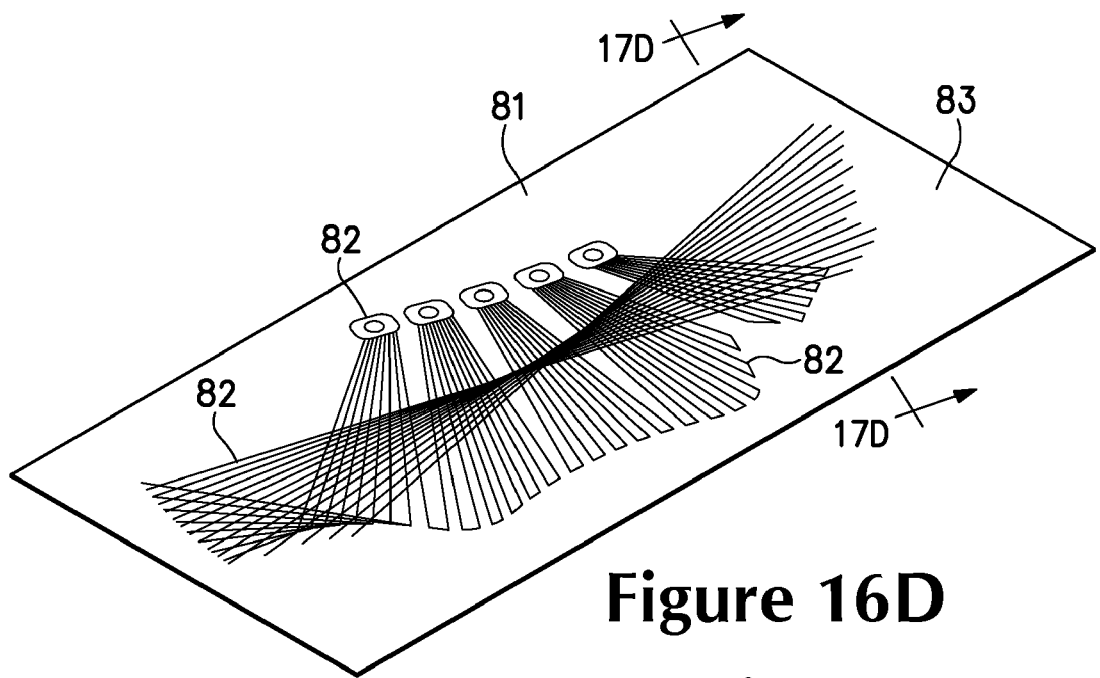
Figure 17D:
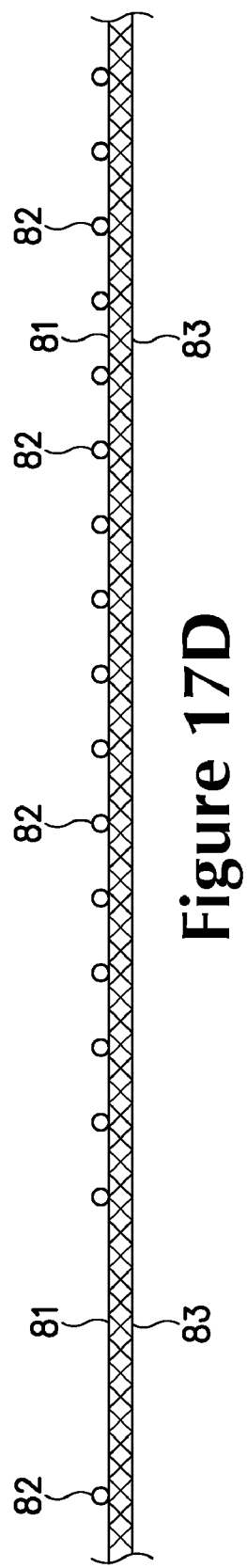

Once base layer 81 and connecting layer 83 are effectively combined, thread sections 82 may be embroidered or otherwise laid upon base layer 81, as depicted in FIGS. 16D and 17D. More particularly, a process substantially similar to the process discussed relative to FIGS. 8A-8L may be utilized for thread sections 82. Similar processes may also be utilized for other arrangements of thread sections 82. That is, sections of thread sections 82 may be placed in other patterns or locations. In some configurations of embroidered element 80, processes other than embroidering may be utilized to place thread sections 82 upon the combination of base layer 81 and connecting layer 83. As with embroidered element 40, thread sections 82 or sections of thread sections 82 may be located so as to lie adjacent to a surface of base layer 81 and substantially parallel to the surface of base layer 81 throughout a distance of at least twelve millimeters, and may lie adjacent to a surface of base layer 81 and substantially parallel to the surface of base layer 81 throughout a distance of at least five centimeters. As discussed above, an advantage of joining base layer 81 and connecting layer 83 prior to embroidering is that connecting layer 83 imparts stability or otherwise limit the degree to which base layer 81 deforms during embroidering.

At this point in the process for manufacturing or otherwise making embroidered element 80, thread sections 82 are secured the combination of base layer 81 and connecting layer 83. More particularly, end points of the various thread sections 82 may extend through the combination of base layer 81 and connecting layer 83 to secure the positions of thread sections 82. Areas of thread sections 82 between the end points, however, lie adjacent to a surface of base layer 81 and substantially parallel to the surface of base layer 81. In order to further secure the positions of thread sections 82, base layer 81, thread sections 82, and connecting layer 83 may be heated and compressed (e.g., with press 90) to bond or otherwise join thread sections to base layer 81 with connecting layer 83. That is, the thermoplastic polymer material forming connecting layer 83 may be softened or melted to secure thread sections 82 to base layer 81. In some configurations, areas of thread sections 82 between the end points may remain unsecured.

Figure 16E:
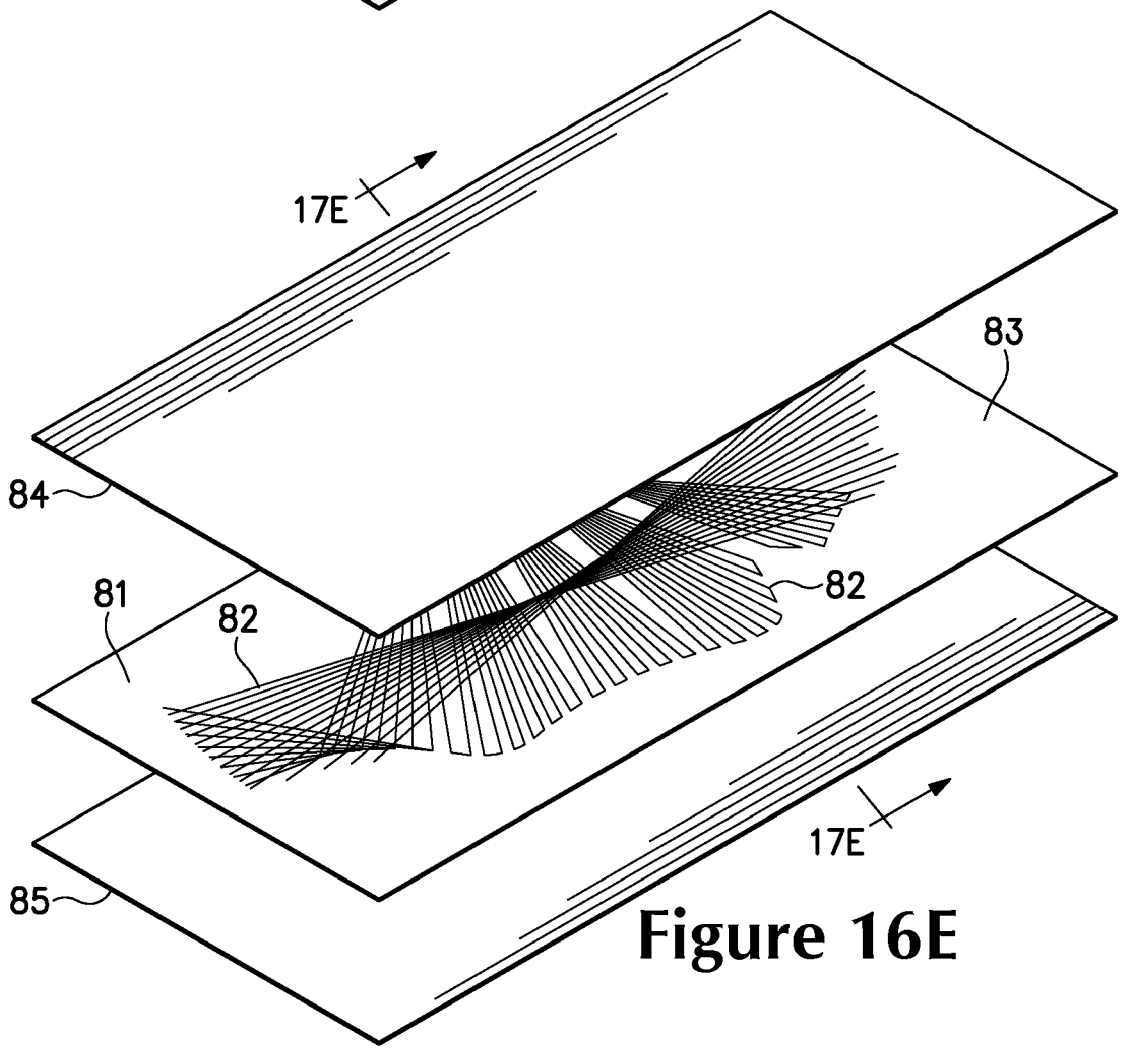
Figure 17E:
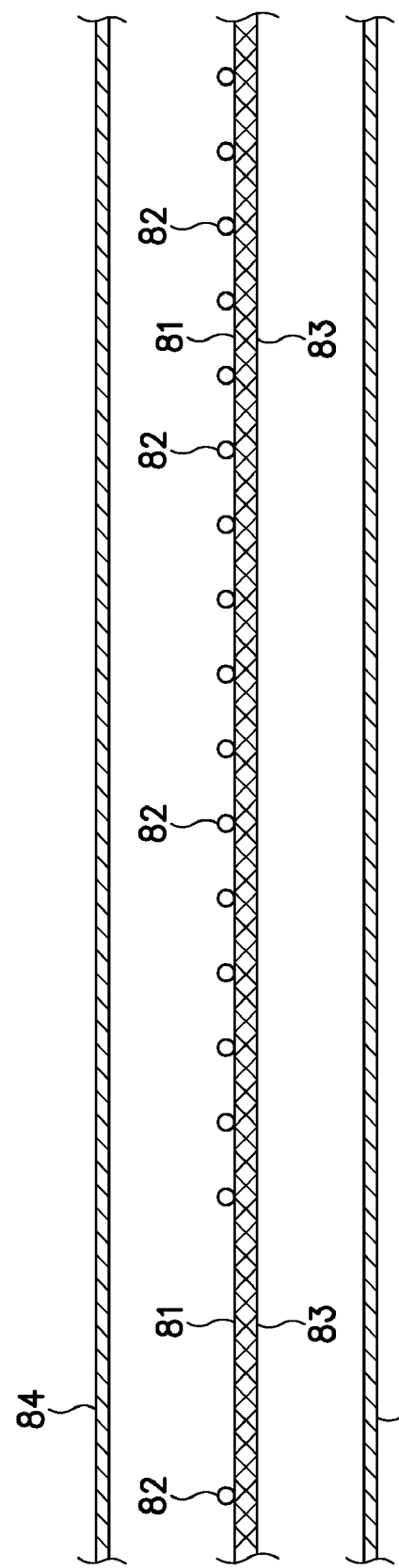

Once thread sections 82 are embroidered or otherwise laid upon base layer 81, cover layer 84 and backing layer 85 may be positioned on opposite sides of base layer 81, as depicted in FIGS. 16E and 17E. More particularly, cover layer 84 may be positioned adjacent to a first surface of base layer 81, and backing layer 85 may be positioned adjacent to an opposite second surface of base layer 81. Whereas thread sections 82 extend between cover layer 84 and base layer 81, thread sections 82 may be substantially absent from the area between backing layer 85 and base layer 81.

Figure 16F:
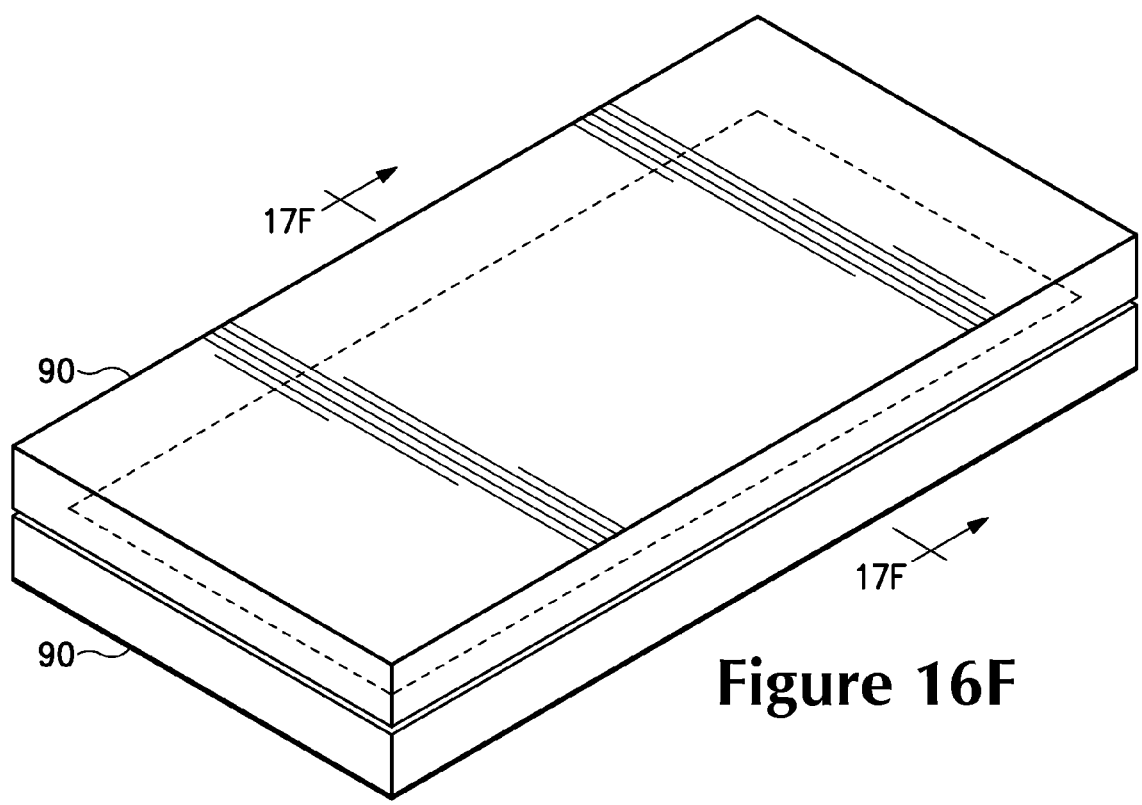
Figure 16G:
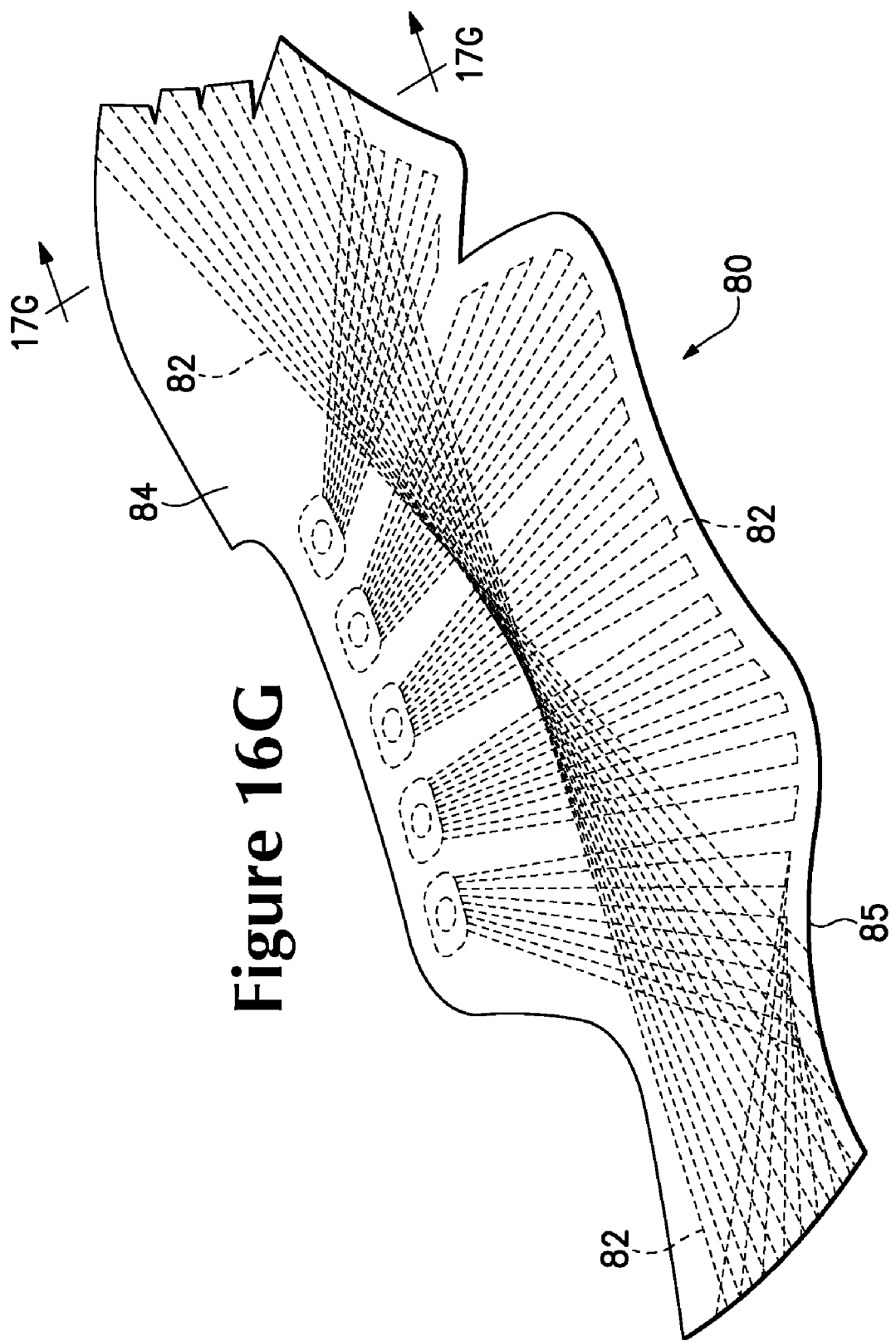
Figure 17F:
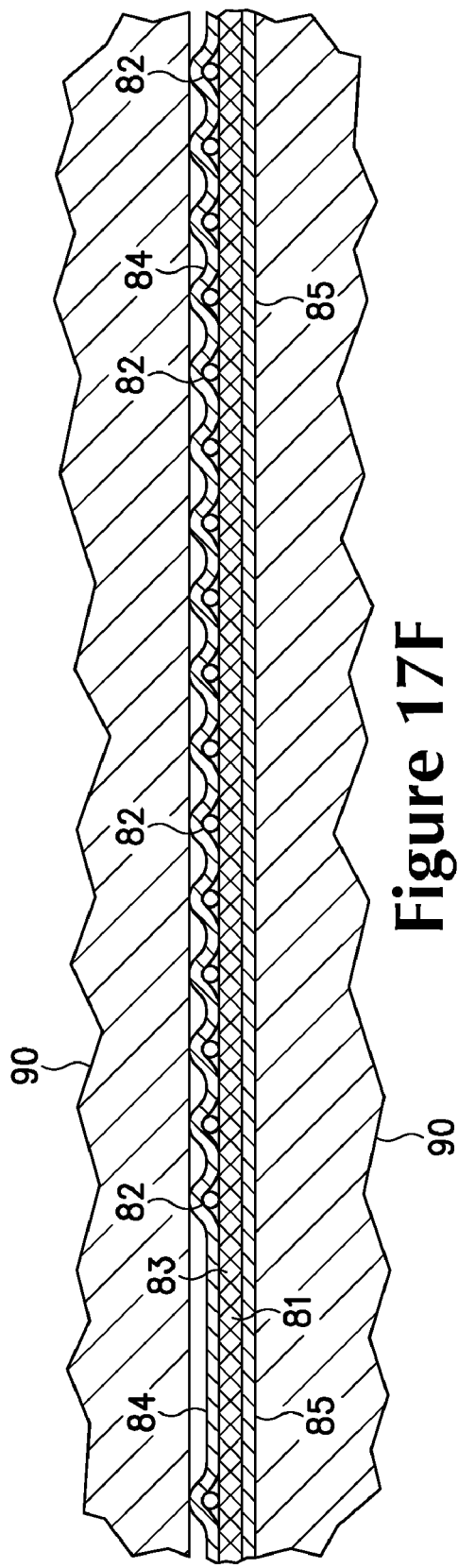
Figure 17G:
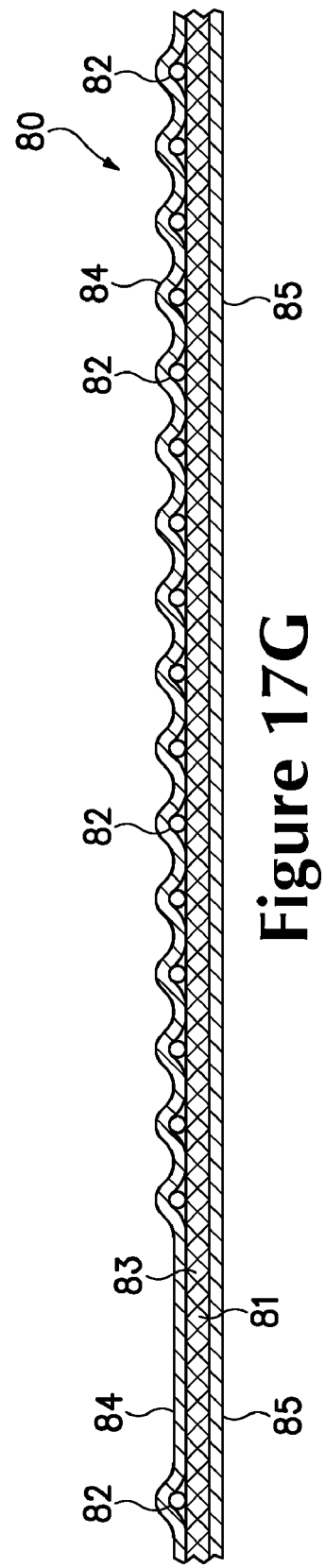

In order to join cover layer 84 and backing layer 85, press 90 or another press is then utilized to heat and compress the components, as depicted in FIGS. 16F and 17F. Given that connecting layer 83 may be present on both surfaces of base layer 81, the thermoplastic polymer material polymer material forming connecting layer 83 bonds with cover layer 84 and backing layer 85. Additionally, connecting layer 83 may also bond thread sections 82 to base layer 81 if this was not performed in a prior operation. Upon removal from press 90, the components of embroidered element 80 are joined to each other, and residual material may be cut or otherwise trimmed to substantially complete the general process for manufacturing or otherwise making embroidered element 80, as depicted in FIGS. 16G and 17G.

As noted above, connecting layer 83 may be present on both surfaces of base layer 81. Referring to FIGS. 16A and 17A, connecting layer is placed adjacent to one surface of base layer 81. Through the application of heat and compression, as depicted in FIGS. 16B and 17B, the polymer material of connecting layer 83 may infiltrate base layer 81, and a portion of the polymer material may pass through base layer 81 so as to be present on the opposite surface. In some processes, two sheets of connecting layer 83 may be utilized to ensure that equal amounts of the polymer material are present on the opposite surface of base layer 81. Furthermore, processes that involve spraying the polymer material of connecting layer 83 upon base layer 81 may involve spraying upon both surfaces, and processes that immerse base layer within a molten or uncured bath of the polymer material forming connecting layer 83 also apply the polymer material to both surfaces. Accordingly, various techniques may be utilized to ensure that the polymer material of connecting layer 83 is present on both surfaces of base layer 81 for purposes of (a) securing threads 82 and cover layer 84 to a first surface of base layer 81 and (b) securing backing layer 85 to a second surface of base layer 81.

By incorporating the polymer material of connecting layer 83 into base layer 81 prior to embroidering, the polymer material is utilized to limit the degree to which the base layer 81 warps, bends, wrinkles, or otherwise deforms as a result of the embroidery process. Incorporating the polymer material of connecting layer 83 into base layer 81 also has an advantage of providing a material that bonds with, joins to, infiltrates, or otherwise incorporates into each of thread sections 82, cover layer 84, and backing layer 85, thereby securing thread sections 82, cover layer 84, and backing layer 85 to base layer 81. Accordingly, the general process discussed above utilizes connecting layer 83 to (a) stabilize base layer 81 during the embroidery process and (b) secure the positions of thread sections 82 and join both cover layer 84 and backing layer 85 to base layer 81.

Following the manufacturing process discussed above, embroidered element 80 and similar embroidered elements may be incorporated into an article of footwear, such as footwear 10. More particularly, embroidered element 80 may, for example, replace embroidered element 40 and an embroidered element formed through a similar process may replace embroidered element 50. In some configurations, cover layer 84 may form an exterior surface of upper 30 of footwear 10, whereas backing layer 85 may form an interior surface that contacts the foot when footwear 10 is worn. In other configurations, cover layer 84 may form the interior surface of upper 30, whereas backing layer 85 may form the exterior surface.

Conclusion

Based upon the above discussion, upper 30 is at least partially formed through an embroidery process that forms structural elements from threads 42 and 52. Depending upon the orientations, locations, and quantity of threads 42 and 52, different structural elements may be formed in upper 30. As examples, the structural elements may impart stretch-resistance to specific areas, reinforce areas, enhance wear-resistance, modify the flexibility, or provide areas of air-permeability. Accordingly, by controlling the orientations, locations, and quantity of threads 42 and 52, the properties of upper 30 and footwear 10 may be controlled.

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

The invention claimed is:

1. An article of footwear having an upper and a sole structure secured to the upper, at least a portion of the upper comprising:
    a textile layer with a first surface and an opposite second surface, the textile layer stretching at least thirty percent prior to tensile failure;
    a thermoplastic polymer material separate from the textile layer and extending into and infiltrating the textile layer, the polymer material being at least partially located at the first surface of the textile layer;
    a thread having a section lying adjacent to the first surface of the textile layer and substantially parallel to the first surface of the textile layer throughout a distance of at least five centimeters, the thread being bonded to the textile layer with the polymer material; and
    a cover layer forming at least a portion of an exterior surface of the upper, the cover layer being located adjacent to the first surface of the textile layer and bonded to the textile layer with the polymer material, the section of the thread being located between the cover layer and the textile layer.

2. The article of footwear recited in claim 1, wherein the section of the thread is located between portions of the thread that extend through the textile layer.

3. The article of footwear recited in claim 1, wherein an end of the section of the thread is located at an edge of the textile layer.

4. The article of footwear recited in claim 1, wherein the thread includes a plurality of additional sections that lie adjacent to the first surface of the textile layer and are substantially parallel to the first surface of the textile layer throughout the distance of at least five centimeters.

5. The article of footwear recited in claim 4, wherein the additional sections are oriented to be substantially parallel to each other.

6. The article of footwear recited in claim 4, wherein the additional sections are oriented to cross each other.

7. The article of footwear recited in claim 1, wherein the polymer material is also located at the second surface of the textile layer, and a backing layer is located adjacent to the second surface of the textile layer and bonded to the textile layer with the polymer material.

8. The article of footwear recited in claim 7, wherein the backing layer forms at least a portion of an interior surface of the footwear.

9. A method of manufacturing a composite element, the method comprising:
    incorporating a polymer material into a textile layer, the polymer material extending into and infiltrating the textile layer, the polymer material being located at a first surface and an opposite second surface of the textile layer;
    embroidering the textile layer with a thread such that a section of the thread lies adjacent to the textile layer and substantially parallel to the textile layer throughout a distance of at least five centimeters;
    locating a cover layer adjacent to the first surface of the textile layer such that the section of the thread is located between the textile layer and the cover layer; and
    heating the polymer material to bond the section of the thread and the cover layer to the textile layer.

10. The method recited in claim 9, further including a step of selecting the textile layer to be a textile material that stretches at least thirty percent prior to tensile failure.

11. The method recited in claim 9, wherein the step of embroidering includes locating the section of the thread between portions of the thread that extend through the textile layer.

12. The method recited in claim 9, wherein the step of embroidering includes lying a plurality of additional sections of the thread adjacent to the textile layer and substantially parallel to the textile layer throughout the distance of at least five centimeters.

13. The method recited in claim 12, wherein the step of embroidering further includes orienting the plurality of additional sections to be substantially parallel to each other.

14. The method recited in claim 12, wherein the step of embroidering further includes orienting the plurality of additional sections to cross each other.

15. The method recited in claim 9, further including a step of locating a backing layer adjacent to the second surface of the textile layer and bonding the backing layer to the textile layer with the polymer material.

16. The method recited in claim 9, further including a step of incorporating the embroidered element into an article of footwear.

17. The method recited in claim 16, wherein the step of incorporating the embroidered element into the article of footwear includes locating the cover layer to form at least a portion of an exterior surface of the footwear.

18. The method recited in claim 17, further including a step of locating a backing layer adjacent to the second surface of the textile layer and bonding the backing layer to the textile layer with the polymer material, and the step of incorporating the embroidered element into the article of footwear includes locating the backing layer to form at least a portion of an interior surface of the footwear.

* * * * *